(12) United States Patent
Takeda et al.

(10) Patent No.: US 10,858,719 B2
(45) Date of Patent: *Dec. 8, 2020

(54) STEEL SHEET

(71) Applicant: NIPPON STEEL CORPORATION, Tokyo (JP)

(72) Inventors: Kengo Takeda, Tokyo (JP); Riki Okamoto, Tokyo (JP); Katsuya Nakano, Tokyo (JP); Yuya Suzuki, Tokyo (JP); Genki Abukawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/483,998

(22) PCT Filed: Feb. 20, 2018

(86) PCT No.: PCT/JP2018/005959
§ 371 (c)(1),
(2) Date: Aug. 6, 2019

(87) PCT Pub. No.: WO2018/151314
PCT Pub. Date: Aug. 23, 2018

(65) Prior Publication Data
US 2020/0017932 A1    Jan. 16, 2020

(30) Foreign Application Priority Data
Feb. 20, 2017    (JP) .................................. 2017-029304

(51) Int. Cl.
*C22C 38/58*    (2006.01)
*C22C 38/54*    (2006.01)
(Continued)

(52) U.S. Cl.
CPC ................ *C21D 9/46* (2013.01); *B32B 15/01* (2013.01); *B32B 15/011* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 8/0205* (2013.01); *C21D 8/0263* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); (Continued)

(58) Field of Classification Search
CPC ........ C21D 2211/002; C21D 2211/005; C21D 2211/008; C21D 2211/009; C21D 6/004; C21D 6/005; C21D 6/008; C21D 9/46; C21D 8/0205; C21D 8/0263; C22C 38/04; C22C 38/60; C22C 38/00; C22C 38/001; C22C 38/002; C22C 38/005; C22C 38/008; C22C 38/06; C22C 38/34; C22C 38/42; C22C 38/44; C22C 38/46; C22C 38/48; C22C 38/50; C22C 38/54; C22C 38/58; C22C 38/02; C22C 38/08; C22C 38/12; C22C 38/14; C22C 38/16; C22C 38/18; C22C 38/20; C22C 38/22; C22C 38/24; C22C 38/26; C22C 38/28; C22C 38/32; C22C 38/40; Y10T 428/12951; Y10T 428/12958; Y10T 428/12965; Y10T 428/12972; Y10T 428/26; Y10T 428/263; Y10T 428/264; Y10T 428/265; Y10T 428/27; Y10T 428/24942; Y10T 428/2495; Y10T 428/24967; Y10T 428/24983; Y10T 428/12993; B32B 15/011; B32B 15/01; B32B 15/04; B32B 15/043; B32B 15/18
See application file for complete search history.

(56) References Cited

U.S. PATENT DOCUMENTS

| 2014/0212684 A1* | 7/2014 | Kawata | ..................... C23C 2/02 428/632 |
| 2020/0071799 A1* | 3/2020 | Takeda | ................... B23K 20/02 |

FOREIGN PATENT DOCUMENTS

| JP | 62-30041 B2 | 6/1987 |
| JP | 3-227233 A | 10/1991 |

(Continued)

OTHER PUBLICATIONS

International Preliminary Report on Patentability and Written Opinion of the International Searching Authority (forms PCT/IB/373, PCT/ISA/237 and PCT/IB/326), dated Aug. 29, 2019, for corresponding International Application No. PCT/JP2018/005959, with a Written Opinion translation.

(Continued)

Primary Examiner — Michael E. La Villa
(74) Attorney, Agent, or Firm — Birch, Stewart, Kolasch & Birch, LLP

(57) ABSTRACT

A steel sheet including an inner layer and a hard layer at one or both surfaces of the inner layer wherein the hard layer and the inner layer have predetermined compositions, each hard layer has a thickness of 20 μm or more and ⅖ of the total sheet thickness or less, the hard layer has an average micro-Vickers hardness of 400 HV or more and less than 700 HV, the hard layer has an N amount of 0.02% or less, the inner layer has an average micro-Vickers hardness of 80 HV or more and less than 400 HV, the inner layer has a carbide volume ratio of less than 2.00%, and the hard layer has a nanohardness standard deviation of 2.00 or less is provided.

8 Claims, 2 Drawing Sheets

(51) Int. Cl.

| | |
|---|---|
| *C22C 38/50* | (2006.01) |
| *C22C 38/48* | (2006.01) |
| *C22C 38/46* | (2006.01) |
| *C22C 38/44* | (2006.01) |
| *C22C 38/42* | (2006.01) |
| *C22C 38/34* | (2006.01) |
| *C22C 38/06* | (2006.01) |
| *C22C 38/00* | (2006.01) |
| *B32B 15/01* | (2006.01) |
| *C21D 6/00* | (2006.01) |
| *C21D 9/46* | (2006.01) |
| *C21D 8/02* | (2006.01) |
| *C22C 38/04* | (2006.01) |
| *C22C 38/60* | (2006.01) |
| *B32B 15/18* | (2006.01) |
| *B32B 15/04* | (2006.01) |
| *C22C 38/08* | (2006.01) |
| *C22C 38/24* | (2006.01) |
| *C22C 38/12* | (2006.01) |
| *C22C 38/26* | (2006.01) |
| *C22C 38/20* | (2006.01) |
| *C22C 38/32* | (2006.01) |
| *C22C 38/02* | (2006.01) |
| *C22C 38/28* | (2006.01) |
| *C22C 38/40* | (2006.01) |
| *C22C 38/18* | (2006.01) |
| *C22C 38/14* | (2006.01) |
| *C22C 38/16* | (2006.01) |
| *C22C 38/22* | (2006.01) |

(52) U.S. Cl.
CPC .............. *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C21D 2211/002* (2013.01); *C21D 2211/005* (2013.01); *C21D 2211/008* (2013.01); *C21D 2211/009* (2013.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/2495* (2015.01); *Y10T 428/24942* (2015.01); *Y10T 428/24967* (2015.01); *Y10T 428/24983* (2015.01); *Y10T 428/26* (2015.01); *Y10T 428/263* (2015.01); *Y10T 428/264* (2015.01); *Y10T 428/265* (2015.01); *Y10T 428/27* (2015.01)

(56) References Cited

FOREIGN PATENT DOCUMENTS

| | | |
|---|---|---|
| JP | 11-44203 A | 2/1999 |
| JP | 2005-264318 A | 9/2005 |
| JP | 2011-111670 A | 6/2011 |
| JP | 2014-19920 A | 2/2014 |
| JP | 2014-74234 A | 4/2014 |
| JP | 2016-98432 A | 5/2016 |

OTHER PUBLICATIONS

International Search Report (form PCT/ISA/210), dated May 1, 2018, for corresponding International Application No. PCT/JP2018/005959, with an English translation.

* cited by examiner

STEEL SHEET

FIELD

The present invention relates to a steel sheet, particularly relates to a steel sheet for cold forming excellent in wear resistance for auto parts or infrastructure structural members as main applications.

BACKGROUND

Members used in sliding environments such as seat rails of automobiles, housings of torque converters, and hand rail guides of escalators are required to have wear resistance. The causes of wear in these products are not the same, but wear resistance is secured by increasing the strength of the surfaces contacting the sliding parts. For example, in seat rails, wear advances by steel members rubbing against each other while in the housings of torque converter, wear is caused by metal powder contained in the oil. Further, wear is promoted in hand rail guides of escalators due to dirt and other fine particles caught between the plastic hand rail parts and metal guides. However, the wear resistance is strikingly improved by increasing the strength of the surface of the steel members receiving the wear.

Up until now, numerous proposals have been made regarding surface reforming techniques for improving the wear resistance of steel members (for example, see PTLs 1 to 5).

For example, PTL 1 discloses a carburized member excellent in wear resistance containing as chemical ingredients, by mass %, C: 0.10 to 0.28%, Si: 0.15 to 0.35%, Mn: 0.30 to 1.50%, P: 0.035% or less, S: 0.035% or less, Cr: 1.45 to 3.00%, Mo: 0.80% or less (including 0%), Al: 0.020 to 0.060%, and N: 0.0080 to 0.0250%, having a balance of Fe and unavoidable impurities, and having a sliding surface free of any carburized abnormal layer, having a surface carbon concentration of within 0.70 to 0.90 mass % in range, and having a troostite area rate of structures from the surfacemost part to a depth of 50 μm of 0.70% or less and thereby able to improve the wear resistance, and discloses a method for producing the same.

Further, PTL 2 discloses a soft magnetic steel material excellent in wear resistance and excellent in magnetic characteristics after nitriding containing C: 0.001 to 0.020% (meaning mass %, same below), Si: 0.1% or less (not including 0%), Mn: 0.1 to 0.5%, P: 0.02% or less (not including 0%), S: 0.02% or less (not including 0%), Cu: 0.1% or less (not including 0%), Ni: 0.1% or less (not including 0%), Al: 0.040% or less (not including 0%), and N: 0.0040% or less (not including 0%), further containing Nb: 0.015 to 0.08% and/or Ti: 0.01 to 0.1% so as to satisfy a predetermined formula (1), having a balance of Fe and unavoidable impurities, and having a steel structure of a ferrite single phase structure.

Furthermore, PTL 3 discloses columnar or cylindrical sliding parts made of carbon steel and a method for producing the same designed so as to improve the wear resistance (or wear of high surface pressure), fatigue strength, and rigidity characterized by including a step of shaping and machining as necessary a carbon steel material, a step of induction hardening, and a final polishing step performed right after the induction hardening step.

PTL 4 discloses soft nitrided steel excellent in wear resistance containing, by mass %, C: 0.001 to 0.005%, Si: 0.03 to 0.5%, Mn: 0.1 to 1.0%, Al: 0.015% to 0.1%, Ti: 0.03 to 0.1%, and Cr: 0.4 to 1.4%, restricting P to 0.035% or less, and having a balance of Fe and unavoidable impurities, furthermore having, at a depth of 0.25 mm from the surfacemost part of the steel, a size of Cr nitrides precipitating in the ferrite crystals on the {001} face in flat plate shapes of 5 to 10 nm in the plate directions, having a number density of the Cr nitrides of $1 \times 10^{17}$ cm$^{-3}$ or more, preferably having a ratio (N/Cr) of the amount of N and the amount of Cr in the Cr nitrides of 0.5 to 0.8 in range, mainly designed for auto part applications, excellent in total elongation characteristic and hole expandability and other press formability before soft nitriding, and having a top layer hard layer of a sufficient thickness after soft nitriding.

PTL 5 discloses a steel material for carburized or carburized and nitrided parts containing C: 0.15 to 0.40%, Si: 0.15 to 0.40%, Mn: 0.5 to 1.5%, S: 0.003 to 0.050%, Cr: 0.7 to 1.5%, Cu: 0.30 to 0.80%, Ni: 0.15 to 1.0%, N: 0.003 to 0.020%, and Al: 0.005 to 0.050%, having a balance of Fe and impurities, having P and O among the impurities in P: 0.025% or less and O: 0.0020% or less, and preventing early fracture of parts due to "rolling contact", "sliding contact", and "rolling and sliding contact".

CITATION LIST

Patent Literature

[PTL 1] Japanese Unexamined Patent Publication No. 2016-98432
[PTL 2] Japanese Unexamined Patent Publication No. 2014-74234
[PTL 3] Japanese Unexamined Patent Publication No. 11-44203
[PTL 4] Japanese Unexamined Patent Publication No. 2005-264318
[PTL 5] Japanese Unexamined Patent Publication No. 2014-19920

SUMMARY

Technical Problem

In each of the above prior art, there is the technical problem of the change in dimensions and shape of the steel parts at the time of heat treatment. This change is due to the slight unevenness of the cooling rate inside the parts at the time of cooling in heat treatment. For this reason, highly accurate prediction of the dimensions and shapes of parts becomes de facto difficult. Further, if correcting the shapes of parts after the above heat treatment by, for example, bending, the members will easily crack or the members will fracture. Therefore, usually, heat treated parts are machined or press tempered to adjust the dimensions and shapes of the parts to the necessary values. Use of such machining or press tempering invites a drop in productivity and an increase in costs in part manufacture and, further, has the technical problem of a difficulty in manufacture of large sized and long length members.

Solution to Problem

The inventors engaged in intensive research on means for solving the above technical problems. As a result, they discovered that by forming a hard layer with an average micro-Vickers hardness of 400 HV or more and less than 700 HV on the sliding part of one or both surfaces of a steel sheet and furthermore suitably controlling the compositions of the hard layer and the inner layer, making the average micro-Vickers hardness of the inner layer 80 HV or more and less than 400 HV, controlling the volume ratio of carbides contained in the inner layer to less than 2.00%, and, controlling the standard deviation of nanohardness of the hard layer to 2.00 or less, both wear resistance and cold workability can be achieved at high levels.

Further, they discovered by various repeated research that as the method for producing a steel sheet satisfying this, production is difficult even if just changing the hot rolling conditions, annealing conditions, etc., individually and that production is only possible by optimizing the method by so-called integrated processes such as a hot rolling-annealing process, and thereby completed the present invention.

The gist of the present invention is as follows:

(1) A steel sheet comprising an inner layer and a hard layer at one or both surfaces of the inner layer, wherein
the hard layer comprises, by mass %,
C: 0.08 to 0.40%,
Si: 0.01 to 3.00%,
Mn: 1.000 to 10.00%,
P: 0.0001 to 0.0200%,
S: 0.0001 to 0.0200%, and
a balance of Fe and impurities,
the inner layer comprises, by mass %,
C: 0.001 to 0.200%,
Si: 0.01 to 3.00%,
Mn: 0.20 to 3.00%,
P: 0.0001 to 0.0200%,
S: 0.0001 to 0.0200%, and
a balance of Fe and impurities,
each hard layer has a thickness of 20 μm or more and 2/5 of the total sheet thickness or less,
the each hard layer has an average micro-Vickers hardness of 400 HV or more and less than 700 HV,
the hard layer has an N amount of 0.02% or less,
the inner layer has an average micro-Vickers hardness of 80 HV or more and less than 400 HV,
the inner layer has a carbide volume ratio of less than 2.00%, and
the hard layer has a nanohardness standard deviation of 2.00 or less.

(2) The steel according to (1), wherein
the hard layer further comprises, by mass %, one or more of
Al: 0.500% or less,
N: 0.0200% or less,
Cr: 2.000% or less,
Mo: 1.000% or less,
O: 0.0200% or less,
Ti: 0.500% or less, and
B: 0.0100% or less and
the inner layer further comprises, by mass %, one or more of
Al: 0.500% or less,
N: 0.0200% or less,
Cr: 2.000% or less,
Mo: 1.000% or less,
O: 0.0200% or less,
Ti: 0.500% or less, and
B: 0.0100% or less.

(3) The steel sheet according to (1) or (2), wherein
the hard layer further comprises, by mass %, one or more of
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less, and
the inner layer further comprises, by mass %, one or more of
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less.

Advantageous Effects of Invention

According to the present invention, by forming a hard layer having an average micro-Vickers hardness of 400 HV or more and less than 700 HV on the sliding part of one or both surfaces of a steel sheet and furthermore suitably controlling the compositions of the hard layer and the inner layer, making the average micro-Vickers hardness of the inner layer 80 HV or more and less than 400 HV, controlling the volume ratio of carbides contained in the inner layer to less than 2.00%, and, controlling the standard deviation of nanohardness of the hard layer to 2.00 or less, a steel sheet excellent in wear resistance and cold workability can be provided.

DESCRIPTION OF EMBODIMENTS

Figure 1:
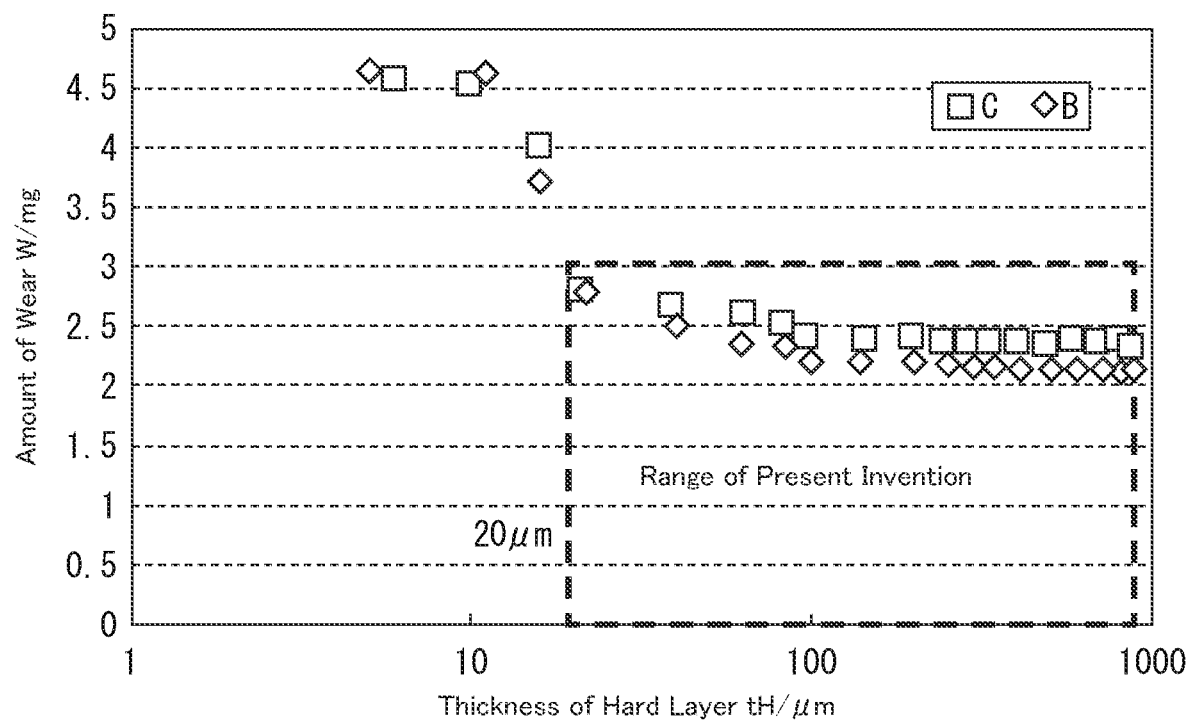
FIG. 1 is a view showing a relationship of a thickness of a hard layer and wear resistance.

Below, the present invention will be explained in detail.

First, the reason for limiting the thicknesses, constituents, and average micro-Vickers hardnesses of the hard layer and the inner layer and the nanohardness standard deviation of the hard layer will be explained. Here, the "%" of the constituents means mass %.

The thickness of the hard layer present at one or both of the surfaces of the inner layer is 20 μm or more and ⅖ of the total sheet thickness or less per surface. If the thickness of the hard layer is less than 20 μm, since the thickness of the hard layer is thin, in an environment of wear or sliding, peel off of the hard layer is invited and excellent wear resistance can no longer be obtained. For this reason, the thickness of the hard layer is 20 μm or more. Further, if the thickness of the hard layer is more than ⅖ of the total sheet thickness, at the time of cold forming, the stress applied to the hard layer increases and the merit of improvement of the cold formability by the use of multiple layers can no longer be obtained. For this reason, the thickness of the hard layer is ⅖ or less of the total sheet thickness. More preferably, the thickness of the hard layer is 30 μm to ³⁄₁₀ or less of the total sheet thickness.

The thicknesses of the hard layer and the inner layer are measured by an optical microscope. A sample covered by the measurement is buried in diameter 30 mm cylindrically shaped epoxy resin. #80 to 1000 polishing paper is used to rough polish it by wet polishing, then diamond abrasives having 3 μm and 1 μm average particle sizes are used to finish this to a mirror surface. The polishing by the 1 μm diamond particles is performed under the conditions of application of a 1 N to 10 N load and holding for 30 to 600 seconds on a polishing table rotating by a 30 to 120 mpm speed. At the hard layer and the inner layer, there is a difference in hardness, and therefore in the polishing by the above 1 μm diamond particles, a difference arises in the amount of polishing. Due to this, a slight step difference is formed at the boundary of the hard layer and the inner layer. By examination using an optical microscope, it is possible to find the boundary between the hard layer and the inner layer and the thicknesses and ratios in the sheet thickness of the layers. If the step difference caused by the finish polishing is slight, examination by differential interference of the optical microscope is preferable.

The average micro-Vickers hardness of the hard layer is 400 HV or more and less than 700 HV. If the average micro-Vickers hardness is less than 400 HV, the hardness of the hard layer is low and excellent wear resistance can no longer be obtained in a wear or sliding environment. For this reason, the average micro-Vickers hardness of the hard layer is 400 HV or more. On the other hand, if the average micro-Vickers hardness of the hard layer is 700 HV or more, the hard layer is excessively high in strength, and therefore the cold formability remarkably deteriorates. For this reason, the average micro-Vickers hardness of the hard layer is less than 700 HV. More preferably, it is 450 HV to 680 HV.

The N amount contained in the hard layer is 0.02% or less. N is an element remarkably suppressing cross slip in the steel at the time of cold forming. Cross slip has the effect of suppressing the accumulation and integration of dislocations introduced into the steel at the time of applying strain. If the N amount exceeds 0.02%, cross slip is remarkably suppressed and excessive accumulation and integration of dislocations is invited at the time of cold forming. As a result, voids are generated in the low strain region. These voids are joined resulting in macroscopic fracture, and therefore the cold formability deteriorates. For this reason, the N amount contained in the hard layer is 0.02% or less. More preferably, the N amount is 0.018% or less.

The average micro-Vickers hardness of the inner layer is 80 HV or more and less than 400 HV. If the average micro-Vickers hardness is less than 80 HV, since the difference in hardness from the hard layer becomes greater, strain excessively concentrates at the inner layer side at the time of cold forming and cracks at the boundary of the hard layer/inner layer and poor shapes of products after cold forming are invited. For this reason, the average micro-Vickers hardness of the inner layer is 80 HV or more. Further, if the average micro-Vickers hardness is 400 HV or more, since the difference in hardness of the hard layer and the inner layer becomes smaller, the effect of easing the concentration of strain in the hard layer at the time of cold forming is lost and the cold formability deteriorates. For this reason, the average micro-Vickers hardness of the inner layer is less than 400 HV. More preferably, it is 90 HV or more and less than 380 HV.

The volume ratio of the carbides in the inner layer is less than 2.00%. Carbides become sites for formation of cracks or voids at the time of cold forming. If 2.00% or more, combination of cracks or voids is promoted and macroscopic fracture is promoted. For this reason, the upper limit of the carbide volume ratio of the inner layer is less than 2.00%. More preferably, it is less than 1.90%. "Carbides" include the compound of iron and carbon called cementite ($Fe_3C$), compounds in which the Fe atoms in the cementite are replaced by Mn, Cr or other alloy elements, and alloy carbides ($M_{23}C_6$, $M_6C$, MC where M is Fe or a metal element added for alloying with Fe).

The standard deviation of nanohardness of the hard layer is 2.00 or less. This is because the cold formability is remarkably improved by suppressing variations in the nanohardness of the hard layer. If the nanohardness standard deviation exceeds 2.00, for example, sometimes cracks are formed at the time of cold rolling. From this viewpoint, the nanohardness standard deviation is preferably 2.00 or less, further preferably 1.60 or less. The lower limit of the nanohardness standard deviation is not prescribed, but keeping this down to 0.20 or less is difficult technically. Variation in the nanohardness of the hard layer in the sheet thickness direction does not affect the cold formability. Even if there were a gradient in hardness in the sheet thickness direction, the effect of the present invention would not be inhibited. In practice, if the variation of nanohardness on a line vertical to the sheet thickness direction and parallel to the rolling direction is large, the cold formability falls.

Next, the reasons for limiting the chemical ingredients of the hard layer optimal for the steel sheet will be explained. Here, the "%" in the constituents means mass %.

(C: 0.08 to 0.40%)

C is an element effective for strengthening steel. To secure wear resistance of a part by quenching and tempering or other heat treatment, a 0.08% or more amount of C is required. If less than 0.08%, the hardness after quenching is insufficient and an excellent wear resistance can no longer be obtained. For this reason, the lower limit is 0.08% or more. C further is an element remarkably suppressing cross slip in steel at the time of cold forming. Cross slip has the effect of suppressing the accumulation and integration of dislocations introduced into the steel at the time of applying strain. If the amount of C exceeds 0.40%, cross slip is remarkably suppressed and excessive accumulation and integration of dislocations is invited at the time of cold forming. As a result, voids are generated in the low strain region. These voids are joined resulting in macroscopic fracture, so the cold formability deteriorates. For this reason, the upper limit is 0.40% or less. Preferably it is 0.10% to 0.39%. More preferably, it is 0.10% to 0.38%.

(Si: 0.01 to 3.00%)

Si is an element which acts as a deoxidant and has an effect on the morphology of the carbides and residual austenite after heat treatment. To achieve both wear resistance and cold formability, it is effective to reduce the volume ratio of the carbides present in the steel parts and further to utilize the residual austenite to try to increase the strength. For this reason, a content of 0.01% or more of Si becomes essential. If less than 0.01%, formation of carbides is not suppressed, a large amount of carbides becomes present in the steel, and the cold formability deteriorates. Keeping down the Si to a content of less than 0.01% invites an increase in costs in current refining processes. For this reason, the lower limit of Si is 0.01% or more. On the other hand, if the content of Si exceeds 3.00%, brittleness of the steel part is invited and the cold formability is lowered, so the upper limit is 3.00% or less. Preferably, the content is 0.01% to 2.5%. More preferably, it is 0.2% to 2.0%.

(Mn: 1.000 to 10.00%)

Mn is an element which acts as a deoxidant and further is effective for suppression of the pearlite transformation of steel. If less than 1.000%, in the cooling process from the austenite region, it becomes difficult to suppress pearlite transformation. Along with this, the ratio of martensite structures falls, so a drop in strength and deterioration of the wear resistance are caused. For this reason, the lower limit is 1.000% or more. On the other hand, if over 10.00%, coarse Mn oxides become present in the steel and become starting points of fracture at the time of cold forming, so the cold formability deteriorates. For this reason, the upper limit is 10.00% or less. Preferably, it is 2.0% to 9.0%.

(P: 0.0001 to 0.0200%)

P is an element strongly segregating at the ferrite grain boundaries and promoting the embrittlement of the grain boundaries. The smaller, the more preferable, but to improve the purity to less than 0.0001% in the refining step, the time required for refining becomes greater and a large increase in costs is invited. For this reason, the lower limit may be made 0.0001% or more. On the other hand, if over 0.0200%, grain boundary embrittlement invites a drop in cold formability, so the upper limit is 0.0200% or less. Preferably, the content is 0.0010% to 0.0190%.

(S: 0.0001 to 0.0200%)

S is an element forming MnS and other nonmetallic inclusions in the steel and invites a drop in the ductility of the steel sheet part. The smaller, the more preferable, but to improve the purity to less than 0.0001% of this in the refining process, the time required for refining becomes great and a large increase in costs is invited. For this reason, the lower limit is 0.0001% or more. On the other hand, if exceeding 0.0200%, fracture starting from the nonmetallic inclusions is invited at the time of cold forming and the cold formability falls, so the upper limit is 0.0200% or less. Preferably, the content is 0.0010% to 0.0190%.

In the present invention, the hard layer may optionally further contain the following constituents:

(Al: 0.500% or Less)

Al is an element acting as a deoxidant of steel and stabilizing the ferrite and is added in accordance with need. If adding Al, with less than 0.001%, the effect of addition is not sufficiently obtained, so the lower limit is 0.001% or more. On the other hand, if exceeding 0.500%, coarse Al oxides are formed and a drop in the cold formability is caused. For this reason, the upper limit is 0.500% or less. Preferably, the content is 0.010% to 0.450%.

(N: 0.0200% or Less)

N, like C, is an element effective for strengthening steel. Further, as explained above, it is an element affecting the generation of cross slip of dislocations at the time of cold forming. From the viewpoint of securing the cold formability, the smaller the content, the more preferable. 0% is also possible. However, reducing this to less than 0.0001% would invite an increase in the refining costs, so if N is included, the lower limit is 0.0001% or more. On the other hand, with content exceeding 0.0200%, as explained above, it is not possible to suppress concentration of strain at the time of cold forming and voids are caused, so the cold formability remarkably falls. For this reason, the upper limit is 0.0200%. Preferably, the content is 0.0010% to 0.0150%.

(O: 0.0200% or Less)

O is an element promoting the formation of oxides in the steel. The oxides present in the ferrite grains become sites for formation of voids, so the fewer, the more preferable. 0% is also possible. However, reduction to less than 0.0001% invites an increase in refining costs, so if O is included, 0.0001% or more is the lower limit. On the other hand, with a content exceeding 0.0200%, the cold formability is lowered, so the upper limit is 0.0200% or less. Preferably, the content is 0.0005% to 0.0170%.

(Ti: 0.500% or Less)

Ti is an element important for control of the morphology of the carbides and an element promoting an increase of strength of the ferrite by inclusion in a large amount. From the viewpoint of securing the cold formability, the smaller the content, the more preferable. 0% is also possible. However, reducing this to less than 0.001% invites an increase in the refining costs, so if Ti is included, the lower limit is 0.001% or more. On the other hand, with an over 0.500% content, coarse Ti oxides or TiN become present in the steel and the cold formability is lowered. For this reason, the upper limit is 0.500% or less. Preferably, the content is 0.005% to 0.450%.

(B: 0.0100% or Less)

B is an element suppressing the formation of ferrite and pearlite in the process of cooling from austenite and promoting the formation of bainite or martensite or other low temperature transformed structures. Further, B is an element advantageous for increasing the strength of steel and is added in accordance with need. If adding B, with less than 0.0001%, the effect of addition in increasing the strength or improving the wear resistance cannot be sufficiently obtained. Furthermore, for identifying less than 0.0001%, careful attention must be paid in analysis. Depending on the analysis device, the lower limit of detection will be reached. For this reason, 0.0001% or more is the lower limit. On the other hand, with a content exceeding 0.0100%, formation of coarse B oxides in the steel is invited. These become the starting points for formation of voids at the time of cold working, so the cold formability deteriorates. For this reason, the upper limit is 0.0100% or less. More preferably, the content is 0.0005% to 0.0050%.

(Cr: 2.000% or Less)

Cr, like Mn, is an element suppressing pearlite transformation and effective for increasing the strength of steel and is added in accordance with need. If adding Cr, with less than 0.001%, the effect of addition is not obtained, so the lower limit is 0.001% or more. On the other hand, with addition exceeding 2.000%, coarse Cr carbides are formed at the center segregated part and the cold formability is lowered, so the upper limit is 2.000% or less. Preferably, the content is 0.01% to 1.500%.

(Mo: 1.000% or Less)

Mo, like Mn and Cr, is an element effective for strengthening steel and is added in accordance with need. If adding Mo, with less than 0.001%, the effect is not obtained, so the lower limit is 0.001% or more. On the other hand, if exceeding 1.000%, coarse Mo carbides are formed and a drop in the cold formability is invited, so the upper limit is 1.000% or less. More preferably, the content is 0.010% to 0.700%.

(Nb: 0.500% or Less)

Nb, like Ti, is an element effective for control of the morphology of carbides. It is an element effective also for improving the toughness since refining the structure due to its addition. If adding Nb, with less than 0.001%, the effect is not obtained, so the lower limit is 0.001% or more. On the other hand, if exceeding 0.500%, a large number of fine, hard Nb carbides precipitate, a remarkable deterioration of the ductility is invited along with the rise in strength of the steel material, and the cold workability is lowered. For this reason, the upper limit is 0.500% or less. Preferably the content is 0.002% to 0.200%.

(V: 0.500% or Less)

V also, like Nb, is an element effective for control of the morphology of the carbides and an element effective for improving the toughness since addition refines the structure. If adding V, with less than 0.001%, the effect is not obtained, so the lower limit is 0.001% or more. On the other hand, if over 0.500%, a large number of fine V carbides precipitate, a rise in strength and drop in ductility of the steel material are invited, and the cold formability falls. For this reason, the upper limit is 0.500% or less. More preferably, the content is 0.002% to 0.400%.

(Cu: 0.500% or Less

Cu is an element effective for increasing the strength of steel material and is added in accordance with need. If adding Cu, to effectively obtain the effect of increase of strength, a 0.001% or more content is preferable. On the other hand, if over 0.500%, red heat embrittlement is invited and the productivity in hot rolling is lowered, so the upper limit is 0.500% or less. More preferably, the content is 0.002% to 0.400%.

(W: 0.100% or Less)

W also, like Nb and V, is an element effective for control of the morphology of the carbides and increase of the strength of steel and is added in accordance with need. If adding W, with less than 0.001%, the effect is not obtained, so the lower limit is 0.001% or more. On the other hand, if over 0.100%, a large number of fine W carbides precipitate, a rise in strength and drop in ductility of the steel material are invited, and the cold workability falls. For this reason, the upper limit is 0.100% or less. More preferably, the content is 0.002% to 0.080%.

(Ta: 0.100% or Less)

Ta also, like Nb, V, and W, is an element effective for control of the morphology of carbides and increase of the strength and is added in accordance with need. If adding Ta, with less than 0.001%, the effect is not obtained, so the lower limit is 0.001% or more. On the other hand, if over 0.100%, a large number of fine Ta carbides precipitate, a rise in strength and drop in ductility of the steel material are invited, and the cold workability falls. For this reason, the upper limit is 0.100% or less. More preferably, the content is 0.002% to 0.080%.

(Ni: 0.500% or Less)

Ni is an element effective for improvement of the wear resistance of a part and is added in accordance with need. If adding Ni, to enable the effect to be effectively manifested, inclusion of 0.001% or more is preferable. On the other hand, if over 0.500%, the ductility falls and a drop in the cold formability is invited, so the upper limit is 0.500% or less. More preferably, the content is 0.002% to 0.400%.

(Sn: 0.050% or Less)

Sn is an element contained in steel when using scrap as a raw material. The smaller the content, the more preferable. 0% is also possible. However, reduction to less than 0.001% invites an increase in refining costs, so if Sn is contained, the lower limit is 0.001% or more. Further, with a content over 0.050%, ferrite embrittlement causes a drop in the cold formability, so the upper limit is 0.050% or less. More preferably, the content is 0.001% to 0.040%.

(Sb: 0.050% or Less)

Sb, like Sn, is an element contained in the case of using scrap as a raw material of the steel. Sb strongly segregates at the grain boundaries and invites embrittlement of the grain boundaries and a drop in ductility, so the smaller the content, the more preferable. 0% is also possible. However, reduction to less than 0.001% invites an increase in refining costs, so if Sb is contained, the lower limit is 0.001% or more. Further, with a content over 0.050%, a drop in the cold formability is caused, so the upper limit is 0.050% or less. More preferably, the content is 0.001% to 0.040%.

(As: 0.050% or Less)

As, like Sn and Sb, is an element contained in the case of using scrap as a raw material of the steel and strongly segregates at the grain boundaries. The smaller the content, the more preferable. 0% is also possible. However, reduction to less than 0.001% invites an increase in refining costs, so if As is contained, the lower limit is 0.001% or more. Further, with a content over 0.050%, a drop in the cold formability is caused, so the upper limit is 0.050% or less. More preferably, the content is 0.001% to 0.040%.

(Mg: 0.0500% or Less)

Mg is an element able to control the morphology of sulfides by addition in a trace amount and is added in accordance with need. If adding Mg, with less than 0.0001%, that effect cannot be obtained, so the lower limit is 0.0001% or more. On the other hand, if excessively adding it, coarse inclusions are formed and consequently a drop in the cold formability is caused, so the upper limit is 0.0500%. More preferably, the content is 0.0005% to 0.0400%.

(Ca: 0.050% or Less)

Ca, like Mg, is an element able to control the morphology of sulfides by addition in a trace amount and is added in accordance with need. If adding Ca, with less than 0.001%, that effect cannot be obtained, so the lower limit is 0.001% or more. On the other hand, if excessively adding it, coarse Ca oxides are formed and act as the starting points of fracture at the time of cold forming, so the upper limit is 0.050%. More preferably, the content is 0.001% to 0.040%.

(Y: 0.050% or Less)

Y, like Mg and Ca, is an element able to control the morphology of sulfides by addition in a trace amount and is added in accordance with need. If adding Y, with less than 0.001%, that effect cannot be obtained, so the lower limit is 0.001% or more. On the other hand, if excessively adding it, coarse Y oxides are formed and the cold formability drops, so the upper limit is 0.050%. Preferably, the content is 0.001% to 0.040%.

(Zr: 0.050% or Less)

Zr, like Mg, Ca, and Y, is an element able to control the morphology of sulfides by addition in a trace amount and is added in accordance with need. If adding Zr, with less than 0.001%, that effect cannot be obtained, so the lower limit is 0.001% or more. On the other hand, if excessively adding it, coarse Zr oxides are formed and the cold formability drops, so the upper limit is 0.050%. Preferably, the content is 0.001% to 0.040%.

(La: 0.050% or Less)

La is an element effective for control of the morphology of sulfides by addition in a trace amount and is added in accordance with need. If adding La, with less than 0.001%, that effect cannot be obtained, so the lower limit is 0.001% or more. On the other hand, if adding over 0.050%, La oxides are formed and a drop in the cold formability is invited, so the upper limit is 0.050%. More preferably, the content is 0.001% to 0.040%.

(Ce: 0.050% or Less)

Ce, like La, is an element able to control the morphology of sulfides by addition in a trace amount and an element strongly precipitating at the grain boundaries and inviting a drop in the number ratio of grain boundary carbides and is added in accordance with need. If adding Ce, with less than 0.001%, that effect cannot be obtained, so the lower limit is 0.001% or more. On the other hand, if adding over 0.050%, the number ratio of grain boundary carbides falls and consequently a drop in the workability is invited, so the upper limit is 0.050%. More preferably, the content is 0.001% to 0.046%.

Further, the reasons for limiting the chemical ingredients optimal for the steel sheet of the inner layer will be explained. Here, the "%" of the constituents means mass %.

(C: 0.001 to 0.200%)

C is an element effective for strengthening steel. To control the average micro-Vickers hardness of the inner layer to 80 HV or more, addition of 0.001% or more becomes necessary, so the lower limit is 0.001%. On the other hand, if exceeding 0.200%, an excessive increase in strength of the inner layer or formation of carbides is invited and the cold formability falls. For this reason, the upper limit is 0.200% or less. Preferably the content is 0.002% to 0.19%.

(Mn: 0.20 to 3.00%)

Mn is an element which acts as a deoxidant and further is effective for control of the strength of steel. If less than 0.20%, in the solidification process at the time of continuous casting, solidification starts from a high temperature. Along with this, segregation at the center part is aggravated. Further, at the time of cold forming, cracks are formed from this center segregated part and the cold formability falls, so the lower limit is 0.20% or more. On the other hand, if over 3.00%, an excessive increase in strength is invited and the cold formability deteriorates. For this reason, the upper limit is 3.00% or less. Preferably, the content is 0.30% to 2.6%.

The inner layer may contain Si, P, and S in addition to the above C and Mn and furthermore may optionally contain Al, N, Cr, Mo, O, Ti, B, Nb, V, Cu, W, Ta, Ni, Sn, Sb, As, Mg, Ca, Y, Zr, La, and Ce. The ranges of addition and the effects are the same as for the hard layer.

In the hard layer and the inner layer of the steel sheet of the present invention, the balance of chemical ingredients other than the above consists of Fe and unavoidable impurities, but other elements may also be contained in trace amounts so long as not hindering the effect of the present invention.

The steel sheet of the present invention realizes both excellent cold formability and wear resistance by being provided with an inner layer and a hard layer on one or both surfaces of the inner layer, giving the hard layer and the inner layer predetermined compositions, making the thickness of each hard layer 20 μm or more and ⅖ of the total sheet thickness or less, making the average micro-Vickers hardness of the hard layer 400 HV or more and less than 700 HV, making the N amount of the hard layer 0.02% or less, making the average micro-Vickers hardness of the inner layer 80 HV or more and less than 400 HV, making the volume ratio of carbides contained in the inner layer less than 2.00%, and making the nanohardness standard deviation of the hard layer 2.00 or less. This is a new discovery found by the inventors.

Next, the method of examination and measurement of the structure will be explained.

The volume ratio of carbides is measured by the electrolytic extraction residue method. The steel material is placed on electrodes made of platinum and serving also as the sample support table, then this immersed in an electrolytic solution. A potential whereby only the carbides remain undissolved is applied. A 0.1 μm mesh is used to obtain the residue of carbides. The volume ratio of the carbides present in the steel is found from the weight of the sample used for the electrolytic extraction and the amount of residue of the carbides.

The structure is examined by a scan type electron microscope. Before examination, the sample for structural examination is wet polished by emery paper and polished by diamond abrasives having 1 μm average particle size. The examined surface was polished to a mirror finish, then a 3% nitric acid alcohol solution was used to etch the structures. The magnification of the examination was made 3000×. Ten 30 μm×40 μm fields at the thickness ¼ positions from the surface sides of the hard layer and the inner layer were randomly captured. The ratios of the structures were found by the point count method. In the obtained structural images, lattice points arrayed at intervals of a vertical 3 μm and horizontal 4 μm were set at a total of 100 points. The structures present under the lattice points were judged and the ratios of the structures contained in the steel material were found from the average value of the 10 images.

The average micro-Vickers hardness of the steel sheet is found by measuring the 0.098 N micro-Vickers hardnesses at ¼ thickness positions from the surface sides of the hard layer and the inner layer at respectively 12 points and determining the average values of 10 points while discarding the hardest data and the softest data. With a load of 0.098 N, the diagonal length of the dent in the case of 400 HV is about 7 μm and the length in the case of 700 HV is about 5 μm. The hardness of the hard layer having a 20 μm or so thickness can be suitably evaluated.

The nanohardness standard deviation of the hard layer has to be found from the hardness on a line vertical to the sheet thickness direction at a certain sheet thickness cross-section and parallel to the rolling direction. In the present invention, the "nanohardness standard deviation of the hard layer" means the standard deviation of a fitting curve when measuring the nanohardness at 100 locations at intervals of 3 μm in the rolling direction at the ¼ position of thickness of the hard layer from the surface side of the hard layer using a tribo-900 made by Hysitron under conditions of a pushed in depth of 80 nm by a Berkovich shape diamond indenter, preparing a histogram from the obtained hardness data, and approximating the histogram by normal distribution.

Next, the method of evaluation of the cold formability will be explained. A sample was given 90° bending by roll forming with an inside bending radius of 4 mm, then the presence of any cracks at the bent corner part was checked for by examination of the cross-sectional structure. The sample was buried in epoxy resin, then roughly polished by wet polishing by emery paper, then the sample cross-section was finished to a mirror surface by polishing using 3 μm and 1 μm size diamond particles. Next, without etching, the sample was examined in its cross-sectional structure by an optical microscope by a magnification of 1000×. In the case where the lengths of the fractures and cracks observed were less than 5 μm, the sample was judged as excellent in cold workability and marked as "good". Further, in the case where the lengths of the fractures and cracks observed were 5 μm or more, the sample was judged as poor in cold formability and marked as "poor".

Further, the method of evaluating the wear resistance will be explained. The wear resistance of a sample was evaluated by a block on ring test. SUJ2 was worked into the shape of a ring test piece. This was held in a furnace controlled to a nitrogen 95% atmosphere at 840° C. for 50 minutes, then was hardened in 60° C. oil. The hardened sample as held at 180° C. for 60 minutes, then air-cooled for tempering to fabricate a ring test piece. Each evaluation sample was tested as a block test piece under conditions of a slip speed of 0.6 m/s, oil temperature of 140° C., load of 5000 N, and slip distance of 10000 m. The change in weight of the block test piece before and after the test was measured. In the case of a loss of within 3.0 mg, the sample was judged as excellent in wear resistance, while in the case of a loss of over 3.0 mg, the sample was judged as poor in wear resistance.

Next, the method for producing the steel sheet of the present invention will be explained. The following explanation is intended to illustrate the characteristic method for producing the steel sheet of the present invention and is not meant to limit the steel sheet of the present invention to a multilayer steel sheet obtained by bonding the inner layer and hard layer such as explained below. For example, it is also possible to produce the steel sheet provided with the inner layer and hard layer in the present invention by treating the surface of one steel sheet and hardening the surface layer part of that at the time of manufacture of steel strip. By hardening the surface layer part by surface treatment at the time of manufacture of steel strip in this way, it is possible to solve the problem of the drop in dimensional accuracy due to heat treatment strain caused when treating the surface after forming a part.

The method for producing the steel sheet of the present invention is characterized by attaching a hard layer excellent in wear resistance to one or both surfaces of an inner layer which is soft and excellent in cold workability and controlling the strengths, constituents, and structures of these hard layer and the inner layer to the optimum states. Further, such a method of production may include, but is not particularly limited to, for example, the diffusion heat treatment method using a blank of thin steel sheet, and hot rolling, annealing for cold rolled sheet and plating using slabs comprised of various types of steel of the hard layer and inner layer joined by electrical resistance welding, etc. The specific features of these methods of production are as follows:

First, the method for producing a steel material by the diffusion heat treatment method using a blank of thin steel sheet will be explained.

Thin steel sheets corresponding to a hard layer and inner layer adjusted to predetermined constituents and shapes and produced by the electric furnace or blast furnace method are used. The bonding faces of the hard layer and the inner layer are pickled to remove oxides. The surfaces of the bonding surfaces are polished by #50 to #1000 grindstones or polishing paper, then are ultrasonically washed to remove dirt, then are superposed. A load is applied from the top surface and the stack is inserted into a heating furnace.

The thicknesses of the materials used for the hard layer and inner layer used for bonding are preferably 0.1 mm or more. If less than 0.1 mm, the residual stress introduced into the materials by the polishing step after pickling results in warping and gaps when inserting the materials into the heating furnace and sometimes causes the hard layer and the inner layer to not be bonded with a sufficient strength. For this reason, the respective thicknesses are preferably 0.1 mm or more. On the other hand, there is no upper limit on the thicknesses of the materials. Even if 100 mm or more, from a bonding viewpoint, there is no technical problem except for the increase in the weight of the materials and higher difficulty of the work.

In the polishing step, a #50 to #1000 grindstone or polishing paper is preferably used. If less than #50, the surface roughnesses of the materials are high and at the time of diffusion heat treatment, the contact between the hard layer and the inner layer is insufficient, so sometimes sufficient bonding strength cannot be obtained after heat treatment. For this reason, the lower limit of the number of the grindstone or polishing paper used for polishing is preferably #50. Further, if using over #1000 number grindstone or polishing paper to polish the materials of the hard layer and the inner layer, skilled technique is demanded for finishing the polished surfaces flat and the work efficiency falls. In addition, even if using #1000 or higher number abrasive for polishing, no remarkable improvement in the bonding strength can be recognized so the upper limit of the abrasive number used for polishing is preferably #1000. More preferably, it is #80 to #600.

The temperature of the heating furnace is preferably 800° C. to 1300° C. If the temperature of the heating furnace is less than 800° C., diffusion of elements between the hard layer and the inner layer is insufficient and a sufficient bonding strength cannot be obtained, so the lower limit of the heating temperature is preferably 800° C. or more. On the other hand, if the heating temperature exceeds 1300° C., oxygen excessively penetrates the gap between the hard layer and the inner layer and forms coarse oxides between the hard layer and the inner layer, so the bonding strength falls. For this reason, the upper limit of the heating temperature is preferably 1300° C. or less. More preferably, it is 850° C. to 1200° C.

The holding time in the heating furnace is preferably 15 minutes to 300 minutes. With a holding time of less than 15 minutes, sufficient bonding strength cannot be obtained between the hard layer and the inner layer, so the lower limit is preferably 15 minutes or more. On the other hand, with holding exceeding 300 minutes, oxides are formed between the hard layer and the inner layer and the bonding strength falls, so the upper limit of the holding time is preferably 300 minutes or less. More preferably, it is 30 minutes to 180 minutes.

At the stage of insertion and holding in the heating furnace, the surface pressure applied to the material is preferably 10 MPa or more. With a surface pressure of less than 10 MPa, a sufficient bonding strength cannot be obtained, so the lower limit of the surface pressure is preferably 10 MPa or more. The higher the surface pressure, the more preferable. For example, a surface pressure of 200 MPa or so may be given.

Next, the method of producing a steel strip satisfying the requirements of the present invention using a slab having a hard layer stacked over an inner layer and treating this by the steps of hot rolling or hot rolling, pickling, cold rolling, and annealing will be explained.

The method for producing the multilayer slab is not particularly limited. For example, either the continuous casting method or slab welding method may be used. In the continuous casting method, a casting machine provided with two tundishes is used. First an inner layer side casting positioned at the center part is produced, then molten steel corresponding to the hard layer and with constituents different from the inner layer side is poured from the second tundish so as to cover the inner layer side casting. The assembly is continuously solidified to obtain a multilayer state slab. Alternatively, in the slab welding method, slabs cast to predetermined compositions or a roughly rolled materials produced from slabs are polished at the bonding surfaces by machine scarfing etc., then are washed by acid and alcohol to remove the oxides and contaminants and then stacked. Furthermore, the top and bottom surfaces of this multilayer slab are sandwiched between high temperature slabs just finished being cast so as to promote diffusion bonding by heat from the high temperature slabs.

A slab prepared by the method illustrated above is used to produce a multilayer steel strip by a usual hot rolling step.

Features of hot rolling: The above-mentioned slab is hot rolled as it is after continuous casting or while hot rolled after being cooled once, then heated. At the latter time, it is heated to 1100° C. to 1300° C. for 15 minutes to 300 minutes, then the finish hot rolling is ended at the 650° C. to 950° C. temperature region. The finish rolled steel strip is cooled on a ROT, then coiled in the 700° C. or less temperature range to obtain a hot rolled coil. Below, the method for producing the steel sheet of the present invention will be explained in detail.

The heating temperature of the slab is 1100° C. to 1300° C. If the heating temperature exceeds 1300° C. or the heating time exceeds 300 minutes, remarkable oxidation proceeds between the hard layer and the inner layer, and the hard layer and the inner layer more easily peel apart, so a drop in the wear resistance and a drop in the cold formability are caused. For this reason, preferably the upper limit of the heating temperature is 1300° C. or less and upper limit of the soaking time is 300 minutes or less. Preferably the heating temperature is 1250° C. or less and the soaking time is 270 minutes or less.

Further, if the slab heating temperature exceeds 1300° C. or the heating time exceeds 300 minutes, the austenite particles in the slab become mixed and the variation in particle size becomes greater. This variation in particle size of austenite is carried over even in the subsequent hot rolling and cold rolling and annealing. Further, the particle size affects the phase transformation, so causes variations in the structures and hardness inside the steel sheet. Therefore, if the slab heating temperature exceeds 1300° C. or the heating time exceeds 300 minutes, the nanohardness standard deviation exceeds 2.00. On the other hand, if the slab heating temperature is less than 1100° C. or the heating time is less than 15 minutes, it becomes difficult to eliminate the segregation of elements occurring during casting. This segregation of elements is carried over even in the subsequent hot rolling and cold rolling and annealing. Segregation of elements affects the phase transformation behavior, so causes variations in the structures and hardness inside the steel sheet. Therefore, if the slab heating temperature is less than 1100° C. or the heating time is less than 15 minutes, the nanohardness standard deviation exceeds 2.00.

The finish hot rolling is ended at 650° C. to 950° C. If the finish hot rolling temperature is less than 650° C., due to the increase of the deformation resistance of the steel material, the rolling load remarkably rises and further sometimes an increase in the amount of roll wear is invited and a drop in productivity is caused. For this reason, the lower limit is 650° C. or more. Further, if the finish hot rolling temperature exceeds 950° C., flaws caused by the thick scale formed while passing through the ROT are formed on the steel sheet surface and a drop in the wear resistance is caused. For this reason, the upper limit is 950° C. or less. More preferably, it is 800° C. to 930° C.

The cooling rate of the steel strip at the ROT after finish hot rolling is preferably 10° C./s to 100° C./s. With a cooling rate of less than 10° C./s, it is not possible to prevent the formation of thick scale in the middle of cooling and the occurrence of flaws due to the same, and a drop in the surface appearance is invited. For this reason, the lower limit is preferably made 10° C./s or more. Further, if cooling the steel strip from the surface to the inside of the steel sheet by a cooling rate exceeding 100° C./s, the surfacemost layer is excessively cooled and bainite, martensite, and other low temperature transformed structures are formed. When paying out a coil cooled to room temperature after coiling, fine cracks form at the above-mentioned low temperature transformed structures. It is difficult to remove these cracks even in the succeeding pickling step. These cracks become starting points of fracture and cause fracture of the steel strip in production and a drop in productivity. For this reason, the upper limit is preferably made 100° C./s or less. The cooling rate defined above indicates the cooling ability obtained from the cooling facilities between the spray zones from the point of time when the finish hot rolled steel strip is water cooled in a spray zone after passing through a non-spray zone to the point of time when it is cooled on the ROT to the target temperature of coiling. It does not show the average cooling rate from the spray start point to the temperature of coiling by the coiling machine. More preferably, it is 20° C./s to 90° C./s.

The coiling temperature is 700° C. or less. If the coiling temperature exceeds 700° C., after hot rolling, the predetermined strengths cannot be secured at the hard layer and the inner layer after hot rolling. In addition, formation of a large amount of carbides is invited at the inner layer part and a drop in the cold formability is caused. For this reason, the upper limit of the coiling temperature is 700° C. or less. Further, to increase the strength of the hard layer, the lower the coiling temperature, the more preferable, but if applying deep cooling (sub zero) of a temperature lower than room temperature, sometimes the hot rolled sheet becomes remarkably brittle, so the lower limit of the coiling temperature is preferably 0° C. or more. More preferably, it is 10° C. to 680° C.

Further, by pickling the above mentioned hot rolled steel strip and performing cold rolling and annealing for cold rolled sheet or cold rolling and annealing for cold rolled sheet after annealing for hot rolled sheet, it is also possible to produce cold rolled steel strip excellent in both cold formability and wear resistance.

Pickling step: The type of the acid used in the pickling step is not particularly prescribed. The purpose of the pickling is the removal of the oxide scale formed on the surface of the steel strip after hot rolling. Either hydrochloric acid pickling or sulfuric acid pickling may be performed. Furthermore, to promote pickling, it is possible to add a chemical pickling promoter into the pickling solution or to adjust the vibration or tension or apply other mechanical action. Even if doing this, there is no effect at all on the basic art of the present invention.

Cold rolling: The rolling reduction in cold rolling is preferably 20% to 80%. With a rolling reduction of less than 20%, the load applied at each stand of a tandem rolling mill becomes smaller, so obtaining a grasp of and controlling the sheet shape become difficult and a drop in productivity is invited. Further, if the rolling reduction exceeds 80%, the load applied at each stand remarkably increases. Along with this, the Hertz stress occurring at the rolls excessively rises, so a drop in the roll lifetime is invited and a drop in productivity is caused. For this reason, the rolling reduction is preferably 20% to 80%. More preferably, it is 25% to 70%.

Annealing step for hot rolled sheet: Before supplying the hot rolled steel strip for cold rolling, the strip may also be annealed. The purpose of annealing for hot rolled sheet is to secure productivity in cold rolling by softening the steel strip before cold rolling and obtain excellent wear resistance and cold formability in the steel strip after annealing for cold rolled sheet by controlling the ratios of structures at the stage after annealing for hot rolled sheet. As the step of annealing for hot rolled sheet, either the box annealing (BAF) or conventional continuous annealing method (C-CAL) may be used.

The heating rate and cooling rate in the box annealing are preferably 5° C./h to 80° C./h. With a heating rate of less than 5° C./h, the time required for the annealing step for hot rolled sheet increases and a drop in productivity is invited. On the other hand, if the heating rate exceeds 80° C./h, the temperature difference between the inner circumference side and the outer circumference side of the steel strip taken up in a coil rises. Due to slip of the steel strip caused by the difference in heat expansion of this difference, flaws are formed at the surface of the steel strip. These flaws invite a drop in the wear resistance in addition to a drop in the surface appearance of the product. For this reason, the heating rate is preferably 5° C./h to 80° C./h. More preferably, it is 10° C./s to 60° C./s.

Preferably, the annealing temperature in the box annealing is 400° C. to 720° C. and the holding time is 3 hours to 150 hours. With an annealing temperature of less than 400° C. or a holding time of less than 3 hours, the steel strip is not sufficiently softened and there is no effect on improvement of the productivity in cold rolling. Further, if the annealing temperature exceeds 720° C., austenite is formed during the annealing and flaws are caused in the steel strip due to changes due to heat expansion. Furthermore, if the holding time exceeds 150 hours, the surface of the steel strip becomes adhesive and seizing occurs, so the surface appearance falls. For this reason, preferably the annealing temperature in the box annealing is 400° C. to 720° C. and the holding time is 3 hours to 150 hours. More preferably, the annealing temperature is 420° C. to 700° C., while the holding time is 5 hours to 100 hours.

The heating rate and cooling rate in continuous annealing are preferably 5° C./s or more. With a heating rate of less than 5° C./s, a drop in the productivity is invited. On the other hand, there are no upper limits on the heating rate and cooling rate. They may be over 80° C./s as well. More preferably, the rates are 10° C./s or more.

Preferably, the annealing temperature in the continuous annealing is 650° C. to 900° C. and the holding time is 20 seconds to 300 seconds. If the annealing temperature is less than 650° C. or the holding time is less than 20 seconds, with the continuous annealing method, the steel strip is not sufficiently softened and there is no effect of improvement of productivity in the cold rolling. Further, if the annealing temperature exceeds 900° C., the strength of the steel strip remarkably falls, sheet fracture in the furnace is invited, and a drop in productivity is caused. Furthermore, if the holding time exceeds 300 seconds, the impurities in the furnace deposit on the surface of the steel strip and the surface appearance falls. For this reason, the annealing temperature in the continuous annealing is preferably 650° C. to 900° C. and the holding time 20 seconds to 300 seconds. The more preferable annealing temperature is 680° C. to 850° C. and the holding time is 30 seconds to 240 seconds.

Annealing step for cold rolled sheet annealing step: The purpose of annealing for cold rolled sheet is the restoration of the cold formability of the steel strip lost due to cold rolling. By further optimizing the ratios of the structures of ferrite, pearlite, bainite, martensite, and residual austenite, excellent wear resistance and cold formability are obtained. As the annealing step for cold rolled sheet, either the conventional continuous annealing method (C-CAL) or reheat type continuous annealing method (R-CAL) may be used.

The features at the heating and the holding and cooling steps in the conventional continuous annealing method in annealing for cold rolled sheet are as described regarding the continuous annealing of the annealing step for hot rolled sheet.

Preferably, the temperature at the overaging zone in usual continuous annealing is 200° C. to 500° C. and the holding time is 50 seconds to 500 seconds. By making the austenite formed in the stage of the heating transform to bainite or martensite in the overaging zone and suitably controlling the amount and morphology of the residual austenite, an excellent wear resistance and cold formability are obtained. With an aging temperature of less than 200° C. and a holding time of less than 50 seconds, the amount of transformation of bainite becomes insufficient. Further, with an aging temperature of 500° C. or more and a holding time of less than 500 seconds, the amount of residual austenite remarkably falls, so wear resistance and cold formability can no longer be simultaneously obtained. For this reason, preferably the temperature in the overaging zone in usual continuous annealing is 200° C. to 500° C. and the holding time is 50 seconds to 500 seconds. More preferably, the temperature is 250° C. to 450° C. and the holding time is 60 seconds to 400 seconds.

The heating rate and cooling rate in the reheat type continuous annealing are preferably 5° C./s or more. With a heating rate of less than 5° C./s, a drop in the productivity is invited. On the other hand, there are no upper limits on the heating rate and cooling rate. 80° C./s may be exceeded as well. More preferably, the rates are 10° C./s or more.

Preferably, the annealing temperature in reheat type continuous annealing is 700° C. to 900° C. and the holding time is 20 seconds to 300 seconds. If the annealing temperature is less than 700° C. or the holding time is less than 20 seconds, the amount of austenite transforming in continuous annealing is not sufficient and the desired ratios of structures can no longer be controlled to in the subsequent quenching and distribution. Further, if the annealing temperature exceeds 900° C., the strength of the steel strip remarkably falls, sheet fracture in the furnace is invited, and a drop in productivity is caused. Furthermore, if the holding time exceeds 300 seconds, the impurities in the furnace deposit on the surface of the steel strip and the surface appearance falls. For this reason, preferably the annealing temperature in continuous annealing is 700° C. to 900° C. and the holding time is 20 seconds to 300 seconds. More preferably, the annealing temperature is 720° C. to 850° C. and the holding time is 30 seconds to 240 seconds.

Preferably, the cooling stop temperature in reheat type continuous annealing is 100° C. to 340° C. and the holding time is 5 seconds to 60 seconds. In the process of this cooling, part of the austenite is transformed to martensite and the strength of the steel material is increased. If the cooling stop temperature is less than 100° C., the amount of transformation to martensite becomes excessive and the ductility and cold formability of the steel material are impaired. For this reason, the lower limit of the cooling stop temperature is preferably 100° C. or more. If the cooling stop temperature exceeds 340° C. or the holding time is less than 5 seconds, only a small amount of martensite is obtained and it becomes difficult to increase the strength of the steel. Therefore, the upper limit of the cooling stop temperature is 340° C. or less and the lower limit of the holding time is 5 seconds or more. Further, even if holding for over 60 seconds, no large change occurs structurally, so the upper limit of the holding time is preferably 60 seconds. More preferably, the temperature is 150° C. to 320° C. and the holding time is 6 seconds to 50 seconds.

Preferably, the temperature in the overaging zone in reheat type continuous annealing is 350° C. to 480° C. and the holding time is 50 seconds to 500 seconds. In the overaging zone, by using some of the martensite formed at the time of stopping cooling as nuclei and promoting transformation of the balance of austenite to bainite and suitably controlling the amount and morphology of the residual austenite, excellent wear resistance and cold formability are obtained. If the aging temperature is less than 350° C. and the holding time is less than 50° C., the amount of transformation of bainite is insufficient. Further, if the aging temperature is 480° C. or more and the holding time is less than 500 seconds, the amount of residual austenite remarkably falls, so the wear resistance and cold formability can no longer be simultaneously realized. For this reason, the temperature in the overaging zone in reheat type continuous annealing is preferably 350° C. to 480° C. and the holding time is 50 seconds to 500 seconds. The more preferable temperature is 380° C. to 460° C. and the holding time is 60 seconds to 400 seconds.

Further, the modes of the present invention cannot be obtained by the general carburizing, nitriding, soft nitriding, induction surface hardening, etc., in conventional surface reforming. The reason is that with this carburizing, nitriding, soft nitriding, and other heat treatment techniques, excessive penetration of carbon and nitrogen into the surface layer is allowed, so a drop in the cold formability is invited. Further, with the technique of induction surface hardening etc., carbides are left at the center of sheet thickness, so the cold formability falls.

It should be added that even if producing a part using as a material the steel material produced by the diffusion heat treatment method using the above blanks of thin steel sheets or hot rolled steel strips and cold rolled annealed steel strips produced from multilayer slabs and using the hot stamping or other hot forming methods, the effects of the present invention are similarly obtained.

According to the above method for producing a steel sheet, by forming a hard layer with an average micro-Vickers hardness of 400 HV or more and less than 700 HV on the sliding parts of one or both surfaces of a steel sheet and, furthermore, suitably controlling the compositions of the hard layer and the inner layer, making the average micro-Vickers hardness of the inner layer 80 HV or more and less than 400 HV, controlling the volume ratio of carbides contained in the inner layer to less than 2.00%, and, further, controlling the nanohardness standard deviation of the hard layer to 2.00 or less, it is possible to obtain a steel sheet achieving both wear resistance and cold workability at high levels.

From the statements in the Description, the following Modes 1 to 5 may be mentioned as preferable modes of the method for producing the steel sheet of the present invention:

(Mode 1)

A method for producing a steel sheet provided with an inner layer and a hard layer on one or both surfaces of the inner layer, comprising:
  hot rolling a steel slab provided with an inner layer and a hard layer arranged at one or both surfaces of the inner layer to form a steel sheet, wherein the hot rolling comprises finish hot rolling at a 650° C. to 950° C. temperature region, and
  coiling the steel sheet at 700° C. or less, wherein
  the hard layer comprises, by mass %,
  C: 0.08 to 0.40%,
  Si: 0.01 to 3.00%,
  Mn: 1.000 to 10.00%,
  P: 0.0001 to 0.0200%,
  S: 0.0001 to 0.0200%, and
  a balance of Fe and impurities,
  the inner layer comprises, by mass %,
  C: 0.001 to 0.200%,
  Si: 0.01 to 3.00%,
  Mn: 0.20 to 3.00%,
  P: 0.0001 to 0.0200%,
  S: 0.0001 to 0.0200%, and
  a balance of Fe and impurities,
  wherein each hard layer has a thickness of 20 μm or more and ⅖ of the total sheet thickness or less,
  wherein the hard layer has an average micro-Vickers hardness of 400 HV or more and less than 700 HV,
  wherein the hard layer has an N amount of 0.02% or less,
  wherein the inner layer has an average micro-Vickers hardness of 80 HV or more and less than 400 HV,
  wherein the inner layer has a carbide volume ratio of less than 2.00%, and
  wherein the hard layer has a nanohardness standard deviation of 2.00 or less.

(Mode 2)

The method according to the mode 1 further comprising pickling the coiled steel sheet and
  cold rolling and annealing or annealing, cold rolling, and annealing the pickled steel sheet.

(Mode 3)

The method according to the mode 2 further comprising forming coating layers selected from the group consisting of zinc, aluminum, magnesium, and their alloys on both surfaces of the annealed steel sheet.

(Mode 4)

The method according to any one of the modes 1 to 3 wherein
  the hard layer further comprises, by mass %, one or more of
  Al: 0.500% or less,
  N: 0.0200% or less,
  Cr: 2.000% or less,
  Mo: 1.000% or less,
  O: 0.0200% or less,
  Ti: 0.500% or less, and
  B: 0.0100% or less and
  the inner layer further comprises, by mass %, one or more of
  Al: 0.500% or less,
  N: 0.0200% or less,
  Cr: 2.000% or less,
  Mo: 1.000% or less,
  O: 0.0200% or less,
  Ti: 0.500% or less, and
  B: 0.0100% or less.

(Mode 5)

The method according to any one of the modes 1 to 4 wherein the hard layer further comprises, by mass %, one or more of Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less and the inner layer further comprises, by mass %, one or more of Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less.

EXAMPLES

Next, examples will be used to explain the advantageous effects of the present invention.

The levels of the examples are illustrations of the conditions employed for confirming the workability and effects of the present invention. The present invention is not limited to this illustration of conditions. The present invention is assumed to be able to employ various conditions so long as not departing from the gist of the present invention and achieving the object of the present invention.

Constituents (mass %)

TABLE 1-1

| No | C | Si | Mn | P | S | Al | N | Cr | Mo | O | Ti | B | Nb | V |
|---|---|---|---|---|---|---|---|---|---|---|---|---|---|---|
| A | 0.234 | 0.25 | 1.25 | 0.0034 | 0.0008 | 0.047 | 0.0045 | 0.201 | 0.043 | 0.003 | 0.029 | 0.0002 | 0.006 | 0.024 |
| B | 0.326 | 1.62 | 3.06 | 0.0092 | 0.0008 | 0.008 | 0.0151 | 0.056 | 0.042 | 0.0007 | 0.033 | 0.0013 | 0.035 | 0.026 |
| C | 0.307 | 0.21 | 1.73 | 0.0103 | 0.0071 | 0.021 | 0.0082 | 0.232 | 0.043 | 0.0044 | 0.002 | 0.0023 | 0.033 | 0.017 |
| D | 0.198 | 1.64 | 2.32 | 0.0147 | 0.0099 | 0.006 | 0.0036 | 0.051 | 0.033 | 0.0014 | 0.018 | 0.0016 | 0.011 | 0.035 |
| E | 0.082 | 0.45 | 2.27 | 0.0109 | 0.0088 | 0.023 | 0.0067 | 0.423 | 0.02 | 0.0029 | 0.021 | 0.0012 | 0.03 | 0.025 |
| F | 0.001 | 0.03 | 0.22 | 0.0113 | 0.0039 | 0.039 | 0.0013 | 0.014 | 0.048 | 0.0012 | 0.002 | 0.0021 | 0.027 | 0.03 |
| G | 0.453 | 0.24 | 0.61 | 0.0049 | 0.0002 | 0.044 | 0.0095 | 0.037 | 0.003 | 0.0004 | 0.013 | 0.0004 | 0.001 | 0.008 |
| H | 0.006 | 0.87 | 2.05 | 0.01871 | 0.017 | 0.003 | 0.0042 | 0.087 | 0.982 | 0.0088 | 0.084 | 0.0019 | 0.107 | 0.006 |
| I | 0.011 | 1.62 | 1.57 | 0.0028 | 0.0087 | 0.049 | 0.0191 | 0.406 | 0.181 | 0.0018 | 0.482 | 0.0031 | 0.241 | 0.171 |
| J | 0.014 | 0.49 | 0.48 | 0.0003 | 0.0004 | 0.18 | 0.0124 | 1.457 | 0.013 | 0.0145 | 0.238 | 0.0004 | 0.052 | 0.328 |
| K | 0.017 | 2.81 | 2.93 | 0.0131 | 0.0019 | 0.369 | 0.0052 | 0.953 | 0.455 | 0.0045 | 0.114 | 0.0055 | 0.468 | 0.482 |
| L | 0.036 | 1.18 | 0.22 | 0.0073 | 0.0041 | 0.021 | 0.0011 | 0.05 | 0.063 | 0.0011 | 0.032 | 0.0012 | 0.073 | 0.093 |
| M | 0.048 | 0.24 | 1.07 | 0.0113 | 0.0191 | 0.092 | 0.0029 | 1.922 | 0.257 | 0.0023 | 0.085 | 0.0088 | 0.034 | 0.053 |
| N | 0.071 | 0.65 | 2.44 | 0.0164 | 0.0128 | 0.018 | 0.0064 | 0.202 | 0.081 | 0.0007 | 0.118 | 0.0009 | 0.016 | 0.027 |
| O | 0.082 | 2.35 | 2.71 | 0.0061 | 0.0021 | 0.024 | 0.0004 | 0.13 | 0.105 | 0.0009 | 0.009 | 0.0049 | 0.173 | 0.118 |
| P | 0.101 | 1.72 | 1.07 | 0.0171 | 0.0007 | 0.006 | 0.0034 | 0.06 | 0.204 | 0.0195 | 0.086 | 0.0012 | 0.009 | 0.406 |
| Q | 0.11 | 1.97 | 2.17 | 0.0124 | 0.0038 | 0.396 | 0.0105 | 1.938 | 0.561 | 0.0041 | 0.19 | 0.0027 | 0.076 | 0.211 |
| R | 0.124 | 0.92 | 2.92 | 0.0086 | 0.0073 | 0.288 | 0.0071 | 0.103 | 0.082 | 0.0112 | 0.162 | 0.0092 | 0.337 | 0.134 |
| S | 0.125 | 0.48 | 1.68 | 0.0031 | 0.0152 | 0.197 | 0.0047 | 0.561 | 0.814 | 0.0016 | 0.083 | 0.0014 | 0.481 | 0.062 |
| T | 0.137 | 2.94 | 1.88 | 0.0194 | 0.0112 | 0.096 | 0.0088 | 1.549 | 0.015 | 0.0052 | 0.417 | 0.0004 | 0.042 | 0.083 |
| U | 0.158 | 0.06 | 1.24 | 0.0007 | 0.0014 | 0.468 | 0.0039 | 0.993 | 0.031 | 0.0011 | 0.028 | 0.0023 | 0.038 | 0.016 |
| V | 0.167 | 0.62 | 1.18 | 0.0145 | 0.0184 | 0.047 | 0.0168 | 0.737 | 0.049 | 0.0007 | 0.136 | 0.0065 | 0.041 | 0.044 |
| W | 0.183 | 1.16 | 1.63 | 0.0089 | 0.0056 | 0.025 | 0.0144 | 0.044 | 0.364 | 0.0026 | 0.278 | 0.0016 | 0.026 | 0.033 |
| X | 0.199 | 1.42 | 2.2 | 0.0063 | 0.01 | 0.037 | 0.0057 | 0.058 | 0.035 | 0.0014 | 0.051 | 0.0009 | 0.062 | 0.009 |
| Y | 0.203 | 1.13 | 7.57 | 0.0192 | 0.0186 | 0.179 | 0.0186 | 1.588 | 0.638 | 0.015 | 0.382 | 0.002 | 0.085 | 0.458 |
| Z | 0.216 | 0.18 | 1.06 | 0.0104 | 0.0048 | 0.411 | 0.0095 | 0.907 | 0.16 | 0.0029 | 0.183 | 0.0012 | 0.012 | 0.034 |
| AA | 0.237 | 0.43 | 1.57 | 0.0009 | 0.0024 | 0.281 | 0.0008 | 1.992 | 0.967 | 0.0074 | 0.016 | 0.0063 | 0.416 | 0.053 |
| AB | 0.247 | 1.94 | 2.34 | 0.0037 | 0.0083 | 0.086 | 0.0049 | 0.364 | 0.372 | 0.0196 | 0.098 | 0.0038 | 0.153 | 0.015 |
| AC | 0.254 | 2.03 | 4.26 | 0.0135 | 0.0124 | 0.015 | 0.0127 | 0.26 | 0.043 | 0.0011 | 0.452 | 0.0003 | 0.287 | 0.084 |
| AD | 0.274 | 0.77 | 2.67 | 0.0161 | 0.0057 | 0.027 | 0.0028 | 0.192 | 0.077 | 0.0043 | 0.056 | 0.0093 | 0.101 | 0.338 |
| AE | 0.302 | 2.24 | 9.82 | 0.0052 | 0.0195 | 0.071 | 0.0017 | 0.104 | 0.019 | 0.0008 | 0.034 | 0.0008 | 0.078 | 0.003 |
| AF | 0.317 | 1.37 | 6.28 | 0.008 | 0.0152 | 0.039 | 0.0161 | 0.015 | 0.034 | 0.0021 | 0.333 | 0.0016 | 0.032 | 0.152 |
| AG | 0.325 | 2.88 | 2.42 | 0.0114 | 0.0076 | 0.023 | 0.0069 | 0.181 | 0.056 | 0.0028 | 0.118 | 0.0023 | 0.015 | 0.488 |
| AH | 0.344 | 1.08 | 1.98 | 0.0133 | 0.0104 | 0.038 | 0.0046 | 0.331 | 0.006 | 0.0018 | 0.081 | 0.0013 | 0.06 | 0.275 |
| AI | 0.359 | 1.75 | 1.68 | 0.0067 | 0.0008 | 0.478 | 0.0058 | 0.048 | 0.024 | 0.0044 | 0.046 | 0.0016 | 0.009 | 0.038 |
| AJ | 0.371 | 0.83 | 2.01 | 0.0164 | 0.004 | 0.024 | 0.0031 | 0.017 | 0.019 | 0.0026 | 0.016 | 0.0025 | 0.021 | 0.072 |
| AK | 0.392 | 2.51 | 1.78 | 0.0102 | 0.0055 | 0.018 | 0.0043 | 0.098 | 0.015 | 0.0031 | 0.028 | 0.0018 | 0.038 | 0.098 |

TABLE 1-2

| No | C | Si | Mn | P | S | Al | N | Cr | Mo | O | Ti | B | Nb | V |
|---|---|---|---|---|---|---|---|---|---|---|---|---|---|---|
| AL | 0.412 | 2.49 | 1.97 | 0.0128 | 0.0089 | 0.092 | 0.0042 | 0.298 | 0.07 | 0.0035 | 0.013 | 0.001 | 0.016 | 0.002 |
| AM | 0.000 | 0.94 | 2 | 0.0143 | 0.0083 | 0.075 | 0.0074 | 0.022 | 0.005 | 0.0015 | 0.004 | 0.0022 | 0.012 | 0.022 |
| AN | 0.186 | 3.08 | 1.39 | 0.01 | 0.0005 | 0.03 | 0.0046 | 0.377 | 0.078 | 0.0024 | 0.025 | 0.0001 | 0.011 | 0.011 |
| AO | 0.136 | 2.19 | 10.15 | 0.0139 | 0.0085 | 0.004 | 0.0131 | 0.162 | 0.058 | 0.0042 | 0.022 | 0.0002 | 0.021 | 0.015 |

-continued

| | Constituents (mass %) | | | | | | | | | | | | |
|---|---|---|---|---|---|---|---|---|---|---|---|---|---|
| AP | 0.223 | 1.17 | 10.57 | 0.0102 | 0.0071 | 0.065 | 0.0125 | 0.204 | 0.019 | 0.0027 | 0.016 | 0.0008 | 0.025 | 0.003 |
| AQ | 0.157 | 0.81 | 0.17 | 0.0062 | 0.0056 | 0.029 | 0.0094 | 0.481 | 0.04 | 0.0034 | 0.03 | 0.0022 | 0.031 | 0.032 |
| AR | 0.042 | 0.33 | 0.15 | 0.0111 | 0.0081 | 0.072 | 0.0145 | 0.465 | 0.037 | 0.0028 | 0.033 | 0.0016 | 0.027 | 0.032 |
| AS | 0.17 | 0.66 | 0.92 | 0.0097 | 0.002 | 0.016 | 0.0053 | 0.045 | 0.001 | 0.0013 | 0.005 | 0.0003 | 0.008 | 0.002 |
| AT | 0.192 | 1.88 | 0.86 | 0.0083 | 0.0067 | 0.07 | 0.0119 | 0.39 | 0.005 | 0.0038 | 0.017 | 0.0004 | 0.004 | 0.032 |
| AU | 0.181 | 1.43 | 1.26 | 0.0209 | 0.0092 | 0.071 | 0.0084 | 0.429 | 0.04 | 0.004 | 0.035 | 0.0003 | 0.018 | 0.013 |
| AV | 0.111 | 2.94 | 0.82 | 0.0097 | 0.0211 | 0.014 | 0.0052 | 0.375 | 0.049 | 0.0012 | 0.005 | 0.0005 | 0.024 | 0.032 |
| AW | 0.188 | 1.45 | 2.86 | 0.0043 | 0.0038 | 0.509 | 0.0064 | 0.007 | 0.005 | 0.0036 | 0.004 | 0.0005 | 0.021 | 0.02 |
| AX | 0.115 | 2.82 | 0.73 | 0.0099 | 0.0027 | 0.064 | 0.0212 | 0.173 | 0.002 | 0.0001 | 0.011 | 0.0001 | 0.008 | 0.022 |
| AY | 0.186 | 0.75 | 0.78 | 0.0007 | 0.0078 | 0.031 | 0.0023 | 2.063 | 0.024 | 0.0024 | 0.024 | 0.0018 | 0.005 | 0.012 |
| AZ | 0.182 | 1.44 | 0.44 | 0.0119 | 0.0022 | 0.058 | 0.0053 | 0.234 | 1.051 | 0.0025 | 0.012 | 0.0017 | 0.007 | 0.019 |
| BA | 0.087 | 1.21 | 0.58 | 0.007 | 0.0089 | 0.028 | 0.0144 | 0.296 | 0.052 | 0.0222 | 0.017 | 0.0023 | 0.021 | 0.029 |
| BB | 0.098 | 1.33 | 0.21 | 0.0075 | 0.0011 | 0.005 | 0.0008 | 0.138 | 0.075 | 0.0017 | 0.517 | 0.0014 | 0.009 | 0.031 |
| BC | 0.099 | 0.71 | 2.21 | 0.0074 | 0.0009 | 0.02 | 0.0065 | 0.063 | 0.011 | 0.0037 | 0.012 | 0.0112 | 0.034 | 0.026 |
| BD | 0.189 | 2.54 | 0.21 | 0.0002 | 0.0033 | 0.016 | 0.008 | 0.186 | 0.072 | 0.0042 | 0.024 | 0.0009 | 0.518 | 0.028 |
| BE | 0.147 | 0.29 | 1.02 | 0.0034 | 0.0016 | 0.032 | 0.0131 | 0.333 | 0.075 | 0.0027 | 0.024 | 0.001 | 0.009 | 0.509 |
| BF | 0.185 | 2.47 | 2.65 | 0.0117 | 0.0073 | 0.049 | 0.0126 | 0.355 | 0.013 | 0.001 | 0.004 | 0.002 | 0.017 | 0.024 |
| BG | 0.156 | 2.65 | 0.82 | 0.0032 | 0.0064 | 0.068 | 0.0123 | 0.442 | 0.004 | 0.0044 | 0.033 | 0.0016 | 0.035 | 0.022 |
| BH | 0.149 | 1.72 | 1.64 | 0.0064 | 0.0098 | 0.011 | 0.0048 | 0.286 | 0.004 | 0.0025 | 0.02 | 0.0014 | 0.007 | 0.013 |
| BI | 0.182 | 0.38 | 1.42 | 0.0123 | 0.0012 | 0.028 | 0.0119 | 0.431 | 0.011 | 0.0006 | 0.014 | 0.001 | 0.024 | 0.002 |
| BJ | 0.127 | 0.08 | 0.4 | 0.0053 | 0.01 | 0.04 | 0.0032 | 0.289 | 0.065 | 0.0015 | 0.005 | 0.001 | 0.026 | 0.025 |
| BK | 0.141 | 1.53 | 2.63 | 0.0056 | 0.0035 | 0.063 | 0.0008 | 0.468 | 0.029 | 0.0009 | 0.023 | 0.0018 | 0.028 | 0.03 |
| BL | 0.157 | 2.4 | 2.34 | 0.0095 | 0.0075 | 0.07 | 0.0089 | 0.48 | 0.002 | 0.0016 | 0.013 | 0.0012 | 0.007 | 0.008 |
| BM | 0.112 | 0.67 | 1.34 | 0.0038 | 0.0055 | 0.07 | 0.0082 | 0.119 | 0.02 | 0.0021 | 0.01 | 0.0005 | 0.032 | 0.017 |
| BN | 0.119 | 2.38 | 1.27 | 0.0138 | 0.0074 | 0.039 | 0.0067 | 0.096 | 0.031 | 0.0002 | 0.028 | 0.0024 | 0.03 | 0.02 |
| BO | 0.151 | 1.63 | 0.92 | 0.0114 | 0.0033 | 0.095 | 0.0012 | 0.337 | 0.008 | 0.0033 | 0.014 | 0.0009 | 0.025 | 0.013 |
| BP | 0.132 | 0.5 | 2.09 | 0.0099 | 0.0013 | 0.084 | 0.0024 | 0.469 | 0.026 | 0.0017 | 0.034 | 0.0003 | 0.029 | 0.012 |
| BQ | 0.129 | 0.5 | 1.9 | 0.0091 | 0.0053 | 0.016 | 0.0058 | 0.187 | 0.05 | 0.0007 | 0.008 | 0.0024 | 0.028 | 0.032 |
| BR | 0.132 | 1.48 | 1.49 | 0.0134 | 0.0081 | 0.04 | 0.0015 | 0.21 | 0.034 | 0.0006 | 0.008 | 0.0001 | 0.008 | 0.015 |

TABLE 1-3

| No | Cu | W | Ta | Ni | Sn | Sb | As | Mg | Ca | Y | Zr | La | Ce |
|---|---|---|---|---|---|---|---|---|---|---|---|---|---|
| A | 0.002 | 0.003 | 0.015 | 0.011 | 0.007 | 0.009 | 0.006 | 0.0039 | 0.003 | 0.002 | 0.005 | 0.001 | 0.004 |
| B | 0.008 | 0.008 | 0.005 | 0.003 | 0.008 | 0.007 | 0.01 | 0.0021 | 0.004 | 0.001 | 0.002 | 0.004 | 0.004 |
| C | 0.016 | 0.011 | 0.004 | 0.013 | 0.008 | 0.008 | 0.002 | 0.0005 | 0.002 | 0.003 | 0.005 | 0.001 | 0.005 |
| D | 0.004 | 0.02 | 0.012 | 0.007 | 0.003 | 0.009 | 0.004 | 0.004 | 0.003 | 0.002 | 0.004 | 0.002 | 0.004 |
| E | 0.003 | 0.016 | 0.015 | 0.001 | 0.005 | 0.001 | 0.01 | 0.0012 | 0.002 | 0.003 | 0.002 | 0.002 | 0.002 |
| F | 0.004 | 0.007 | 0.009 | 0.02 | 0.003 | 0.002 | 0.008 | 0.0012 | 0.003 | 0.002 | 0.003 | 0.003 | 0.002 |
| G | 0.012 | 0.017 | 0.002 | 0.003 | 0.01 | 0.001 | 0.006 | 0.0026 | 0.003 | 0.003 | 0.004 | 0.004 | 0.002 |
| H | 0.029 | 0.015 | 0.06 | 0.024 | 0.025 | 0.047 | 0.002 | 0.0494 | 0.016 | 0.025 | 0.048 | 0.002 | 0.048 |
| I | 0.002 | 0.003 | 0.016 | 0.008 | 0.004 | 0.002 | 0.008 | 0.0042 | 0.002 | 0.008 | 0.006 | 0.012 | 0.03 |
| J | 0.099 | 0.042 | 0.003 | 0.106 | 0.014 | 0.032 | 0.028 | 0.0197 | 0.044 | 0.004 | 0.003 | 0.043 | 0.004 |
| K | 0.195 | 0.092 | 0.034 | 0.215 | 0.002 | 0.007 | 0.004 | 0.0348 | 0.026 | 0.048 | 0.022 | 0.026 | 0.007 |
| L | 0.336 | 0.023 | 0.087 | 0.311 | 0.006 | 0.014 | 0.043 | 0.0023 | 0.006 | 0.005 | 0.011 | 0.005 | 0.016 |
| M | 0.472 | 0.006 | 0.011 | 0.441 | 0.048 | 0.004 | 0.018 | 0.0063 | 0.004 | 0.002 | 0.002 | 0.003 | 0.002 |
| N | 0.221 | 0.008 | 0.004 | 0.245 | 0.002 | 0.003 | 0.005 | 0.0003 | 0.005 | 0.006 | 0.004 | 0.007 | 0.003 |
| O | 0.337 | 0.066 | 0.005 | 0.381 | 0.044 | 0.028 | 0.033 | 0.0389 | 0.01 | 0.013 | 0.002 | 0.035 | 0.022 |
| P | 0.244 | 0.005 | 0.017 | 0.262 | 0.009 | 0.002 | 0.048 | 0.0236 | 0.033 | 0.043 | 0.013 | 0.048 | 0.044 |
| Q | 0.074 | 0.097 | 0.095 | 0.081 | 0.031 | 0.016 | 0.003 | 0.0084 | 0.018 | 0.031 | 0.043 | 0.004 | 0.031 |
| R | 0.136 | 0.041 | 0.002 | 0.156 | 0.005 | 0.004 | 0.006 | 0.0042 | 0.002 | 0.003 | 0.028 | 0.019 | 0.007 |
| S | 0.017 | 0.025 | 0.069 | 0.003 | 0.016 | 0.009 | 0.008 | 0.0482 | 0.047 | 0.006 | 0.004 | 0.0077 | 0.002 |
| T | 0.452 | 0.016 | 0.044 | 0.471 | 0.002 | 0.046 | 0.002 | 0.0023 | 0.004 | 0.011 | 0.003 | 0.002 | 0.005 |
| U | 0.077 | 0.009 | 0.028 | 0.088 | 0.003 | 0.022 | 0.005 | 0.0061 | 0.006 | 0.004 | 0.006 | 0.005 | 0.008 |
| V | 0.195 | 0.006 | 0.009 | 0.177 | 0.007 | 0.006 | 0.009 | 0.0008 | 0.002 | 0.006 | 0.002 | 0.003 | 0.004 |
| W | 0.273 | 0.011 | 0.012 | 0.304 | 0.004 | 0.002 | 0.004 | 0.0072 | 0.007 | 0.002 | 0.004 | 0.01 | 0.005 |
| X | 0.006 | 0.093 | 0.006 | 0.066 | 0.002 | 0.005 | 0.002 | 0.0035 | 0.005 | 0.005 | 0.005 | 0.006 | 0.009 |
| Y | 0.178 | 0.07 | 0.097 | 0.162 | 0.022 | 0.004 | 0.038 | 0.0441 | 0.025 | 0.049 | 0.002 | 0.041 | 0.028 |
| Z | 0.25 | 0.032 | 0.032 | 0.272 | 0.004 | 0.035 | 0.024 | 0.0277 | 0.015 | 0.005 | 0.023 | 0.028 | 0.049 |
| AA | 0.434 | 0.067 | 0.063 | 0.449 | 0.046 | 0.003 | 0.003 | 0.0145 | 0.008 | 0.021 | 0.012 | 0.015 | 0.008 |
| AB | 0.029 | 0.057 | 0.025 | 0.039 | 0.002 | 0.047 | 0.007 | 0.0036 | 0.002 | 0.035 | 0.048 | 0.047 | 0.002 |
| AC | 0.309 | 0.046 | 0.002 | 0.279 | 0.034 | 0.008 | 0.012 | 0.0073 | 0.045 | 0.014 | 0.034 | 0.009 | 0.006 |
| AD | 0.019 | 0.031 | 0.014 | 0.048 | 0.006 | 0.019 | 0.003 | 0.0012 | 0.004 | 0.002 | 0.003 | 0.002 | 0.003 |
| AE | 0.366 | 0.016 | 0.009 | 0.377 | 0.014 | 0.005 | 0.048 | 0.0039 | 0.012 | 0.006 | 0.006 | 0.006 | 0.009 |
| AF | 0.123 | 0.099 | 0.004 | 0.142 | 0.006 | 0.006 | 0.002 | 0.0023 | 0.007 | 0.004 | 0.008 | 0.004 | 0.005 |
| AG | 0.062 | 0.098 | 0.012 | 0.085 | 0.009 | 0.002 | 0.005 | 0.0072 | 0.003 | 0.008 | 0.002 | 0.008 | 0.003 |
| AH | 0.047 | 0.091 | 0.006 | 0.031 | 0.004 | 0.007 | 0.01 | 0.0052 | 0.005 | 0.005 | 0.004 | 0.002 | 0.004 |
| AI | 0.456 | 0.041 | 0.014 | 0.411 | 0.003 | 0.004 | 0.003 | 0.0093 | 0.002 | 0.002 | 0.005 | 0.005 | 0.005 |
| AJ | 0.204 | 0.047 | 0.018 | 0.188 | 0.007 | 0.009 | 0.006 | 0.0043 | 0.008 | 0.006 | 0.002 | 0.003 | 0.002 |
| AK | 0.239 | 0.099 | 0.005 | 0.259 | 0.006 | 0.002 | 0.002 | 0.0016 | 0.011 | 0.003 | 0.007 | 0.006 | 0.008 |

TABLE 1-4

| No | Cu | W | Ta | Ni | Sn | Sb | As | Mg | Ca | Y | Zr | La | Ce |
|---|---|---|---|---|---|---|---|---|---|---|---|---|---|
| AL | 0.027 | 0.012 | 0.015 | 0.059 | 0.005 | 0.01 | 0.005 | 0.0085 | 0.005 | 0.009 | 0.001 | 0.002 | 0.003 |
| AM | 0.015 | 0.015 | 0.002 | 0.02 | 0.009 | 0.005 | 0.009 | 0.0032 | 0.008 | 0.008 | 0.008 | 0.009 | 0.009 |
| AN | 0.02 | 0.008 | 0.003 | 0.06 | 0.006 | 0.009 | 0.003 | 0.0049 | 0.005 | 0.006 | 0.005 | 0.005 | 0.008 |
| AO | 0.006 | 0.016 | 0.007 | 0.153 | 0.001 | 0.01 | 0.006 | 0.0081 | 0.009 | 0.005 | 0.007 | 0.006 | 0.01 |
| AP | 0.03 | 0.009 | 0.016 | 0.177 | 0.009 | 0.007 | 0.004 | 0.0041 | 0.007 | 0.005 | 0.008 | 0.003 | 0.005 |

-continued

| | Constituents (mass %) | | | | | | | | | | | | |
|---|---|---|---|---|---|---|---|---|---|---|---|---|---|
| AQ | 0.013 | 0.011 | 0.016 | 0.059 | 0.002 | 0.009 | 0.007 | 0.0075 | 0.007 | 0.002 | 0.006 | 0.003 | 0.007 |
| AR | 0.034 | 0.001 | 0.015 | 0.168 | 0.002 | 0.007 | 0.006 | 0.0036 | 0.004 | 0.004 | 0.004 | 0.006 | 0.009 |
| AS | 0.024 | 0.019 | 0.01 | 0.069 | 0.007 | 0.007 | 0.01 | 0.0039 | 0.003 | 0.005 | 0.001 | 0.002 | 0.003 |
| AT | 0.008 | 0.009 | 0.015 | 0.042 | 0.003 | 0.009 | 0.003 | 0.002 | 0.004 | 0.004 | 0.01 | 0.001 | 0.007 |
| AU | 0.02 | 0.018 | 0.005 | 0.194 | 0.001 | 0.009 | 0.004 | 0.0061 | 0.006 | 0.009 | 0.008 | 0.007 | 0.008 |
| AV | 0.023 | 0.017 | 0.016 | 0.164 | 0.002 | 0.009 | 0.003 | 0.0053 | 0.002 | 0.008 | 0.003 | 0.003 | 0.003 |
| AW | 0.035 | 0.015 | 0.013 | 0.07 | 0.005 | 0.01 | 0.001 | 0.0071 | 0.003 | 0.002 | 0.001 | 0.003 | 0.008 |
| AX | 0.022 | 0.018 | 0.011 | 0.139 | 0.007 | 0.008 | 0.005 | 0.0081 | 0.005 | 0.005 | 0.004 | 0.009 | 0.009 |
| AY | 0.005 | 0.011 | 0.005 | 0.091 | 0.006 | 0.009 | 0.005 | 0.0036 | 0.003 | 0.006 | 0.008 | 0.002 | 0.005 |
| AZ | 0.028 | 0.009 | 0.012 | 0.2 | 0.002 | 0.004 | 0.008 | 0.007 | 0.006 | 0.003 | 0.002 | 0.009 | 0.009 |
| BA | 0.028 | 0.003 | 0.008 | 0.021 | 0.002 | 0.003 | 0.003 | 0.0019 | 0.002 | 0.009 | 0.01 | 0.005 | 0.003 |
| BB | 0.012 | 0.014 | 0.012 | 0.079 | 0.001 | 0.008 | 0.006 | 0.008 | 0.005 | 0.006 | 0.001 | 0.003 | 0.006 |
| BC | 0.02 | 0.008 | 0.001 | 0.086 | 0.007 | 0.005 | 0.009 | 0.0091 | 0.002 | 0.006 | 0.007 | 0.001 | 0.009 |
| BD | 0.029 | 0.001 | 0.009 | 0.064 | 0.003 | 0.006 | 0.006 | 0.0042 | 0.007 | 0.002 | 0.003 | 0.005 | 0.004 |
| BE | 0.026 | 0.009 | 0.015 | 0.008 | 0.009 | 0.004 | 0.001 | 0.0077 | 0.006 | 0.004 | 0.005 | 0.006 | 0.005 |
| BF | <u>0.537</u> | 0.01 | 0.018 | 0.077 | 0.002 | 0.003 | 0.008 | 0.0099 | 0.002 | 0.008 | 0.001 | 0.01 | 0.009 |
| BG | 0.034 | <u>0.109</u> | 0.013 | 0.195 | 0.009 | 0.001 | 0.006 | 0.0072 | 0.005 | 0.009 | 0.008 | 0.008 | 0.007 |
| BH | 0.026 | 0.017 | <u>0.107</u> | 0.169 | 0.008 | 0.004 | 0.006 | 0.0067 | 0.002 | 0.003 | 0.005 | 0.005 | 0.005 |
| BI | 0.015 | 0.007 | 0.013 | <u>0.516</u> | 0.004 | 0.004 | 0.002 | 0.0082 | 0.001 | 0.004 | 0.004 | 0.001 | 0.009 |
| BJ | 0.026 | 0.02 | 0.019 | 0.191 | <u>0.052</u> | 0.005 | 0.006 | 0.0034 | 0.01 | 0.003 | 0.003 | 0.004 | 0.007 |
| BK | 0.003 | 0.016 | 0.004 | 0.141 | 0.006 | <u>0.055</u> | 0.001 | 0.0089 | 0.006 | 0.003 | 0.008 | 0.007 | 0.007 |
| BL | 0.018 | 0.008 | 0.015 | 0.152 | 0.007 | 0.001 | <u>0.055</u> | 0.0073 | 0.01 | 0.007 | 0.002 | 0.003 | 0.01 |
| BM | 0.025 | 0.01 | 0.009 | 0.085 | 0.008 | 0.004 | 0.008 | <u>0.057</u> | 0.009 | 0.005 | 0.008 | 0.006 | 0.002 |
| BN | 0.025 | 0.016 | 0.013 | 0.029 | 0.008 | 0.006 | 0.002 | 0.0044 | <u>0.057</u> | 0.006 | 0.01 | 0.006 | 0.003 |
| BO | 0.012 | 0.014 | 0.006 | 0.111 | 0.001 | 0.009 | 0.005 | 0.0092 | 0.001 | <u>0.057</u> | 0.01 | 0.001 | 0.004 |
| BP | 0.011 | 0.01 | 0.008 | 0.159 | 0.003 | 0.004 | 0.01 | 0.0043 | 0.01 | 0.01 | <u>0.054</u> | 0.008 | 0.008 |
| BQ | 0.028 | 0.01 | 0.005 | 0.143 | 0.007 | 0.003 | 0.008 | 0.006 | 0.002 | 0.009 | 0.009 | <u>0.056</u> | 0.004 |
| BR | 0.026 | 0.005 | 0.017 | 0.018 | 0.009 | 0.004 | 0.01 | 0.0091 | 0.009 | 0.002 | 0.001 | 0.003 | <u>0.051</u> |

*Bold underlines show not included in suitable range of composition of present invention.

2 mm-thickness hot rolled steel sheets having the compositions of A to F shown in Table 1 were pickled at the top and bottom surfaces. In steel sheets with hard layers bonded to the top and bottom layers, machining was used to finish the thicknesses of the top and bottom layers to 0.4 mm and the thickness of the inner layer to 1.2 mm, then the bonding surfaces were polished by #180 polishing paper and ultrasonically washed to remove dirt. Further, in steel sheets with hard layers only at the top layers, machining was used to finish the thickness of the top layer to 0.4 mm and the thickness of the inner layer to 1.6 mm, then the above-mentioned polishing and washing were performed. Next, the sheets were superposed in the combinations shown in Example Nos. 1 to 24 of Table 2, inserted into a 1000° C. heating furnace in the state with a 0.2 MPa load applied, held there for 120 minutes, then taken out. These were cooled once down to room temperature, then the loads applied to the samples were removed and then the samples were inserted into a 900° C. heating furnace, held there for 20 minutes, then treated to cool them in various ways. In Example Nos. 1 to 7, the samples were quenched in 60° C. oil, in Nos. 8 to 14, they were water cooled, and in Nos. 15 to 21, they were mist cooled. Further, to clarify the difference from conventional heat treatment conditions, in Example Nos. 22 to 24, comparative samples which were treated by various heat treatment such as induction surface hardening, nitriding, and carburizing (carbon potential: 0.37%) to increase the surface hardness were produced. Next, the techniques described previously were used to evaluate the hardness, structure, wear resistance, and cold formability of each sample.

TABLE 2

| Ex. no. | Cooling | Layer configuration | | | Vickers hardness | | | Carbide volume ratio (vol. %) | Wear (mg) | | Roll forming: cracks after cross-section | | | Nano-hardness standard deviation | | TS (MPa) | Remarks |
|---|---|---|---|---|---|---|---|---|---|---|---|---|---|---|---|---|---|
| | | Top | Inside | Bottom | Top | Inside | Bottom | Inside | Top | Bottom | Top | Inside | Bottom | Top | Bottom | | |
| 1 | Oil cooling | F | A | C | <u>127</u> | <u>462</u> | 491 | 0.81 | <u>7.42</u> | 2.39 | Good | <u>Poor</u> | Good | 0.59 | 0.28 | 1085 | Comp. ex. |
| 2 | | G | B | F | 494 | <u>557</u> | <u>129</u> | 0.58 | 2.38 | <u>7.47</u> | <u>Poor</u> | <u>Poor</u> | Good | <u>2.06</u> | 0.53 | 1219 | Comp. ex. |
| 3 | | E | C | G | 431 | <u>478</u> | 499 | 1.73 | 2.72 | 2.35 | Good | <u>Poor</u> | <u>Poor</u> | 0.49 | <u>2.14</u> | 1252 | Comp. ex. |
| 4 | | A | D | E | 450 | 387 | 440 | 0.71 | 2.6 | 2.66 | Good | Good | Good | 1.05 | 0.67 | 1107 | Inv.ex. |
| 5 | | C | E | B | 490 | 366 | 560 | 0.4 | 2.39 | 2.14 | Good | Good | Good | 0.73 | 0.35 | 1152 | Inv.ex. |
| 6 | | B | F | D | 555 | 112 | 513 | 0.01 | 2.16 | 2.3 | Good | Good | Good | 0.77 | 1.4 | 806 | Inv.ex. |
| 7 | | D | G | A | 504 | <u>485</u> | 442 | <u>4.15</u> | 2.33 | 2.65 | Good | <u>Poor</u> | Good | 0.59 | 0.43 | 1269 | Comp. ex. |
| 8 | Water cooling | F | A | F | <u>134</u> | <u>494</u> | <u>133</u> | 0.04 | <u>7.12</u> | <u>7.01</u> | Good | <u>Poor</u> | Good | 1.58 | 1.59 | 967 | Comp. ex. |
| 9 | | A | B | A | 503 | <u>557</u> | 507 | 0.58 | 2.34 | 2.32 | Good | <u>Poor</u> | Good | 1.43 | 1.39 | 1399 | Comp. ex. |

TABLE 2-continued

| Ex. no. | Cooling | Layer configuration | | | Vickers hardness | | | Carbide volume ratio (vol. %) | Wear (mg) | | Roll forming: cracks after cross-section | | | Nano-hardness standard deviation | | TS (MPa) | Remarks |
|---|---|---|---|---|---|---|---|---|---|---|---|---|---|---|---|---|---|
| | | Top | Inside | Bottom | Top | Inside | Bottom | Inside | Top | Bottom | Top | Inside | Bottom | Top | Bottom | | |
| 10 | | D | C | D | 467 | 553 | 473 | 0.28 | 2.5 | 2.47 | Good | Poor | Good | 0.67 | 0.71 | 1361 | Comp. ex. |
| 11 | | E | D | E | 387 | 398 | 386 | 0.1 | 3.24 | 3.26 | Good | Good | Good | 0.21 | 0.25 | 1068 | Comp. ex. |
| 12 | | G | E | G | 735 | 362 | 727 | 0.04 | 1.74 | 1.76 | Poor | Good | Poor | 2.1 | 2.11 | 1337 | Comp. ex. |
| 13 | | B | F | B | 569 | 116 | 560 | 0.01 | 2.11 | 2.14 | Good | Good | Good | 0.91 | 0.97 | 840 | Inv.ex. |
| 14 | | C | G | C | 565 | 707 | 563 | 0.03 | 2.13 | 2.13 | Good | Poor | Good | 1.16 | 1.12 | 1663 | Comp. ex. |
| 15 | Mist cooling | C | A | | 478 | 439 | | | 1.26 | 2.45 | Good | Poor | | 0.62 | | 988 | Comp. ex. |
| 16 | | E | B | | 408 | 561 | | | 0.5 | 2.93 | Good | Poor | | 0.23 | | 1125 | Comp. ex. |
| 17 | | B | C | | 568 | 472 | | | 1.85 | 2.12 | Good | Poor | | 1.27 | | 1076 | Comp. ex. |
| 18 | | F | D | | 130 | 392 | | | 0.02 | 7.11 | | Good | Good | | 0.3 | | 761 | Comp. ex. |
| 19 | | A | E | | 433 | 363 | | | 0.05 | 2.71 | | Good | Good | | 0.89 | | 861 | Inv.ex. |
| 20 | | G | F | | 514 | 113 | | | 0.01 | 2.3 | | Poor | Good | | 2.21 | | 551 | Comp. ex. |
| 21 | | D | G | | 511 | 530 | | | 3.37 | 2.31 | | Good | Poor | | 0.29 | | 1130 | Comp. ex. |
| 22 | Others | Induction | B | Induction | 593 | 163 | 589 | 4.47 | 2.05 | 2.06 | Good | Poor | Good | 0.65 | 1.08 | 930 | Comp. ex. |
| 23 | | Nitriding | F | Nitriding | 632 | 82 | 621 | 0.01 | 1.95 | 1.98 | Poor | Good | Poor | 2.55 | 1.51 | 851 | Comp. ex. |
| 24 | | Carburizing | F | Carburizing | 646 | 72 | 653 | 0.02 | 1.92 | 1.9 | Poor | Poor | Poor | 2.48 | 0.38 | 858 | Comp. ex. |

*Bold underlines show outside scope of present invention.

Table 2 shows the results of evaluation of the samples. It is shown that in all of Example Nos. 4, 5, 6, 13, and 19, the average micro-Vickers hardness of the hard layer was 400 HV or more and less than 700 HV, the amount of C of the hard layer was 0.08 to 0.40% and the amount of N was 0.02% or less, the average Vickers hardness of the inner layer was 80 HV or more and 400 HV or less, the volume ratio of the carbides contained in the inner layer was less than 2%, and the wear resistance and cold formability were excellent.

As opposed to this, in Comparative Example Nos. 1, 8, 11, and 18, the hardness of the top layer was less than 400 HV and the wear resistance fell. In Nos. 1 to 3, 7 to 10, 14 to 17, and 21, the hardness of the inner layer exceeded 400 HV and the cold formability fell. Further, in No. 12, the content of C was high, so the cold formability fell. Furthermore, with the induction surface hardening heat treatment of No. 22, the volume ratio of the carbides remaining at the inner layer exceeded 2% and the cold formability fell. With the nitriding heat treatment of No. 23, the amount of N of the top layer exceeded 0.02%, so the cold formability fell. Further, with the carburizing heat treatment of No. 24, the content of C was high and also the inner layer increasingly softened and the cold formability fell.

Next, to investigate the effects of the thickness of the hard layer, using the combination of Example No. 5 as a base, the thicknesses of the hard layer and the inner layer were controlled in advance by cold rolling so as to prepare thickness 2 mm Sample Nos. 25 to 43 changed in thickness ratio of the hard layer in accordance with the procedure described above.

TABLE 3

| Ex. no | Layer thickness (μm) | | Layer thickness ratio | Wear (mg) | | Roll forming: cracks after cross-section | | | Nanohardness standard deviation | | TS (MPa) | Remarks |
|---|---|---|---|---|---|---|---|---|---|---|---|---|
| | C | B | | Top | Bottom | Top | Inside | Bottom | Top | Bottom | | |
| 25 | 6 | 5 | 1/400 | 4.61 | 4.65 | Good | Good | Good | 0.73 | 0.36 | 1006 | Comp.ex. |
| 26 | 10 | 11 | 1/200 | 4.55 | 4.62 | Good | Good | Good | 0.71 | 0.35 | 1008 | Comp.ex. |
| 27 | 16 | 16 | 3/400 | 4.04 | 3.72 | Good | Good | Good | 0.73 | 0.35 | 1010 | Comp.ex. |
| 28 | 21 | 22 | 1/100 | 2.84 | 2.78 | Good | Good | Good | 0.72 | 0.35 | 1012 | Inv.ex. |
| 29 | 39 | 40 | 1/50 | 2.71 | 2.5 | Good | Good | Good | 0.71 | 0.35 | 1019 | Inv.ex. |
| 30 | 63 | 62 | 3/100 | 2.63 | 2.35 | Good | Good | Good | 0.75 | 0.35 | 1027 | Inv.ex. |
| 31 | 83 | 84 | 1/25 | 2.54 | 2.33 | Good | Good | Good | 0.71 | 0.36 | 1035 | Inv.ex. |
| 32 | 96 | 99 | 1/20 | 2.45 | 2.2 | Good | Good | Good | 0.73 | 0.35 | 1040 | Inv.ex. |
| 33 | 143 | 139 | 3/40 | 2.42 | 2.2 | Good | Good | Good | 0.74 | 0.34 | 1056 | Inv.ex. |
| 34 | 197 | 200 | 1/10 | 2.44 | 2.2 | Good | Good | Good | 0.74 | 0.36 | 1077 | Inv.ex. |
| 35 | 245 | 253 | 5/40 | 2.39 | 2.18 | Good | Good | Good | 0.75 | 0.36 | 1096 | Inv.ex. |
| 36 | 290 | 301 | 3/20 | 2.39 | 2.16 | Good | Good | Good | 0.72 | 0.36 | 1114 | Inv.ex. |

TABLE 3-continued

| Ex. no | Layer thickness (μm) C | Layer thickness B | Layer thickness ratio | Wear (mg) Top | Wear (mg) Bottom | Roll forming: cracks after cross-section Top | Roll forming: cracks after cross-section Inside | Roll forming: cracks after cross-section Bottom | Nanohardness standard deviation Top | Nanohardness standard deviation Bottom | TS (MPa) | Remarks |
|---|---|---|---|---|---|---|---|---|---|---|---|---|
| 37 | 333 | 343 | 7/40 | 2.4 | 2.16 | Good | Good | Good | 0.74 | 0.36 | 1129 | Inv.ex. |
| 38 | 402 | 413 | 1/5 | 2.39 | 2.14 | Good | Good | Good | 0.75 | 0.36 | 1152 | Inv.ex. |
| 39 | 491 | 506 | 1/4 | 2.38 | 2.14 | Good | Good | Good | 0.71 | 0.34 | 1189 | Inv.ex. |
| 40 | 585 | 599 | 3/10 | 2.43 | 2.13 | Good | Good | Good | 0.72 | 0.36 | 1223 | Inv.ex. |
| 41 | 688 | 721 | 7/20 | 2.39 | 2.13 | Good | Good | Good | 0.71 | 0.35 | 1265 | Inv.ex. |
| 42 | 805 | 808 | 2/5 | 2.43 | 2.11 | Good | Good | Good | 0.72 | 0.34 | 1302 | Inv.ex. |
| 43 | 864 | 889 | 9/20 | 2.36 | 2.14 | Poor | Good | Poor | 0.71 | 0.34 | 1328 | Comp.ex. |

*Bold underlines show outside scope of present invention.

Table 3 shows the results of evaluation of the samples. It is shown that in all of Example Nos. 28 to 42, the thickness of the hard layer was 20 μm or more and 2/5 of the total sheet thickness or less, and the wear resistance and cold workability were excellent.

As opposed to this, in Comparative Example Nos. 25 to 27, the thickness of the hard layer was less than 20 μm and the wear resistance fell. Further, in Comparative Example No. 43, the thickness of the hard layer exceeded 2/5 and the cold formability fell. To facilitate understanding, the relationship between the thickness of the hard layer and the amount of wear (wear resistance) relating to the invention examples and comparative examples of Table 3 is shown in FIG. 1.

Next, to investigate the effects of the constituents, thickness 1.2 mm samples having the compositions of D, E, and F of Table 1 were fixed as inner layers and thickness 0.4 mm samples having compositions of H to BR were combined as hard layers to investigate the effects of the constituents (Example Nos. 44 to 229). Furthermore, thickness 0.4 mm samples having the compositions of A, B, and C of Table 1 were fixed as hard layers and thickness 1.2 mm samples having compositions of H to BR were combined as inner layers to evaluate the effects of the constituents (Example Nos. 230 to 418). In the production of the samples, along with the previously described procedure, the samples were machined to adjust the sheet thicknesses, polished and washed then treated by diffusion heat treatment, then inserted into a furnace heated to 900° C., held there for 20 minutes, then taken out and pressed by a plate die set and cooled in the die down to room temperature.

TABLE 4

| Ex. no. | Layer configuration Top | Layer configuration Inside | Layer configuration Bottom | Vickers hardness Top | Vickers hardness Inside | Vickers hardness Bottom | Carbide volume ratio (vol. %) Top | Carbide volume ratio (vol. %) Inside | Carbide volume ratio (vol. %) Bottom |
|---|---|---|---|---|---|---|---|---|---|
| 44 | H | D | H | 90 | 344 | 90 | 0.01 | 1.29 | 0.01 |
| 45 | I | D | I | 95 | 339 | 95 | 0.15 | 1.29 | 0.15 |
| 46 | J | D | J | 121 | 337 | 121 | 0.20 | 1.29 | 0.19 |
| 47 | K | D | K | 159 | 341 | 160 | 0.24 | 1.29 | 0.23 |
| 48 | L | D | L | 187 | 335 | 189 | 0.46 | 1.29 | 0.45 |
| 49 | M | D | M | 262 | 345 | 264 | 0.35 | 1.29 | 0.34 |
| 50 | N | D | N | 389 | 339 | 398 | 0.04 | 1.29 | 0.06 |
| 51 | O | D | O | 411 | 335 | 415 | 0.04 | 1.29 | 0.05 |
| 52 | P | D | P | 412 | 344 | 406 | 0.05 | 1.29 | 0.05 |
| 53 | Q | D | Q | 428 | 336 | 422 | 0.04 | 1.29 | 0.06 |
| 54 | R | D | R | 450 | 340 | 445 | 0.03 | 1.29 | 0.02 |
| 55 | S | D | S | 430 | 336 | 441 | 0.06 | 1.29 | 0.04 |
| 56 | T | D | T | 406 | 344 | 411 | 0.15 | 1.29 | 0.12 |
| 57 | U | D | U | 412 | 341 | 418 | 0.24 | 1.29 | 0.19 |
| 58 | V | D | V | 439 | 339 | 442 | 0.08 | 1.29 | 0.06 |
| 59 | W | D | W | 476 | 339 | 467 | 0.03 | 1.29 | 0.03 |
| 60 | X | D | X | 493 | 335 | 487 | 0.03 | 1.29 | 0.05 |
| 61 | Y | D | Y | 618 | 339 | 617 | 0.06 | 1.29 | 0.03 |
| 62 | Z | D | Z | 519 | 341 | 522 | 0.41 | 1.29 | 0.38 |
| 63 | AA | D | AA | 576 | 336 | 573 | 0.09 | 1.29 | 0.11 |
| 64 | AB | D | AB | 620 | 342 | 619 | 0.05 | 1.29 | 0.02 |
| 65 | AC | D | AC | 628 | 339 | 612 | 0.02 | 1.29 | 0.05 |
| 66 | AD | D | AD | 602 | 339 | 606 | 0.18 | 1.29 | 0.14 |
| 67 | AE | D | AE | 642 | 340 | 630 | 0.11 | 1.29 | 0.22 |
| 68 | AF | D | AF | 652 | 336 | 641 | 0.19 | 1.29 | 0.30 |
| 69 | AG | D | AG | 663 | 343 | 677 | 0.18 | 1.29 | 0.04 |
| 70 | AH | D | AH | 643 | 343 | 655 | 0.57 | 1.29 | 0.45 |
| 71 | AI | D | AI | 655 | 337 | 645 | 0.65 | 1.29 | 0.75 |
| 72 | AJ | D | AJ | 641 | 345 | 631 | 0.96 | 1.29 | 1.07 |
| 73 | AK | D | AK | 682 | 341 | 673 | 0.84 | 1.29 | 0.93 |
| 74 | AM | D | AM | 123 | 341 | 123 | 0.00 | 1.29 | 0.00 |
| 75 | AN | D | AN | 479 | 337 | 480 | 0.06 | 1.29 | 0.01 |
| 76 | AO | D | AO | 481 | 341 | 478 | 0.02 | 1.29 | 0.05 |
| 77 | AP | D | AP | 492 | 339 | 499 | 0.00 | 1.29 | 0.03 |
| 78 | AQ | D | AQ | 368 | 339 | 366 | 0.06 | 1.29 | 0.06 |
| 79 | AR | D | AR | 326 | 338 | 322 | 0.02 | 1.29 | 0.01 |

TABLE 4-continued

| | | | | | | | | |
|---|---|---|---|---|---|---|---|---|
| 80 | AS | D | AS | 375 | 344 | 371 | 0.26 | 1.29 | 0.23 |
| 81 | AT | D | AT | 383 | 344 | 380 | 0.05 | 1.29 | 0.05 |
| 82 | AU | D | AU | 467 | 344 | 475 | 0.03 | 1.29 | 0.02 |
| 83 | AV | D | AV | 450 | 338 | 449 | 0.04 | 1.29 | 0.04 |
| 84 | AW | D | AW | 488 | 339 | 482 | 0.02 | 1.29 | 0.03 |
| 85 | AX | D | AX | 448 | 345 | 443 | 0.04 | 1.29 | 0.03 |
| 86 | AY | D | AY | 460 | 340 | 455 | 0.04 | 1.29 | 0.08 |
| 87 | AZ | D | AZ | 481 | 342 | 474 | 0.03 | 1.29 | 0.03 |
| 88 | BA | D | BA | 419 | 343 | 421 | 0.05 | 1.29 | 0.04 |
| 89 | BB | D | BB | 421 | 340 | 432 | 0.02 | 1.29 | 0.04 |
| 90 | BC | D | BC | 419 | 344 | 422 | 0.03 | 1.29 | 0.01 |
| 91 | BD | D | BD | 482 | 337 | 473 | 0.02 | 1.29 | 0.06 |
| 92 | BE | D | BE | 415 | 341 | 426 | 0.15 | 1.29 | 0.06 |
| 93 | BF | D | BF | 496 | 342 | 503 | 0.02 | 1.29 | 0.03 |
| 94 | BG | D | BG | 470 | 339 | 474 | 0.05 | 1.29 | 0.02 |
| 95 | BH | D | BH | 462 | 342 | 467 | 0.02 | 1.29 | 0.02 |
| 96 | BI | D | BI | 433 | 338 | 430 | 0.25 | 1.29 | 0.28 |
| 97 | BJ | D | BJ | 387 | 336 | 389 | 0.23 | 1.29 | 0.22 |
| 98 | BK | D | BK | 476 | 335 | 478 | 0.03 | 1.29 | 0.05 |
| 99 | BL | D | BL | 493 | 343 | 499 | 0.05 | 1.29 | 0.03 |
| 100 | BM | D | BM | 404 | 345 | 403 | 0.02 | 1.29 | 0.03 |
| 101 | BN | D | BN | 446 | 338 | 438 | 0.05 | 1.29 | 0.05 |
| 102 | BO | D | BO | 466 | 338 | 463 | 0.04 | 1.29 | 0.04 |
| 103 | BP | D | BP | 433 | 339 | 435 | 0.05 | 1.29 | 0.04 |
| 104 | BQ | D | BQ | 418 | 344 | 418 | 0.00 | 1.29 | 0.00 |
| 105 | BR | D | BR | 446 | 338 | 446 | 0.06 | 1.29 | 0.02 |
| 106 | H | E | H | 90 | 327 | 89 | 0.01 | 0.29 | 0.01 |
| 107 | I | E | I | 97 | 330 | 94 | 0.15 | 0.29 | 0.15 |
| 108 | J | E | J | 120 | 335 | 119 | 0.19 | 0.29 | 0.19 |
| 109 | K | E | K | 156 | 334 | 159 | 0.23 | 0.29 | 0.24 |
| 110 | L | E | L | 191 | 329 | 187 | 0.45 | 0.29 | 0.46 |
| 111 | M | E | M | 267 | 330 | 264 | 0.33 | 0.29 | 0.34 |
| 112 | N | E | N | 393 | 326 | 393 | 0.03 | 0.29 | 0.01 |
| 113 | O | E | O | 412 | 330 | 411 | 0.05 | 0.29 | 0.01 |
| 114 | P | E | P | 408 | 331 | 412 | 0.05 | 0.29 | 0.01 |
| 115 | Q | E | Q | 418 | 333 | 426 | 0.04 | 0.29 | 0.04 |
| 116 | R | E | R | 448 | 330 | 453 | 0.05 | 0.29 | 0.04 |
| 117 | S | E | S | 430 | 327 | 439 | 0.01 | 0.29 | 0.03 |
| 118 | T | E | T | 404 | 335 | 410 | 0.17 | 0.29 | 0.12 |
| 119 | U | E | U | 414 | 330 | 412 | 0.23 | 0.29 | 0.25 |
| 120 | V | E | V | 450 | 329 | 440 | 0.02 | 0.29 | 0.08 |
| 121 | W | E | W | 473 | 329 | 470 | 0.06 | 0.29 | 0.02 |
| 122 | X | E | X | 495 | 327 | 488 | 0.03 | 0.29 | 0.04 |
| 123 | Y | E | Y | 620 | 332 | 620 | 0.02 | 0.29 | 0.02 |
| 124 | Z | E | Z | 517 | 327 | 526 | 0.42 | 0.29 | 0.35 |
| 125 | AA | E | AA | 575 | 331 | 565 | 0.10 | 0.29 | 0.19 |
| 126 | AB | E | AB | 626 | 332 | 629 | 0.05 | 0.29 | 0.02 |
| 127 | AC | E | AC | 628 | 326 | 624 | 0.01 | 0.29 | 0.04 |
| 128 | AD | E | AD | 607 | 329 | 595 | 0.14 | 0.29 | 0.25 |
| 129 | AE | E | AE | 643 | 335 | 636 | 0.10 | 0.29 | 0.17 |
| 130 | AF | E | AF | 638 | 326 | 646 | 0.32 | 0.29 | 0.24 |
| 131 | AG | E | AG | 662 | 332 | 666 | 0.20 | 0.29 | 0.15 |
| 132 | AH | E | AH | 658 | 331 | 646 | 0.41 | 0.29 | 0.53 |
| 133 | AI | E | AI | 647 | 331 | 661 | 0.73 | 0.29 | 0.58 |
| 134 | AJ | E | AJ | 646 | 333 | 632 | 0.91 | 0.29 | 1.06 |
| 135 | AK | E | AK | 688 | 326 | 670 | 0.77 | 0.29 | 0.96 |
| 136 | AM | E | AM | 121 | 335 | 124 | 0.00 | 0.29 | 0.00 |
| 137 | AN | E | AN | 486 | 332 | 482 | 0.04 | 0.29 | 0.05 |
| 138 | AO | E | AO | 478 | 329 | 484 | 0.03 | 0.29 | 0.04 |
| 139 | AP | E | AP | 497 | 328 | 495 | 0.04 | 0.29 | 0.03 |
| 140 | AQ | E | AQ | 371 | 330 | 370 | 0.05 | 0.29 | 0.01 |
| 141 | AR | E | AR | 321 | 333 | 323 | 0.01 | 0.29 | 0.02 |
| 142 | AS | E | AS | 374 | 332 | 371 | 0.20 | 0.29 | 0.24 |
| 143 | AT | E | AT | 377 | 329 | 378 | 0.05 | 0.29 | 0.04 |
| 144 | AU | E | AU | 466 | 327 | 474 | 0.05 | 0.29 | 0.01 |
| 145 | AV | E | AV | 445 | 329 | 447 | 0.04 | 0.29 | 0.02 |
| 146 | AW | E | AW | 489 | 332 | 481 | 0.06 | 0.29 | 0.03 |
| 147 | AX | E | AX | 440 | 329 | 441 | 0.04 | 0.29 | 0.02 |
| 148 | AY | E | AY | 457 | 328 | 456 | 0.07 | 0.29 | 0.07 |
| 149 | AZ | E | AZ | 473 | 329 | 485 | 0.01 | 0.29 | 0.01 |
| 150 | BA | E | BA | 414 | 332 | 422 | 0.03 | 0.29 | 0.03 |
| 151 | BB | E | BB | 427 | 328 | 421 | 0.03 | 0.29 | 0.05 |
| 152 | BC | E | BC | 423 | 326 | 427 | 0.05 | 0.29 | 0.03 |
| 153 | BD | E | BD | 480 | 325 | 471 | 0.03 | 0.29 | 0.04 |
| 154 | BE | E | BE | 421 | 333 | 424 | 0.10 | 0.29 | 0.07 |
| 155 | BF | E | BF | 499 | 327 | 507 | 0.05 | 0.29 | 0.06 |
| 156 | BG | E | BG | 466 | 329 | 462 | 0.01 | 0.29 | 0.06 |
| 157 | BH | E | BH | 467 | 328 | 471 | 0.06 | 0.29 | 0.03 |
| 158 | BI | E | BI | 428 | 334 | 438 | 0.29 | 0.29 | 0.20 |
| 159 | BJ | E | BJ | 383 | 329 | 385 | 0.26 | 0.29 | 0.24 |

TABLE 4-continued

| | | | | | | | | | |
|---|---|---|---|---|---|---|---|---|---|
| 160 | BK | E | BK | 477 | 334 | 484 | 0.03 | 0.29 | 0.04 |
| 161 | BL | E | BL | 486 | 331 | 493 | 0.03 | 0.29 | 0.01 |
| 162 | BM | E | BM | 408 | 335 | 407 | 0.04 | 0.29 | 0.02 |
| 163 | BN | E | BN | 441 | 326 | 443 | 0.05 | 0.29 | 0.02 |
| 164 | BO | E | BO | 469 | 329 | 458 | 0.03 | 0.29 | 0.02 |
| 165 | BP | E | BP | 438 | 326 | 436 | 0.05 | 0.29 | 0.05 |
| 166 | BQ | E | BQ | 426 | 328 | 423 | 0.05 | 0.29 | 0.02 |
| 167 | BR | E | BR | 448 | 334 | 446 | 0.03 | 0.29 | 0.05 |
| 168 | H | F | H | 90 | 218 | 88 | 0.01 | 0.01 | 0.01 |
| 169 | I | F | I | 96 | 217 | 97 | 0.15 | 0.01 | 0.15 |
| 170 | J | F | J | 120 | 216 | 120 | 0.20 | 0.01 | 0.20 |
| 171 | K | F | K | 159 | 215 | 158 | 0.24 | 0.01 | 0.24 |
| 172 | L | F | L | 191 | 213 | 189 | 0.45 | 0.01 | 0.45 |
| 173 | M | F | M | 264 | 212 | 263 | 0.34 | 0.01 | 0.34 |
| 174 | N | F | N | 387 | 215 | 391 | 0.03 | 0.01 | 0.02 |
| 175 | O | F | O | 411 | 214 | 411 | 0.06 | 0.01 | 0.06 |
| 176 | P | F | P | 416 | 216 | 405 | 0.04 | 0.01 | 0.05 |
| 177 | Q | F | Q | 428 | 216 | 421 | 0.02 | 0.01 | 0.04 |
| 178 | R | F | R | 444 | 217 | 445 | 0.04 | 0.01 | 0.01 |
| 179 | S | F | S | 432 | 217 | 435 | 0.05 | 0.01 | 0.01 |
| 180 | T | F | T | 407 | 218 | 414 | 0.15 | 0.01 | 0.09 |
| 181 | U | F | U | 411 | 214 | 418 | 0.26 | 0.01 | 0.20 |
| 182 | V | F | V | 446 | 217 | 442 | 0.02 | 0.01 | 0.05 |
| 183 | W | F | W | 467 | 218 | 470 | 0.03 | 0.01 | 0.05 |
| 184 | X | F | X | 494 | 212 | 490 | 0.03 | 0.01 | 0.01 |
| 185 | Y | F | Y | 615 | 218 | 624 | 0.01 | 0.01 | 0.02 |
| 186 | Z | F | Z | 530 | 217 | 522 | 0.31 | 0.01 | 0.38 |
| 187 | AA | F | AA | 572 | 215 | 571 | 0.12 | 0.01 | 0.13 |
| 188 | AB | F | AB | 618 | 216 | 631 | 0.05 | 0.01 | 0.02 |
| 189 | AC | F | AC | 627 | 216 | 629 | 0.02 | 0.01 | 0.05 |
| 190 | AD | F | AD | 598 | 215 | 605 | 0.22 | 0.01 | 0.15 |
| 191 | AE | F | AE | 631 | 215 | 634 | 0.22 | 0.01 | 0.18 |
| 192 | AF | F | AF | 645 | 213 | 636 | 0.26 | 0.01 | 0.35 |
| 193 | AG | F | AG | 675 | 216 | 661 | 0.07 | 0.01 | 0.21 |
| 194 | AH | F | AH | 646 | 215 | 652 | 0.54 | 0.01 | 0.47 |
| 195 | AI | F | AI | 646 | 212 | 657 | 0.73 | 0.01 | 0.62 |
| 196 | AJ | F | AJ | 640 | 215 | 640 | 0.97 | 0.01 | 0.98 |
| 197 | AK | F | AK | 685 | 214 | 672 | 0.81 | 0.01 | 0.94 |
| 198 | AM | F | AM | 122 | 215 | 121 | 0.00 | 0.01 | 0.00 |
| 199 | AN | F | AN | 478 | 215 | 475 | 0.05 | 0.01 | 0.03 |
| 200 | AO | F | AO | 473 | 216 | 479 | 0.06 | 0.01 | 0.05 |
| 201 | AP | F | AP | 490 | 215 | 491 | 0.03 | 0.01 | 0.01 |
| 202 | AQ | F | AQ | 372 | 217 | 365 | 0.05 | 0.01 | 0.01 |
| 203 | AR | F | AR | 319 | 214 | 318 | 0.02 | 0.01 | 0.05 |
| 204 | AS | F | AS | 379 | 215 | 378 | 0.26 | 0.01 | 0.23 |
| 205 | AT | F | AT | 378 | 214 | 378 | 0.05 | 0.01 | 0.04 |
| 206 | AU | F | AU | 475 | 217 | 470 | 0.06 | 0.01 | 0.02 |
| 207 | AV | F | AV | 448 | 217 | 442 | 0.03 | 0.01 | 0.03 |
| 208 | AW | F | AW | 495 | 213 | 495 | 0.03 | 0.01 | 0.05 |
| 209 | AX | F | AX | 447 | 216 | 452 | 0.03 | 0.01 | 0.05 |
| 210 | AY | F | AY | 465 | 212 | 454 | 0.03 | 0.01 | 0.09 |
| 211 | AZ | F | AZ | 481 | 214 | 481 | 0.01 | 0.01 | 0.05 |
| 212 | BA | F | BA | 416 | 217 | 423 | 0.04 | 0.01 | 0.03 |
| 213 | BB | F | BB | 431 | 218 | 422 | 0.04 | 0.01 | 0.06 |
| 214 | BC | F | BC | 423 | 213 | 421 | 0.02 | 0.01 | 0.05 |
| 215 | BD | F | BD | 478 | 216 | 479 | 0.03 | 0.01 | 0.02 |
| 216 | BE | F | BE | 416 | 215 | 417 | 0.14 | 0.01 | 0.13 |
| 217 | BF | F | BF | 503 | 212 | 496 | 0.03 | 0.01 | 0.03 |
| 218 | BG | F | BG | 471 | 217 | 474 | 0.05 | 0.01 | 0.05 |
| 219 | BH | F | BH | 469 | 212 | 472 | 0.02 | 0.01 | 0.05 |
| 220 | BI | F | BI | 428 | 213 | 433 | 0.30 | 0.01 | 0.25 |
| 221 | BJ | F | BJ | 389 | 215 | 382 | 0.22 | 0.01 | 0.26 |
| 222 | BK | F | BK | 475 | 218 | 483 | 0.01 | 0.01 | 0.02 |
| 223 | BL | F | BL | 492 | 212 | 500 | 0.04 | 0.01 | 0.06 |
| 224 | BM | F | BM | 402 | 213 | 401 | 0.05 | 0.01 | 0.05 |
| 225 | BN | F | BN | 441 | 214 | 451 | 0.04 | 0.01 | 0.04 |
| 226 | BO | F | BO | 467 | 218 | 466 | 0.03 | 0.01 | 0.06 |
| 227 | BP | F | BP | 435 | 216 | 434 | 0.02 | 0.01 | 0.05 |
| 228 | BQ | F | BQ | 425 | 214 | 417 | 0.01 | 0.01 | 0.01 |
| 229 | BR | F | BR | 452 | 217 | 445 | 0.04 | 0.01 | 0.02 |

| | Wear (mg) | | Roll forming: cracks after cross-section | | | Nanohardness standard deviation | | TS | |
|---|---|---|---|---|---|---|---|---|---|
| Ex. no. | Top | Bottom | Top | Inside | Bottom | Top | Bottom | (MPa) | Remarks |
| 44 | 8.09 | 8.09 | Good | Good | Good | 0.72 | 0.42 | 718 | Comp.ex. |
| 45 | 8.08 | 8.08 | Good | Good | Good | 0.51 | 0.23 | 715 | Comp.ex. |
| 46 | 8.02 | 8.02 | Good | Good | Good | 0.66 | 0.84 | 736 | Comp.ex. |
| 47 | 7.92 | 7.92 | Good | Good | Good | 0.68 | 0.9 | 778 | Comp.ex. |

TABLE 4-continued

| | | | | | | | | | |
|---|---|---|---|---|---|---|---|---|---|
| 48 | 7.84 | 7.83 | Good | Good | Good | 1 | 0.98 | 796 | Comp.ex. |
| 49 | 7.55 | 7.54 | Good | Good | Good | 0.66 | 0.33 | 879 | Comp.ex. |
| 50 | 3.20 | 3.06 | Good | Good | Good | 0.51 | 0.38 | 992 | Comp.ex. |
| 51 | 2.90 | 2.86 | Good | Good | Good | 1.25 | 0.55 | 1005 | Inv.ex. |
| 52 | 2.88 | 2.95 | Good | Good | Good | 0.46 | 0.93 | 1013 | Inv.ex. |
| 53 | 2.74 | 2.79 | Good | Good | Good | 0.58 | 0.61 | 1018 | Inv.ex. |
| 54 | 2.59 | 2.63 | Good | Good | Good | 0.95 | 0.6 | 1043 | Inv.ex. |
| 55 | 2.73 | 2.65 | Good | Good | Good | 0.27 | 0.34 | 1027 | Inv.ex. |
| 56 | 2.95 | 2.90 | Good | Good | Good | 0.37 | 0.62 | 1013 | Inv.ex. |
| 57 | 2.88 | 2.83 | Good | Good | Good | 0.44 | 1.2 | 1015 | Inv.ex. |
| 58 | 2.67 | 2.65 | Good | Good | Good | 1.27 | 0.69 | 1035 | Inv.ex. |
| 59 | 2.46 | 2.50 | Good | Good | Good | 1.5 | 0.86 | 1064 | Inv.ex. |
| 60 | 2.38 | 2.41 | Good | Good | Good | 1.22 | 0.4 | 1077 | Inv.ex. |
| 61 | 2.23 | 2.23 | Good | Good | Good | 1.49 | 0.24 | 1199 | Inv.ex. |
| 62 | 2.61 | 2.60 | Good | Good | Good | 0.8 | 0.38 | 1112 | Inv.ex. |
| 63 | 2.37 | 2.37 | Good | Good | Good | 0.39 | 1.48 | 1156 | Inv.ex. |
| 64 | 2.22 | 2.23 | Good | Good | Good | 1.47 | 0.38 | 1206 | Inv.ex. |
| 65 | 2.20 | 2.25 | Good | Good | Good | 0.77 | 0.71 | 1202 | Inv.ex. |
| 66 | 2.28 | 2.26 | Good | Good | Good | 1.14 | 0.25 | 1188 | Inv.ex. |
| 67 | 2.16 | 2.19 | Good | Good | Good | 0.7 | 0.76 | 1219 | Inv.ex. |
| 68 | 2.14 | 2.16 | Good | Good | Good | 1.18 | 0.44 | 1223 | Inv.ex. |
| 69 | 2.11 | 2.07 | Good | Good | Good | 1.06 | 0.94 | 1254 | Inv.ex. |
| 70 | 2.16 | 2.13 | Good | Good | Good | 0.96 | 1.57 | 1234 | Inv.ex. |
| 71 | 2.13 | 2.15 | Good | Good | Good | 0.27 | 0.39 | 1227 | Inv.ex. |
| 72 | 2.16 | 2.19 | Good | Good | Good | 0.96 | 1.1 | 1226 | Inv.ex. |
| 72 | 2.06 | 2.08 | Good | Good | Good | 0.27 | 0.68 | 1258 | Inv.ex. |
| 74 | 8.01 | 8.01 | Good | Good | Good | 1.26 | 0.67 | 743 | Comp.ex. |
| 75 | 2.44 | 2.44 | Poor | Good | Poor | 2.03 | 2.31 | 1068 | Comp.ex. |
| 76 | 2.43 | 2.45 | Poor | Good | Poor | 2.18 | 2.16 | 1074 | Comp.ex. |
| 77 | 2.38 | 2.35 | Poor | Good | Poor | 2.36 | 2.24 | 1086 | Comp.ex. |
| 78 | 6.07 | 6.38 | Good | Good | Good | 0.87 | 0.44 | 967 | Comp.ex. |
| 79 | 7.16 | 7.18 | Good | Good | Good | 1.48 | 0.82 | 926 | Comp.ex. |
| 80 | 3.60 | 4.08 | Good | Good | Good | 1.5 | 1.5 | 980 | Comp.ex. |
| 81 | 3.19 | 3.27 | Good | Good | Good | 0.45 | 1.38 | 987 | Comp.ex. |
| 82 | 2.50 | 2.46 | Poor | Good | Poor | 2.17 | 2.34 | 1072 | Comp.ex. |
| 83 | 2.59 | 2.60 | Poor | Good | Poor | 2.47 | 2.23 | 1043 | Comp.ex. |
| 84 | 2.40 | 2.43 | Poor | Good | Poor | 2.34 | 2.14 | 1077 | Comp.ex. |
| 85 | 2.61 | 2.64 | Poor | Good | Poor | 2.29 | 2.37 | 1049 | Comp.ex. |
| 86 | 2.54 | 2.56 | Poor | Good | Poor | 2.48 | 2.32 | 1053 | Comp.ex. |
| 87 | 2.43 | 2.46 | Poor | Good | Poor | 2.24 | 2.1 | 1075 | Comp.ex. |
| 88 | 2.82 | 2.80 | Poor | Good | Poor | 2.46 | 2.14 | 1022 | Comp.ex. |
| 89 | 2.80 | 2.72 | Poor | Good | Poor | 2.3 | 2.43 | 1024 | Comp.ex. |
| 90 | 2.82 | 2.79 | Poor | Good | Poor | 2.4 | 2.39 | 1024 | Comp.ex. |
| 91 | 2.43 | 2.47 | Poor | Good | Poor | 2.26 | 2.02 | 1067 | Comp.ex. |
| 92 | 2.86 | 2.76 | Poor | Good | Poor | 2.21 | 2.47 | 1020 | Comp.ex. |
| 93 | 2.37 | 2.34 | Poor | Good | Poor | 2.09 | 2.5 | 1095 | Comp.ex. |
| 94 | 2.48 | 2.47 | Poor | Good | Poor | 2.48 | 2.41 | 1065 | Comp.ex. |
| 95 | 2.52 | 2.50 | Poor | Good | Poor | 2.06 | 2.25 | 1062 | Comp.ex. |
| 96 | 2.71 | 2.73 | Poor | Good | Poor | 2.26 | 2.16 | 1026 | Comp.ex. |
| 97 | 3.24 | 3.21 | Poor | Good | Poor | 2.13 | 2.17 | 983 | Comp.ex. |
| 98 | 2.46 | 2.45 | Poor | Good | Poor | 2.16 | 2.27 | 1064 | Comp.ex. |
| 99 | 2.38 | 2.35 | Poor | Good | Poor | 2.02 | 2.4 | 1092 | Comp.ex. |
| 100 | 2.98 | 2.99 | Poor | Good | Poor | 2.04 | 2.29 | 1009 | Comp.ex. |
| 101 | 2.62 | 2.67 | Poor | Good | Poor | 2.5 | 2.21 | 1036 | Comp.ex. |
| 102 | 2.50 | 2.52 | Poor | Good | Poor | 2.28 | 2.21 | 1056 | Comp.ex. |
| 103 | 2.71 | 2.69 | Poor | Good | Poor | 2.26 | 2.31 | 1029 | Comp.ex. |
| 104 | 2.83 | 2.83 | Poor | Good | Poor | 2.31 | 2.45 | 1022 | Comp.ex. |
| 105 | 2.62 | 2.62 | Poor | Good | Poor | 2.37 | 2.34 | 1040 | Comp.ex. |
| 106 | 8.09 | 8.09 | Good | Good | Good | 1.37 | 1.4 | 693 | Comp.ex. |
| 107 | 8.07 | 8.08 | Good | Good | Good | 0.77 | 0.67 | 703 | Comp.ex. |
| 108 | 8.02 | 8.02 | Good | Good | Good | 1.32 | 0.67 | 732 | Comp.ex. |
| 109 | 7.93 | 7.92 | Good | Good | Good | 1.53 | 0.34 | 766 | Comp.ex. |
| 110 | 7.83 | 7.84 | Good | Good | Good | 0.72 | 0.29 | 788 | Comp.ex. |
| 111 | 7.53 | 7.55 | Good | Good | Good | 1.54 | 1.24 | 861 | Comp.ex. |
| 112 | 3.13 | 3.12 | Good | Good | Good | 1.34 | 1.59 | 973 | Comp.ex. |
| 113 | 2.89 | 2.90 | Good | Good | Good | 0.31 | 1.25 | 997 | Inv.ex. |
| 114 | 2.93 | 2.88 | Good | Good | Good | 1.57 | 0.44 | 997 | Inv.ex. |
| 115 | 2.82 | 2.76 | Good | Good | Good | 1.26 | 1.3 | 1010 | Inv.ex. |
| 116 | 2.61 | 2.58 | Good | Good | Good | 0.51 | 1.48 | 1032 | Inv.ex. |
| 117 | 2.73 | 2.67 | Good | Good | Good | 1.31 | 1.28 | 1013 | Inv.ex. |
| 118 | 2.97 | 2.90 | Good | Good | Good | 1.51 | 1.04 | 999 | Inv.ex. |
| 119 | 2.86 | 2.89 | Good | Good | Good | 1.57 | 0.82 | 998 | Inv.ex. |
| 120 | 2.60 | 2.66 | Good | Good | Good | 1.04 | 0.9 | 1025 | Inv.ex. |
| 121 | 2.47 | 2.48 | Good | Good | Good | 0.39 | 1.29 | 1051 | Inv.ex. |
| 122 | 2.37 | 2.40 | Good | Good | Good | 0.42 | 1.12 | 1067 | Inv.ex. |
| 123 | 2.22 | 2.22 | Good | Good | Good | 1.12 | 0.83 | 1193 | Inv.ex. |
| 124 | 2.62 | 2.57 | Good | Good | Good | 1.48 | 0.31 | 1095 | Inv.ex. |
| 125 | 2.37 | 2.41 | Good | Good | Good | 0.58 | 1.06 | 1145 | Inv.ex. |
| 126 | 2.21 | 2.20 | Good | Good | Good | 1.3 | 1.16 | 1199 | Inv.ex. |
| 127 | 2.20 | 2.21 | Good | Good | Good | 0.53 | 0.47 | 1190 | Inv.ex. |

TABLE 4-continued

| | | | | | | | | | |
|---|---|---|---|---|---|---|---|---|---|
| 128 | 2.26 | 2.30 | Good | Good | Good | 0.73 | 0.6 | 1171 | Inv.ex. |
| 129 | 2.16 | 2.18 | Good | Good | Good | 1.22 | 0.49 | 1215 | Inv.ex. |
| 130 | 2.17 | 2.15 | Good | Good | Good | 0.63 | 0.31 | 1205 | Inv.ex. |
| 131 | 2.11 | 2.10 | Good | Good | Good | 1.3 | 0.69 | 1233 | Inv.ex. |
| 132 | 2.12 | 2.15 | Good | Good | Good | 1.38 | 1.51 | 1221 | Inv.ex. |
| 133 | 2.15 | 2.11 | Good | Good | Good | 1 | 0.28 | 1223 | Inv.ex. |
| 134 | 2.15 | 2.19 | Good | Good | Good | 0.46 | 1.24 | 1211 | Inv.ex. |
| 135 | 2.05 | 2.09 | Good | Good | Good | 0.86 | 0.38 | 1239 | Inv.ex |
| 136 | 8.02 | 8.01 | Good | Good | Good | 0.9 | 0.85 | 735 | Comp.ex. |
| 137 | 2.41 | 2.43 | Poor | Good | Poor | 2.4 | 2.49 | 1066 | Comp.ex. |
| 138 | 2.45 | 2.42 | Poor | Good | Poor | 2.1 | 2.51 | 1059 | Comp.ex. |
| 139 | 2.36 | 2.37 | Poor | Good | Poor | 2.4 | 2.11 | 1072 | Comp.ex. |
| 140 | 6.09 | 6.40 | Good | Good | Good | 0.89 | 1.15 | 958 | Comp.ex. |
| 141 | 7.17 | 7.17 | Good | Good | Good | 0.86 | 0.56 | 917 | Comp.ex. |
| 142 | 3.65 | 4.07 | Good | Good | Good | 0.86 | 0.77 | 963 | Comp.ex. |
| 143 | 3.32 | 3.30 | Good | Good | Good | 0.66 | 0.99 | 964 | Comp.ex. |
| 144 | 2.51 | 2.47 | Poor | Good | Poor | 2.22 | 2.15 | 1046 | Comp.ex. |
| 145 | 2.63 | 2.61 | Poor | Good | Poor | 2.02 | 2.41 | 1026 | Comp.ex. |
| 146 | 2.40 | 2.43 | Poor | Good | Poor | 2.47 | 2.05 | 1067 | Comp.ex. |
| 147 | 2.66 | 2.65 | Poor | Good | Poor | 2.32 | 2.28 | 1021 | Comp.ex. |
| 148 | 2.56 | 2.56 | Poor | Good | Poor | 2.37 | 2.4 | 1035 | Comp.ex. |
| 149 | 2.47 | 2.41 | Poor | Good | Poor | 2.43 | 2.47 | 1057 | Comp.ex. |
| 150 | 2.86 | 2.80 | Poor | Good | Poor | 2.33 | 2.07 | 1005 | Comp.ex. |
| 151 | 2.76 | 2.80 | Poor | Good | Poor | 2.11 | 2.32 | 1005 | Comp.ex. |
| 152 | 2.79 | 2.75 | Poor | Good | Poor | 2.32 | 2.06 | 1003 | Comp.ex. |
| 153 | 2.44 | 2.48 | Poor | Good | Poor | 2.17 | 2.31 | 1049 | Comp.ex. |
| 154 | 2.80 | 2.77 | Poor | Good | Poor | 2.41 | 2.2 | 1010 | Comp.ex. |
| 155 | 2.35 | 2.32 | Poor | Good | Poor | 2.07 | 2.01 | 1077 | Comp.ex. |
| 156 | 2.51 | 2.53 | Poor | Good | Poor | 2.48 | 2.46 | 1044 | Comp.ex. |
| 157 | 2.50 | 2.48 | Poor | Good | Poor | 2.34 | 2.15 | 1047 | Comp.ex. |
| 158 | 2.74 | 2.67 | Poor | Good | Poor | 2.21 | 2.39 | 1022 | Comp.ex. |
| 159 | 3.34 | 3.28 | Poor | Good | Poor | 2.34 | 2.42 | 969 | Comp.ex. |
| 160 | 2.45 | 2.42 | Poor | Good | Poor | 2.35 | 2.08 | 1066 | Comp.ex. |
| 161 | 2.41 | 2.38 | Poor | Good | Poor | 2.26 | 2.02 | 1070 | Comp.ex. |
| 162 | 2.93 | 2.93 | Poor | Good | Poor | 2.27 | 2.42 | 999 | Comp.ex. |
| 163 | 2.65 | 2.64 | Poor | Good | Poor | 2.02 | 2.35 | 1019 | Comp.ex. |
| 164 | 2.49 | 2.55 | Poor | Good | Poor | 2.15 | 2.35 | 1043 | Comp.ex. |
| 165 | 2.67 | 2.68 | Poor | Good | Poor | 2.22 | 2.27 | 1015 | Comp.ex. |
| 166 | 2.76 | 2.78 | Poor | Good | Poor | 2.4 | 2.03 | 1005 | Comp.ex. |
| 167 | 2.60 | 2.62 | Poor | Good | Poor | 2.28 | 2.07 | 1035 | Comp.ex. |
| 168 | 8.09 | 8.09 | Good | Good | Good | 1.38 | 0.6 | 541 | Comp.ex. |
| 169 | 8.08 | 8.07 | Good | Good | Good | 1.4 | 1.38 | 547 | Comp.ex. |
| 170 | 8.02 | 8.02 | Good | Good | Good | 0.38 | 1.17 | 567 | Comp.ex. |
| 171 | 7.92 | 7.92 | Good | Good | Good | 0.45 | 1.24 | 601 | Comp.ex. |
| 172 | 7.83 | 7.83 | Good | Good | Good | 0.26 | 1.41 | 628 | Comp.ex. |
| 173 | 7.54 | 7.55 | Good | Good | Good | 1.59 | 1.55 | 695 | Comp.ex. |
| 174 | 3.23 | 3.16 | Good | Good | Good | 0.73 | 0.53 | 816 | Comp.ex. |
| 175 | 2.90 | 2.89 | Good | Good | Good | 1.3 | 1.57 | 835 | Inv.ex. |
| 176 | 2.85 | 2.96 | Good | Good | Good | 1.21 | 1.18 | 836 | Inv.ex. |
| 177 | 2.74 | 2.80 | Good | Good | Good | 0.2 | 1.4 | 850 | Inv.ex. |
| 178 | 2.63 | 2.62 | Good | Good | Good | 0.77 | 0.5 | 869 | Inv.ex. |
| 179 | 2.72 | 2.69 | Good | Good | Good | 0.59 | 1.4 | 860 | Inv.ex. |
| 180 | 2.94 | 2.86 | Good | Good | Good | 1.06 | 0.68 | 839 | Inv.ex. |
| 181 | 2.90 | 2.83 | Good | Good | Good | 1.08 | 1.26 | 837 | Inv.ex. |
| 182 | 2.62 | 2.64 | Good | Good | Good | 0.99 | 0.56 | 869 | Inv.ex. |
| 183 | 2.50 | 2.48 | Good | Good | Good | 1.5 | 0.71 | 893 | Inv.ex. |
| 184 | 2.38 | 2.39 | Good | Good | Good | 1.18 | 1.53 | 907 | Inv.ex. |
| 185 | 2.24 | 2.21 | Good | Good | Good | 0.27 | 0.44 | 1033 | Inv.ex. |
| 186 | 2.55 | 2.60 | Good | Good | Good | 0.56 | 1.27 | 945 | Inv.ex. |
| 187 | 2.38 | 2.38 | Good | Good | Good | 0.82 | 0.26 | 985 | Inv.ex. |
| 188 | 2.23 | 2.19 | Good | Good | Good | 0.57 | 0.88 | 1036 | Inv.ex. |
| 189 | 2.20 | 2.20 | Good | Good | Good | 1.59 | 1.6 | 1038 | Inv.ex. |
| 190 | 2.29 | 2.27 | Good | Good | Good | 0.9 | 1.14 | 1013 | Inv.ex. |
| 191 | 2.19 | 2.18 | Good | Good | Good | 0.97 | 0.69 | 1041 | Inv.ex. |
| 192 | 2.15 | 2.18 | Good | Good | Good | 0.87 | 1.06 | 1046 | Inv.ex. |
| 193 | 2.08 | 2.11 | Good | Good | Good | 0.4 | 1.6 | 1075 | Inv.ex. |
| 194 | 2.15 | 2.13 | Good | Good | Good | 1.23 | 1.14 | 1056 | Inv.ex. |
| 195 | 2.15 | 2.12 | Good | Good | Good | 0.6 | 0.5 | 1055 | Inv.ex. |
| 196 | 2.17 | 2.17 | Good | Good | Good | 0.98 | 0.6 | 1049 | Inv.ex. |
| 197 | 2.06 | 2.09 | Good | Good | Good | 1 | 1.48 | 1082 | Inv.ex. |
| 198 | 8.01 | 8.02 | Good | Good | Good | 1.24 | 0.33 | 567 | Comp.ex. |
| 199 | 2.45 | 2.46 | Poor | Good | Poor | 2.42 | 2.08 | 896 | Comp.ex. |
| 200 | 2.47 | 2.44 | Poor | Good | Poor | 2.33 | 2.27 | 897 | Comp.ex. |
| 201 | 2.39 | 2.39 | Poor | Good | Poor | 2.05 | 2.08 | 909 | Comp.ex. |
| 202 | 6.03 | 6.33 | Good | Good | Good | 1.14 | 1.3 | 799 | Comp.ex. |
| 203 | 7.22 | 7.21 | Good | Good | Good | 0.84 | 1.1 | 748 | Comp.ex. |
| 204 | 3.46 | 3.50 | Good | Good | Good | 1 | 0.48 | 805 | Comp.ex. |
| 205 | 3.35 | 3.31 | Good | Good | Good | 0.55 | 0.48 | 803 | Comp.ex. |
| 206 | 2.46 | 2.48 | Poor | Good | Poor | 2.34 | 2.3 | 896 | Comp.ex. |
| 207 | 2.61 | 2.65 | Poor | Good | Poor | 2.46 | 2.08 | 869 | Comp.ex. |

TABLE 4-continued

| | | | | | | | | | |
|---|---|---|---|---|---|---|---|---|---|
| 208 | 2.37 | 2.37 | Poor | Good | Poor | 2.14 | 2.39 | 911 | Comp.ex. |
| 209 | 2.61 | 2.59 | Poor | Good | Poor | 2.02 | 2.37 | 873 | Comp.ex. |
| 210 | 2.51 | 2.57 | Poor | Good | Poor | 2.22 | 2.39 | 877 | Comp.ex. |
| 211 | 2.43 | 2.43 | Poor | Good | Poor | 2.4 | 2.49 | 900 | Comp.ex. |
| 212 | 2.84 | 2.78 | Poor | Good | Poor | 2.38 | 2.33 | 847 | Comp.ex. |
| 213 | 2.72 | 2.79 | Poor | Good | Poor | 2.17 | 2.44 | 854 | Comp.ex. |
| 214 | 2.79 | 2.81 | Poor | Good | Poor | 2.11 | 2.39 | 843 | Comp.ex. |
| 215 | 2.44 | 2.44 | Poor | Good | Poor | 2.18 | 2.05 | 901 | Comp.ex. |
| 216 | 2.85 | 2.84 | Poor | Good | Poor | 2.26 | 2.31 | 841 | Comp.ex. |
| 217 | 2.34 | 2.37 | Poor | Good | Poor | 2.43 | 2.29 | 913 | Comp.ex. |
| 218 | 2.48 | 2.47 | Poor | Good | Poor | 2.44 | 2.33 | 895 | Comp.ex. |
| 219 | 2.49 | 2.48 | Poor | Good | Poor | 2.12 | 2.13 | 886 | Comp.ex. |
| 220 | 2.75 | 2.71 | Poor | Good | Poor | 2.42 | 2.24 | 851 | Comp.ex. |
| 221 | 3.20 | 3.34 | Poor | Good | Poor | 2.28 | 2.18 | 812 | Comp.ex. |
| 222 | 2.46 | 2.42 | Poor | Good | Poor | 2.17 | 2.5 | 903 | Comp.ex. |
| 223 | 2.38 | 2.35 | Poor | Good | Poor | 2.28 | 2.45 | 911 | Comp.ex. |
| 224 | 2.96 | 2.98 | Poor | Good | Poor | 2.37 | 2.37 | 825 | Comp.ex. |
| 225 | 2.65 | 2.59 | Poor | Good | Poor | 2.43 | 2.14 | 867 | Comp.ex. |
| 226 | 2.50 | 2.50 | Poor | Good | Poor | 2.49 | 2.11 | 891 | Comp.ex. |
| 227 | 2.69 | 2.70 | Poor | Good | Poor | 2.04 | 2.35 | 859 | Comp.ex. |
| 228 | 2.77 | 2.84 | Poor | Good | Poor | 2.01 | 2.28 | 843 | Comp.ex. |
| 229 | 2.58 | 2.63 | Poor | Good | Poor | 2.37 | 2.49 | 873 | Comp.ex. |

*Bold underlines show outside scope of present invention.

TABLE 5

| | Layer configuration | | | Vickers hardness | | | Carbide volume ratio (vol. %) | | |
|---|---|---|---|---|---|---|---|---|---|
| Ex. no. | Top | Inside | Bottom | Top | Inside | Bottom | Top | Inside | Bottom |
| 230 | A | H | A | 440 | 81 | 444 | 0.63 | 0.01 | 0.59 |
| 231 | A | I | A | 438 | 84 | 444 | 0.66 | 0.16 | 0.59 |
| 232 | A | J | A | 440 | 103 | 442 | 0.63 | 0.21 | 0.61 |
| 233 | A | K | A | 444 | 146 | 438 | 0.59 | 0.25 | 0.65 |
| 234 | A | L | A | 442 | 175 | 437 | 0.61 | 0.49 | 0.66 |
| 235 | A | M | A | 438 | 250 | 445 | 0.65 | 0.39 | 0.58 |
| 236 | A | N | A | 439 | 383 | 439 | 0.65 | 0.02 | 0.64 |
| 237 | A | O | A | 444 | 392 | 444 | 0.59 | 0.06 | 0.59 |
| 238 | A | P | A | 440 | 373 | 439 | 0.63 | 0.17 | 0.65 |
| 239 | A | Q | A | 435 | 385 | 440 | 0.68 | 0.03 | 0.63 |
| 240 | A | R | A | 439 | 362 | 441 | 0.65 | 0.38 | 0.62 |
| 241 | A | S | A | 437 | 399 | 436 | 0.66 | 0.03 | 0.67 |
| 242 | A | T | A | 442 | 374 | 440 | 0.61 | 0.40 | 0.63 |
| 243 | A | U | A | 434 | 326 | 436 | 0.69 | 0.97 | 0.67 |
| 244 | A | V | A | 445 | 351 | 445 | 0.58 | 0.84 | 0.58 |
| 245 | A | W | A | 440 | 385 | 444 | 0.63 | 0.70 | 0.59 |
| 246 | A | X | A | 437 | 335 | 441 | 0.67 | 1.32 | 0.63 |
| 247 | A | Y | A | 441 | 493 | 438 | 0.63 | 0.05 | 0.66 |
| 248 | A | Z | A | 438 | 417 | 442 | 0.65 | 0.71 | 0.61 |
| 249 | A | AA | A | 435 | 442 | 439 | 0.68 | 0.66 | 0.64 |
| 250 | A | AB | A | 436 | 425 | 444 | 0.68 | 0.94 | 0.59 |
| 251 | A | AC | A | 438 | 423 | 445 | 0.65 | 1.02 | 0.58 |
| 252 | A | AD | A | 434 | 405 | 433 | 0.69 | 1.43 | 0.70 |
| 253 | A | AE | A | 440 | 357 | 438 | 0.63 | 2.33 | 0.65 |
| 254 | A | AF | A | 436 | 384 | 444 | 0.67 | 2.22 | 0.59 |
| 255 | A | AG | A | 438 | 424 | 441 | 0.65 | 1.87 | 0.62 |
| 256 | A | AH | A | 439 | 423 | 434 | 0.64 | 2.10 | 0.69 |
| 257 | A | AI | A | 439 | 365 | 434 | 0.64 | 3.00 | 0.69 |
| 258 | A | AJ | A | 445 | 364 | 433 | 0.58 | 3.19 | 0.71 |
| 259 | A | AK | A | 436 | 384 | 434 | 0.67 | 3.26 | 0.69 |
| 260 | A | AL | A | 434 | 393 | 439 | 0.69 | 3.44 | 0.64 |
| 261 | A | AM | A | 441 | 78 | 441 | 0.62 | 0.00 | 0.62 |
| 262 | A | AN | A | 433 | 349 | 434 | 0.70 | 1.06 | 0.59 |
| 263 | A | AO | A | 439 | 342 | 444 | 0.64 | 0.64 | 0.59 |
| 264 | A | AP | A | 436 | 342 | 434 | 0.67 | 1.52 | 0.69 |
| 265 | A | AQ | A | 439 | 296 | 440 | 0.64 | 1.21 | 0.63 |
| 266 | A | AR | A | 435 | 268 | 438 | 0.68 | 0.28 | 0.65 |
| 267 | A | AS | A | 439 | 295 | 438 | 0.64 | 1.37 | 0.65 |
| 268 | A | AT | A | 441 | 330 | 433 | 0.62 | 1.46 | 0.70 |
| 269 | A | AU | A | 438 | 350 | 440 | 0.65 | 1.00 | 0.63 |
| 270 | A | AV | A | 442 | 329 | 442 | 0.61 | 0.52 | 0.62 |
| 271 | A | AW | A | 433 | 327 | 440 | 0.70 | 1.27 | 0.64 |
| 272 | A | AX | A | 435 | 306 | 436 | 0.68 | 0.72 | 0.67 |
| 273 | A | AY | A | 442 | 337 | 437 | 0.61 | 1.17 | 0.66 |
| 274 | A | AZ | A | 433 | 363 | 438 | 0.70 | 0.89 | 0.65 |
| 275 | A | BA | A | 444 | 308 | 438 | 0.59 | 0.46 | 0.65 |

TABLE 5-continued

| | | | | | | | | | |
|---|---|---|---|---|---|---|---|---|---|
| 276 | A | BB | A | 443 | 283 | 433 | 0.61 | 0.71 | 0.71 |
| 277 | A | BC | A | 435 | 311 | 445 | 0.69 | 0.53 | 0.58 |
| 278 | A | BD | A | 442 | 297 | 438 | 0.61 | 1.56 | 0.66 |
| 279 | A | BE | A | 443 | 358 | 439 | 0.60 | 0.60 | 0.64 |
| 280 | A | BF | A | 443 | 353 | 441 | 0.60 | 1.01 | 0.62 |
| 281 | A | BG | A | 436 | 333 | 443 | 0.67 | 0.90 | 0.60 |
| 282 | A | BH | A | 437 | 340 | 444 | 0.67 | 0.76 | 0.59 |
| 283 | A | BI | A | 435 | 327 | 433 | 0.68 | 1.22 | 0.70 |
| 284 | A | BJ | A | 441 | 268 | 433 | 0.62 | 1.11 | 0.70 |
| 285 | A | BK | A | 434 | 360 | 437 | 0.70 | 0.55 | 0.67 |
| 286 | A | BL | A | 438 | 359 | 441 | 0.65 | 0.69 | 0.62 |
| 287 | A | BM | A | 433 | 299 | 432 | 0.70 | 0.73 | 0.71 |
| 288 | A | BN | A | 445 | 313 | 440 | 0.58 | 0.70 | 0.63 |
| 289 | A | BO | A | 442 | 326 | 444 | 0.61 | 0.91 | 0.59 |
| 290 | A | BP | A | 441 | 337 | 440 | 0.62 | 0.64 | 0.63 |
| 291 | A | BQ | A | 442 | 321 | 435 | 0.61 | 0.72 | 0.69 |
| 292 | A | BR | A | 437 | 324 | 440 | 0.67 | 0.74 | 0.63 |
| 293 | B | H | B | 556 | 81 | 566 | 0.36 | 0.01 | 0.25 |
| 294 | B | I | B | 566 | 83 | 553 | 0.24 | 0.16 | 0.40 |
| 295 | B | J | B | 561 | 103 | 560 | 0.31 | 0.20 | 0.32 |
| 296 | B | K | B | 562 | 149 | 561 | 0.30 | 0.25 | 0.31 |
| 297 | B | L | B | 555 | 170 | 559 | 0.37 | 0.51 | 0.32 |
| 298 | B | M | B | 557 | 251 | 564 | 0.35 | 0.39 | 0.27 |
| 299 | B | N | B | 565 | 386 | 551 | 0.26 | 0.03 | 0.42 |
| 300 | B | O | B | 556 | 382 | 561 | 0.37 | 0.02 | 0.30 |
| 301 | B | P | B | 553 | 371 | 553 | 0.39 | 0.18 | 0.39 |
| 302 | B | Q | B | 565 | 377 | 556 | 0.26 | 0.10 | 0.36 |
| 303 | B | R | B | 552 | 364 | 560 | 0.40 | 0.37 | 0.32 |
| 304 | B | S | B | 566 | 395 | 561 | 0.24 | 0.06 | 0.31 |
| 305 | B | T | B | 552 | 370 | 550 | 0.41 | 0.43 | 0.43 |
| 306 | B | U | B | 565 | 324 | 560 | 0.26 | 0.99 | 0.32 |
| 307 | B | V | B | 559 | 358 | 564 | 0.33 | 0.79 | 0.27 |
| 308 | B | W | B | 554 | 383 | 557 | 0.39 | 0.71 | 0.35 |
| 309 | B | X | B | 560 | 338 | 551 | 0.32 | 1.29 | 0.42 |
| 310 | B | Y | B | 564 | 501 | 565 | 0.27 | 0.03 | 0.26 |
| 311 | B | Z | B | 561 | 411 | 556 | 0.31 | 0.76 | 0.36 |
| 312 | B | AA | B | 558 | 433 | 557 | 0.34 | 0.75 | 0.35 |
| 313 | B | AB | B | 563 | 421 | 561 | 0.28 | 0.98 | 0.31 |
| 314 | B | AC | B | 555 | 420 | 553 | 0.38 | 1.05 | 0.39 |
| 315 | B | AD | B | 553 | 405 | 566 | 0.40 | 1.43 | 0.25 |
| 316 | B | AE | B | 566 | 355 | 564 | 0.25 | 2.36 | 0.27 |
| 317 | B | AF | B | 559 | 392 | 560 | 0.33 | 2.14 | 0.31 |
| 318 | B | AG | B | 560 | 428 | 559 | 0.32 | 1.83 | 0.32 |
| 319 | B | AH | B | 555 | 425 | 566 | 0.38 | 2.08 | 0.25 |
| 320 | B | AI | B | 565 | 356 | 565 | 0.25 | 3.11 | 0.26 |
| 321 | B | AJ | B | 559 | 369 | 553 | 0.33 | 3.14 | 0.40 |
| 322 | B | AK | B | 560 | 386 | 554 | 0.32 | 3.23 | 0.38 |
| 323 | B | AL | B | 553 | 389 | 557 | 0.40 | 3.49 | 0.35 |
| 324 | B | AM | B | 565 | 73 | 557 | 0.26 | 0.00 | 0.35 |
| 325 | B | AN | B | 554 | 354 | 562 | 0.39 | 1.01 | 0.29 |
| 326 | B | AO | B | 556 | 344 | 560 | 0.36 | 0.63 | 0.32 |
| 327 | B | AP | B | 553 | 343 | 562 | 0.40 | 1.51 | 0.30 |
| 328 | B | AQ | B | 552 | 301 | 551 | 0.41 | 1.17 | 0.42 |
| 329 | B | AR | B | 555 | 269 | 554 | 0.37 | 0.28 | 0.38 |
| 330 | B | AS | B | 561 | 294 | 564 | 0.31 | 1.39 | 0.27 |
| 331 | B | AT | B | 561 | 331 | 558 | 0.30 | 1.47 | 0.34 |
| 332 | B | AU | B | 556 | 348 | 559 | 0.36 | 1.01 | 0.33 |
| 333 | B | AV | B | 566 | 331 | 557 | 0.24 | 0.51 | 0.35 |
| 334 | B | AW | B | 557 | 325 | 560 | 0.35 | 1.29 | 0.32 |
| 335 | B | AX | B | 560 | 299 | 553 | 0.32 | 0.77 | 0.39 |
| 336 | B | AY | B | 560 | 340 | 552 | 0.32 | 1.14 | 0.41 |
| 337 | B | AZ | B | 557 | 362 | 566 | 0.35 | 0.89 | 0.25 |
| 338 | B | BA | B | 551 | 305 | 550 | 0.42 | 0.47 | 0.43 |
| 339 | B | BB | B | 551 | 275 | 551 | 0.42 | 0.75 | 0.42 |
| 340 | B | BC | B | 564 | 311 | 566 | 0.27 | 0.54 | 0.24 |
| 341 | B | BD | B | 552 | 293 | 562 | 0.41 | 1.60 | 0.29 |
| 342 | B | BE | B | 554 | 358 | 566 | 0.39 | 0.61 | 0.24 |
| 343 | B | BF | B | 565 | 362 | 551 | 0.26 | 0.94 | 0.42 |
| 344 | B | BG | B | 557 | 332 | 565 | 0.35 | 0.91 | 0.26 |
| 345 | B | BH | B | 563 | 343 | 557 | 0.28 | 0.73 | 0.35 |
| 346 | B | BI | B | 554 | 332 | 559 | 0.39 | 1.17 | 0.33 |
| 347 | B | BJ | B | 565 | 267 | 563 | 0.26 | 1.11 | 0.28 |
| 348 | B | BK | B | 557 | 362 | 557 | 0.35 | 0.53 | 0.35 |
| 349 | B | BL | B | 561 | 358 | 552 | 0.30 | 0.70 | 0.40 |
| 350 | B | BM | B | 562 | 300 | 559 | 0.30 | 0.72 | 0.33 |
| 351 | B | BN | B | 556 | 308 | 552 | 0.36 | 0.73 | 0.41 |
| 352 | B | BO | B | 559 | 328 | 552 | 0.32 | 0.89 | 0.41 |
| 353 | B | BP | B | 550 | 343 | 566 | 0.43 | 0.60 | 0.25 |
| 354 | B | BQ | B | 557 | 327 | 552 | 0.35 | 0.68 | 0.41 |
| 355 | B | BR | B | 553 | 324 | 554 | 0.40 | 0.74 | 0.39 |

TABLE 5-continued

| | | | | | | | | | |
|---|---|---|---|---|---|---|---|---|---|
| 356 | C | H | C | 482 | 80 | 475 | 0.97 | 0.01 | 1.05 |
| 357 | C | I | C | 476 | 84 | 475 | 1.04 | 0.16 | 1.05 |
| 358 | C | J | C | 478 | 102 | 480 | 1.02 | 0.21 | 0.99 |
| 359 | C | K | C | 481 | 149 | 474 | 0.99 | 0.25 | 1.07 |
| 360 | C | L | C | 477 | 175 | 487 | 1.03 | 0.49 | 0.92 |
| 361 | C | M | C | 475 | 256 | 479 | 1.05 | 0.37 | 1.01 |
| 362 | C | N | C | 479 | 388 | 483 | 1.01 | 0.04 | 0.96 |
| 363 | C | O | C | 477 | 384 | 483 | 1.03 | 0.00 | 0.96 |
| 364 | C | P | C | 487 | 373 | 482 | 0.91 | 0.17 | 0.97 |
| 365 | C | Q | C | 483 | 383 | 477 | 0.97 | 0.06 | 1.04 |
| 366 | C | R | C | 488 | 368 | 477 | 0.91 | 0.34 | 1.03 |
| 367 | C | S | C | 483 | 397 | 478 | 0.96 | 0.04 | 1.02 |
| 368 | C | T | C | 484 | 374 | 477 | 0.96 | 0.40 | 1.03 |
| 369 | C | U | C | 474 | 326 | 485 | 1.06 | 0.97 | 0.94 |
| 370 | C | V | C | 482 | 353 | 477 | 0.98 | 0.83 | 1.03 |
| 371 | C | W | C | 479 | 377 | 476 | 1.00 | 0.76 | 1.05 |
| 372 | C | X | C | 484 | 335 | 487 | 0.95 | 1.32 | 0.91 |
| 373 | C | Y | C | 477 | 498 | 484 | 1.03 | 0.03 | 0.96 |
| 374 | C | Z | C | 481 | 405 | 482 | 0.98 | 0.83 | 0.97 |
| 375 | C | AA | C | 485 | 440 | 480 | 0.94 | 0.67 | 1.00 |
| 376 | C | AB | C | 479 | 422 | 474 | 1.01 | 0.96 | 1.06 |
| 377 | C | AC | C | 475 | 424 | 485 | 1.05 | 1.01 | 0.94 |
| 378 | C | AD | C | 480 | 413 | 480 | 1.00 | 1.35 | 1.00 |
| 379 | C | AE | C | 486 | 361 | 480 | 0.92 | 2.28 | 0.99 |
| 380 | C | AF | C | 477 | 393 | 486 | 1.03 | 2.11 | 0.93 |
| 381 | C | AG | C | 479 | 427 | 477 | 1.00 | 1.84 | 1.03 |
| 382 | C | AH | C | 475 | 425 | 481 | 1.05 | 2.08 | 0.99 |
| 383 | C | AI | C | 477 | 360 | 478 | 1.03 | 3.06 | 1.02 |
| 384 | C | AJ | C | 474 | 363 | 481 | 1.06 | 3.20 | 0.98 |
| 385 | C | AK | C | 476 | 395 | 486 | 1.05 | 3.14 | 0.93 |
| 386 | C | AL | C | 476 | 397 | 480 | 1.04 | 3.39 | 1.02 |
| 387 | C | AM | C | 477 | 77 | 480 | 1.03 | 0.00 | 1.00 |
| 388 | C | AN | C | 478 | 350 | 475 | 1.02 | 1.05 | 1.05 |
| 389 | C | AO | C | 477 | 343 | 479 | 1.03 | 0.63 | 1.00 |
| 390 | C | AP | C | 485 | 349 | 486 | 0.95 | 1.44 | 0.93 |
| 391 | C | AQ | C | 480 | 299 | 475 | 1.00 | 1.19 | 1.06 |
| 392 | C | AR | C | 479 | 268 | 481 | 1.01 | 0.28 | 0.98 |
| 393 | C | AS | C | 481 | 294 | 478 | 0.99 | 1.38 | 1.02 |
| 394 | C | AT | C | 480 | 336 | 475 | 0.99 | 1.40 | 1.05 |
| 395 | C | AU | C | 474 | 348 | 487 | 1.06 | 1.02 | 0.92 |
| 396 | C | AV | C | 480 | 329 | 480 | 1.00 | 0.52 | 1.00 |
| 397 | C | AW | C | 479 | 326 | 478 | 1.01 | 1.28 | 1.02 |
| 398 | C | AX | C | 481 | 306 | 477 | 0.99 | 0.72 | 1.03 |
| 399 | C | AY | C | 474 | 337 | 484 | 1.06 | 1.17 | 0.95 |
| 400 | C | AZ | C | 485 | 367 | 483 | 0.94 | 0.85 | 0.96 |
| 401 | C | BA | C | 478 | 301 | 481 | 1.02 | 0.50 | 0.98 |
| 402 | C | BB | C | 486 | 277 | 486 | 0.93 | 0.74 | 0.93 |
| 403 | C | BC | C | 476 | 310 | 484 | 1.04 | 0.54 | 0.95 |
| 404 | C | BD | C | 474 | 298 | 478 | 1.06 | 1.55 | 1.01 |
| 405 | C | BE | C | 484 | 361 | 484 | 0.95 | 0.58 | 0.95 |
| 406 | C | BF | C | 487 | 358 | 480 | 0.92 | 0.97 | 1.00 |
| 407 | C | BG | C | 486 | 328 | 483 | 0.93 | 0.94 | 0.96 |
| 408 | C | BH | C | 484 | 336 | 483 | 0.95 | 0.80 | 0.96 |
| 409 | C | BI | C | 486 | 328 | 487 | 0.92 | 1.20 | 0.92 |
| 410 | C | BJ | C | 482 | 272 | 485 | 0.98 | 1.08 | 0.94 |
| 411 | C | BK | C | 479 | 360 | 477 | 1.01 | 0.55 | 1.03 |
| 412 | C | BL | C | 474 | 358 | 485 | 1.06 | 0.69 | 0.94 |
| 413 | C | BM | C | 474 | 300 | 487 | 1.07 | 0.73 | 0.92 |
| 414 | C | BN | C | 481 | 307 | 483 | 0.98 | 0.74 | 0.96 |
| 415 | C | BO | C | 474 | 323 | 483 | 1.06 | 0.94 | 0.96 |
| 416 | C | BP | C | 477 | 341 | 486 | 1.03 | 0.61 | 0.92 |
| 417 | C | BQ | C | 485 | 324 | 475 | 0.94 | 0.70 | 1.06 |
| 418 | C | BR | C | 487 | 324 | 482 | 0.91 | 0.74 | 0.97 |

| | Wear (mg) | | Roll forming: cracks after cross-section | | | Nanohardness standard deviation | | TS | |
|---|---|---|---|---|---|---|---|---|---|
| Ex. no. | Top | Bottom | Top | Inside | Bottom | Top | Bottom | (MPa) | Remarks |
| 230 | 2.66 | 2.63 | Good | Good | Good | 1.53 | 1.57 | 678 | Inv.ex. |
| 231 | 2.68 | 2.63 | Good | Good | Good | 1.03 | 1 | 681 | Inv.ex. |
| 232 | 2.66 | 2.65 | Good | Good | Good | 0.21 | 0.22 | 708 | Inv.ex. |
| 233 | 2.63 | 2.67 | Good | Good | Good | 1.35 | 1.38 | 767 | Inv.ex. |
| 234 | 2.65 | 2.68 | Good | Good | Good | 1.09 | 1.08 | 806 | Inv.ex. |
| 235 | 2.67 | 2.63 | Good | Good | Good | 1.58 | 1.56 | 912 | Inv.ex. |
| 236 | 2.67 | 2.67 | Good | Good | Good | 0.61 | 0.61 | 1095 | Inv.ex. |
| 237 | 2.63 | 2.63 | Good | Good | Good | 1.25 | 1.25 | 1113 | Inv.ex. |
| 238 | 2.66 | 2.67 | Good | Good | Good | 0.87 | 0.85 | 1082 | Inv.ex. |
| 239 | 2.69 | 2.66 | Good | Good | Good | 0.62 | 0.62 | 1097 | Inv.ex. |
| 240 | 2.67 | 2.65 | Good | Good | Good | 0.23 | 0.23 | 1068 | Inv.ex. |

TABLE 5-continued

| | | | | | | | | | |
|---|---|---|---|---|---|---|---|---|---|
| 241 | 2.68 | 2.68 | Good | Good | Good | 0.68 | 0.68 | 1116 | Inv.ex. |
| 242 | 2.64 | 2.66 | Good | Good | Good | 1.46 | 1.44 | 1085 | Inv.ex. |
| 243 | 2.70 | 2.68 | Good | Good | Good | 0.6 | 0.61 | 1013 | Inv.ex. |
| 244 | 2.63 | 2.63 | Good | Good | Good | 0.81 | 0.82 | 1057 | Inv.ex. |
| 245 | 2.66 | 2.63 | Good | Good | Good | 0.93 | 0.94 | 1100 | Inv.ex. |
| 246 | 2.68 | 2.65 | Good | Good | Good | 0.52 | 0.51 | 1028 | Inv.ex. |
| 247 | 2.65 | 2.68 | Good | Poor | Good | 1.39 | 1.35 | 1248 | Comp.ex. |
| 248 | 2.67 | 2.65 | Good | Poor | Good | 1.56 | 1.58 | 1143 | Comp.ex. |
| 249 | 2.69 | 2.67 | Good | Poor | Good | 1.58 | 1.6 | 1175 | Comp.ex. |
| 250 | 2.69 | 2.63 | Good | Poor | Good | 0.59 | 0.58 | 1155 | Comp.ex. |
| 251 | 2.67 | 2.63 | Good | Poor | Good | 0.35 | 0.35 | 1154 | Comp.ex. |
| 252 | 2.70 | 2.71 | Good | Poor | Good | 0.95 | 0.94 | 1122 | Comp.ex. |
| 253 | 2.66 | 2.67 | Good | Poor | Good | 1.11 | 1.09 | 1060 | Comp.ex. |
| 254 | 2.68 | 2.63 | Good | Poor | Good | 1.07 | 1.04 | 1098 | Comp.ex. |
| 255 | 2.67 | 2.65 | Good | Poor | Good | 0.64 | 0.64 | 1154 | Comp.ex. |
| 256 | 2.67 | 2.70 | Good | Poor | Good | 1.56 | 1.56 | 1150 | Comp.ex. |
| 257 | 2.66 | 2.70 | Good | Poor | Good | 0.55 | 0.56 | 1068 | Comp.ex. |
| 258 | 2.63 | 2.71 | Good | Poor | Good | 1.26 | 1.23 | 1069 | Comp.ex. |
| 259 | 2.69 | 2.70 | Good | Poor | Good | 1.46 | 1.48 | 1094 | Comp.ex. |
| 260 | 2.70 | 2.66 | Good | Poor | Good | 0.52 | 0.52 | 1107 | Comp.ex. |
| 261 | 2.65 | 2.65 | Good | Poor | Good | 1.49 | 1.49 | 673 | Comp.ex. |
| 262 | 2.70 | 2.70 | Good | Poor | Good | 1.54 | 1.5 | 1043 | Comp.ex. |
| 263 | 2.66 | 2.63 | Good | Poor | Good | 0.71 | 0.69 | 1041 | Comp.ex. |
| 264 | 2.69 | 2.70 | Good | Poor | Good | 1.43 | 1.45 | 1035 | Comp.ex. |
| 265 | 2.66 | 2.66 | Good | Poor | Good | 1.27 | 1.24 | 976 | Comp.ex. |
| 266 | 2.69 | 2.67 | Good | Poor | Good | 0.36 | 0.37 | 933 | Comp.ex. |
| 267 | 2.66 | 2.67 | Good | Good | Good | 1.34 | 1.32 | 973 | Inv.ex. |
| 268 | 2.65 | 2.71 | Good | Good | Good | 0.92 | 0.95 | 1020 | Inv.ex. |
| 269 | 2.67 | 2.66 | Good | Poor | Good | 0.94 | 0.97 | 1050 | Comp.ex. |
| 270 | 2.65 | 2.65 | Good | Poor | Good | 0.35 | 0.35 | 1023 | Comp.ex. |
| 271 | 2.71 | 2.66 | Good | Poor | Good | 0.7 | 0.71 | 1015 | Comp.ex. |
| 272 | 2.69 | 2.69 | Good | Poor | Good | 1.09 | 1.11 | 985 | Comp.ex. |
| 273 | 2.64 | 2.68 | Good | Poor | Good | 1.19 | 1.2 | 1032 | Comp.ex. |
| 274 | 2.71 | 2.67 | Good | Poor | Good | 0.44 | 0.45 | 1065 | Comp.ex. |
| 275 | 2.63 | 2.67 | Good | Poor | Good | 0.4 | 0.41 | 993 | Comp.ex. |
| 276 | 2.64 | 2.71 | Good | Poor | Good | 0.8 | 0.79 | 954 | Comp.ex. |
| 277 | 2.70 | 2.63 | Good | Poor | Good | 0.2 | 0.2 | 996 | Comp.ex. |
| 278 | 2.65 | 2.67 | Good | Poor | Good | 0.28 | 0.27 | 977 | Comp.ex. |
| 279 | 2.64 | 2.66 | Good | Poor | Good | 1.55 | 1.56 | 1063 | Comp.ex. |
| 280 | 2.64 | 2.65 | Good | Poor | Good | 1.52 | 1.56 | 1057 | Comp.ex. |
| 281 | 2.69 | 2.64 | Good | Poor | Good | 1.01 | 1.01 | 1027 | Comp.ex. |
| 282 | 2.68 | 2.63 | Good | Poor | Good | 1.57 | 1.55 | 1037 | Comp.ex. |
| 283 | 2.69 | 2.70 | Good | Poor | Good | 0.69 | 0.69 | 1013 | Comp.ex. |
| 284 | 2.65 | 2.70 | Good | Poor | Good | 1.18 | 1.19 | 934 | Comp.ex. |
| 285 | 2.70 | 2.68 | Good | Poor | Good | 1 | 1 | 1060 | Comp.ex. |
| 286 | 2.67 | 2.65 | Good | Poor | Good | 1.44 | 1.47 | 1062 | Comp.ex. |
| 287 | 2.71 | 2.71 | Good | Poor | Good | 1.18 | 1.19 | 972 | Comp.ex. |
| 288 | 2.63 | 2.66 | Good | Poor | Good | 0.98 | 0.97 | 1001 | Comp.ex. |
| 289 | 2.64 | 2.63 | Good | Poor | Good | 1.02 | 1.05 | 1021 | Comp.ex. |
| 290 | 2.65 | 2.66 | Good | Poor | Good | 0.79 | 0.78 | 1034 | Comp.ex. |
| 291 | 2.65 | 2.70 | Good | Poor | Good | 0.87 | 0.89 | 1009 | Comp.ex. |
| 292 | 2.68 | 2.66 | Good | Poor | Good | 0.49 | 0.5 | 1013 | Comp.ex. |
| 293 | 2.15 | 2.12 | Good | Good | Good | 1.49 | 1.5 | 788 | Inv.ex. |
| 294 | 2.12 | 2.16 | Good | Good | Good | 1.14 | 1.16 | 790 | Inv.ex. |
| 295 | 2.14 | 2.14 | Good | Good | Good | 0.92 | 0.9 | 819 | Inv.ex. |
| 296 | 2.14 | 2.14 | Good | Good | Good | 0.36 | 0.36 | 884 | Inv.ex. |
| 297 | 2.15 | 2.14 | Good | Good | Good | 0.59 | 0.58 | 909 | Inv.ex. |
| 298 | 2.15 | 2.13 | Good | Good | Good | 0.42 | 0.41 | 1024 | Inv.ex. |
| 299 | 2.13 | 2.17 | Good | Good | Good | 0.25 | 0.25 | 1210 | Inv.ex. |
| 300 | 2.15 | 2.14 | Good | Good | Good | 0.34 | 0.35 | 1205 | Inv.ex. |
| 301 | 2.16 | 2.16 | Good | Good | Good | 0.54 | 0.53 | 1185 | Inv.ex. |
| 302 | 2.13 | 2.15 | Good | Good | Good | 1.03 | 1.02 | 1199 | Inv.ex. |
| 303 | 2.16 | 2.14 | Good | Good | Good | 0.32 | 0.31 | 1178 | Inv.ex. |
| 304 | 2.12 | 2.14 | Good | Good | Good | 1.01 | 1.03 | 1228 | Inv.ex. |
| 305 | 2.17 | 2.17 | Good | Good | Good | 0.24 | 0.23 | 1182 | Inv.ex. |
| 306 | 2.13 | 2.14 | Good | Good | Good | 1.38 | 1.39 | 1127 | Inv.ex. |
| 307 | 2.14 | 2.13 | Good | Good | Good | 0.3 | 0.3 | 1174 | Inv.ex. |
| 308 | 2.16 | 2.15 | Good | Good | Good | 0.52 | 0.51 | 1204 | Inv.ex. |
| 309 | 2.14 | 2.17 | Good | Good | Good | 1.53 | 1.53 | 1140 | Inv.ex. |
| 310 | 2.13 | 2.13 | Good | Poor | Good | 0.59 | 0.6 | 1376 | Comp.ex. |
| 311 | 2.14 | 2.15 | Good | Poor | Good | 1.18 | 1.19 | 1246 | Comp.ex. |
| 312 | 2.15 | 2.15 | Good | Poor | Good | 1.18 | 1.14 | 1274 | Comp.ex. |
| 313 | 2.13 | 2.14 | Good | Poor | Good | 1.2 | 1.19 | 1262 | Comp.ex. |
| 314 | 2.16 | 2.16 | Good | Poor | Good | 1.46 | 1.44 | 1254 | Comp.ex. |
| 315 | 2.16 | 2.12 | Good | Poor | Good | 0.58 | 0.56 | 1238 | Comp.ex. |
| 316 | 2.12 | 2.13 | Good | Poor | Good | 1.45 | 1.47 | 1173 | Comp.ex. |
| 317 | 2.14 | 2.14 | Good | Poor | Good | 0.39 | 0.4 | 1219 | Comp.ex. |
| 318 | 2.14 | 2.14 | Good | Poor | Good | 0.79 | 0.79 | 1270 | Comp.ex. |
| 319 | 2.16 | 2.12 | Good | Poor | Good | 1.43 | 1.39 | 1267 | Comp.ex. |
| 320 | 2.13 | 2.13 | Good | Poor | Good | 0.22 | 0.22 | 1175 | Comp.ex. |

TABLE 5-continued

| | | | | | | | | | |
|---|---|---|---|---|---|---|---|---|---|
| 321 | 2.15 | 2.15 | Good | Poor | Good | 1.22 | 1.22 | 1184 | Comp.ex. |
| 322 | 2.14 | 2.16 | Good | Poor | Good | 1.34 | 1.37 | 1210 | Comp.ex. |
| 323 | 2.16 | 2.15 | Good | Poor | Good | 0.32 | 0.33 | 1212 | Comp.ex. |
| 324 | 2.13 | 2.15 | Good | Poor | Good | 0.42 | 0.42 | 777 | Comp.ex. |
| 325 | 2.16 | 2.13 | Good | Poor | Good | 0.39 | 0.39 | 1165 | Comp.ex. |
| 326 | 2.15 | 2.14 | Good | Poor | Good | 0.66 | 0.64 | 1152 | Comp.ex. |
| 327 | 2.16 | 2.14 | Good | Poor | Good | 1.56 | 1.57 | 1150 | Comp.ex. |
| 328 | 2.17 | 2.17 | Good | Poor | Good | 0.39 | 0.39 | 1086 | Comp.ex. |
| 329 | 2.16 | 2.16 | Good | Poor | Good | 1 | 0.99 | 1044 | Comp.ex. |
| 330 | 2.14 | 2.13 | Good | Good | Good | 0.39 | 0.38 | 1086 | Inv.ex. |
| 331 | 2.14 | 2.15 | Good | Good | Good | 0.84 | 0.83 | 1135 | Inv.ex. |
| 332 | 2.15 | 2.14 | Good | Poor | Good | 1.55 | 1.55 | 1158 | Comp.ex. |
| 333 | 2.12 | 2.15 | Good | Poor | Good | 1.53 | 1.55 | 1137 | Comp.ex. |
| 334 | 2.15 | 2.14 | Good | Poor | Good | 1.14 | 1.12 | 1125 | Comp.ex. |
| 335 | 2.14 | 2.16 | Good | Poor | Good | 0.56 | 0.56 | 1087 | Comp.ex. |
| 336 | 2.14 | 2.16 | Good | Poor | Good | 0.88 | 0.86 | 1145 | Comp.ex. |
| 337 | 2.15 | 2.12 | Good | Poor | Good | 0.53 | 0.54 | 1180 | Comp.ex. |
| 338 | 2.17 | 2.17 | Good | Poor | Good | 0.69 | 0.7 | 1091 | Comp.ex. |
| 339 | 2.17 | 2.17 | Good | Poor | Good | 0.43 | 0.43 | 1049 | Comp.ex. |
| 340 | 2.13 | 2.12 | Good | Poor | Good | 1.16 | 1.13 | 1112 | Comp.ex. |
| 341 | 2.17 | 2.14 | Good | Poor | Good | 0.85 | 0.85 | 1080 | Comp.ex. |
| 342 | 2.16 | 2.12 | Good | Poor | Good | 0.85 | 0.83 | 1173 | Comp.ex. |
| 343 | 2.13 | 2.17 | Good | Poor | Good | 1.23 | 1.26 | 1176 | Comp.ex. |
| 344 | 2.15 | 2.13 | Good | Poor | Good | 0.77 | 0.76 | 1137 | Comp.ex. |
| 345 | 2.13 | 2.15 | Good | Poor | Good | 0.36 | 0.37 | 1153 | Comp.ex. |
| 346 | 2.16 | 2.14 | Good | Poor | Good | 1.16 | 1.15 | 1134 | Comp.ex. |
| 347 | 2.13 | 2.13 | Good | Poor | Good | 0.29 | 0.28 | 1051 | Comp.ex. |
| 348 | 2.15 | 2.15 | Good | Poor | Good | 0.96 | 0.98 | 1175 | Comp.ex. |
| 349 | 2.14 | 2.16 | Good | Poor | Good | 1.54 | 1.52 | 1170 | Comp.ex. |
| 350 | 2.14 | 2.14 | Good | Poor | Good | 0.9 | 0.88 | 1093 | Comp.ex. |
| 351 | 2.15 | 2.17 | Good | Poor | Good | 0.86 | 0.84 | 1097 | Comp.ex. |
| 352 | 2.14 | 2.16 | Good | Poor | Good | 0.6 | 0.58 | 1128 | Comp.ex. |
| 353 | 2.17 | 2.12 | Good | Poor | Good | 0.67 | 0.67 | 1150 | Comp.ex. |
| 354 | 2.15 | 2.17 | Good | Poor | Good | 1.01 | 1.01 | 1125 | Comp.ex. |
| 355 | 2.16 | 2.16 | Good | Poor | Good | 0.47 | 0.46 | 1119 | Comp.ex. |
| 356 | 2.43 | 2.46 | Good | Good | Good | 0.2 | 0.19 | 711 | Inv.ex. |
| 357 | 2.45 | 2.46 | Good | Good | Good | 1.59 | 1.63 | 713 | Inv.ex. |
| 358 | 2.45 | 2.44 | Good | Good | Good | 1.56 | 1.54 | 742 | Inv.ex. |
| 359 | 2.43 | 2.47 | Good | Good | Good | 0.86 | 0.87 | 805 | Inv.ex. |
| 360 | 2.45 | 2.41 | Good | Good | Good | 1.2 | 1.19 | 845 | Inv.ex. |
| 361 | 2.46 | 2.44 | Good | Good | Good | 1 | 0.98 | 954 | Inv.ex. |
| 362 | 2.44 | 2.42 | Good | Good | Good | 1.42 | 1.46 | 1141 | Inv.ex. |
| 363 | 2.45 | 2.42 | Good | Good | Good | 0.52 | 0.52 | 1136 | Inv.ex. |
| 364 | 2.40 | 2.43 | Good | Good | Good | 0.7 | 0.71 | 1123 | Inv.ex. |
| 365 | 2.42 | 2.45 | Good | Good | Good | 1.28 | 1.25 | 1133 | Inv.ex. |
| 366 | 2.40 | 2.45 | Good | Good | Good | 0.64 | 0.64 | 1115 | Inv.ex. |
| 367 | 2.42 | 2.45 | Good | Good | Good | 0.8 | 0.78 | 1154 | Inv.ex. |
| 368 | 2.42 | 2.45 | Good | Good | Good | 0.97 | 0.94 | 1122 | Inv.ex. |
| 369 | 2.46 | 2.42 | Good | Good | Good | 0.73 | 0.72 | 1054 | Inv.ex. |
| 370 | 2.43 | 2.45 | Good | Good | Good | 0.46 | 0.46 | 1091 | Inv.ex. |
| 371 | 2.44 | 2.46 | Good | Good | Good | 0.68 | 0.67 | 1123 | Inv.ex. |
| 372 | 2.42 | 2.40 | Good | Good | Good | 1.38 | 1.37 | 1072 | Inv.ex. |
| 373 | 2.45 | 2.42 | Good | Poor | Good | 0.46 | 0.46 | 1295 | Comp.ex. |
| 374 | 2.43 | 2.43 | Good | Poor | Good | 1.36 | 1.38 | 1166 | Comp.ex. |
| 375 | 2.41 | 2.44 | Good | Poor | Good | 1.32 | 1.34 | 1215 | Comp.ex. |
| 376 | 2.44 | 2.46 | Good | Poor | Good | 1.33 | 1.37 | 1186 | Comp.ex. |
| 377 | 2.46 | 2.41 | Good | Poor | Good | 1.2 | 1.18 | 1190 | Comp.ex. |
| 378 | 2.44 | 2.44 | Good | Poor | Good | 0.78 | 0.8 | 1175 | Comp.ex. |
| 379 | 2.41 | 2.44 | Good | Poor | Good | 0.27 | 0.27 | 1106 | Comp.ex. |
| 380 | 2.45 | 2.41 | Good | Poor | Good | 0.87 | 0.85 | 1150 | Comp.ex. |
| 381 | 2.44 | 2.45 | Good | Poor | Good | 0.58 | 0.58 | 1194 | Comp.ex. |
| 382 | 2.46 | 2.43 | Good | Poor | Good | 0.3 | 0.29 | 1190 | Comp.ex. |
| 383 | 2.45 | 2.45 | Good | Poor | Good | 0.74 | 0.75 | 1099 | Comp.ex. |
| 384 | 2.46 | 2.43 | Good | Poor | Good | 1.53 | 1.51 | 1104 | Comp.ex. |
| 385 | 2.46 | 2.41 | Good | Poor | Good | 1.07 | 1.04 | 1150 | Comp.ex. |
| 386 | 2.45 | 2.44 | Good | Poor | Good | 0.26 | 0.26 | 1152 | Comp.ex. |
| 387 | 2.45 | 2.44 | Good | Poor | Good | 0.5 | 0.49 | 706 | Comp.ex. |
| 388 | 2.45 | 2.46 | Good | Poor | Good | 1.23 | 1.25 | 1085 | Comp.ex. |
| 389 | 2.45 | 2.44 | Good | Poor | Good | 1.2 | 1.17 | 1077 | Comp.ex. |
| 390 | 2.42 | 2.41 | Good | Poor | Good | 1.53 | 1.57 | 1092 | Comp.ex. |
| 391 | 2.44 | 2.46 | Good | Poor | Good | 0.72 | 0.73 | 1014 | Comp.ex. |
| 392 | 2.44 | 2.43 | Good | Poor | Good | 0.95 | 0.96 | 974 | Comp.ex. |
| 393 | 2.43 | 2.45 | Good | Good | Good | 0.52 | 0.51 | 1010 | Inv.ex. |
| 394 | 2.44 | 2.46 | Good | Good | Good | 0.62 | 0.6 | 1066 | Inv.ex. |
| 395 | 2.46 | 2.40 | Good | Poor | Good | 0.7 | 0.71 | 1085 | Comp.ex. |
| 396 | 2.44 | 2.44 | Good | Poor | Good | 1.4 | 1.42 | 1059 | Comp.ex. |
| 397 | 2.44 | 2.45 | Good | Poor | Good | 0.78 | 0.76 | 1052 | Comp.ex. |
| 398 | 2.43 | 2.45 | Good | Poor | Good | 0.9 | 0.88 | 1025 | Comp.ex. |
| 399 | 2.47 | 2.42 | Good | Poor | Good | 1.4 | 1.36 | 1069 | Comp.ex. |
| 400 | 2.41 | 2.42 | Good | Poor | Good | 1.39 | 1.38 | 1115 | Comp.ex. |

TABLE 5-continued

| | | | | | | | | | |
|---|---|---|---|---|---|---|---|---|---|
| 401 | 2.45 | 2.43 | Good | Poor | Good | 0.33 | 0.32 | 1019 | Comp.ex. |
| 402 | 2.41 | 2.41 | Good | Poor | Good | 1.57 | 1.53 | 992 | Comp.ex. |
| 403 | 2.46 | 2.42 | Good | Poor | Good | 1.06 | 1.08 | 1031 | Comp.ex. |
| 404 | 2.46 | 2.44 | Good | Poor | Good | 0.72 | 0.73 | 1012 | Comp.ex. |
| 405 | 2.42 | 2.42 | Good | Poor | Good | 1.11 | 1.1 | 1107 | Comp.ex. |
| 406 | 2.41 | 2.44 | Good | Poor | Good | 1.49 | 1.48 | 1101 | Comp.ex. |
| 407 | 2.41 | 2.42 | Good | Poor | Good | 0.54 | 0.54 | 1061 | Comp.ex. |
| 408 | 2.42 | 2.42 | Good | Poor | Good | 0.8 | 0.82 | 1071 | Comp.ex. |
| 409 | 2.41 | 2.41 | Good | Poor | Good | 0.49 | 0.49 | 1063 | Comp.ex. |
| 410 | 2.43 | 2.42 | Good | Poor | Good | 0.77 | 0.79 | 982 | Comp.ex. |
| 411 | 2.44 | 2.45 | Good | Poor | Good | 1.01 | 1.01 | 1099 | Comp.ex. |
| 412 | 2.46 | 2.42 | Good | Poor | Good | 1.36 | 1.38 | 1099 | Comp.ex. |
| 413 | 2.47 | 2.41 | Good | Poor | Good | 0.55 | 0.55 | 1018 | Comp.ex. |
| 414 | 2.43 | 2.42 | Good | Poor | Good | 1.12 | 1.12 | 1030 | Comp.ex. |
| 415 | 2.46 | 2.42 | Good | Poor | Good | 1.29 | 1.28 | 1048 | Comp.ex. |
| 416 | 2.45 | 2.41 | Good | Poor | Good | 1.12 | 1.09 | 1077 | Comp.ex. |
| 417 | 2.41 | 2.46 | Good | Poor | Good | 0.63 | 0.62 | 1052 | Comp.ex. |
| 418 | 2.40 | 2.43 | Good | Poor | Good | 0.51 | 0.52 | 1056 | Comp.ex. |

*Bold underlines show outside scope of present invention.

Table 4 and Table 5 show the results of evaluation of the samples. In all of Example Nos. 51 to 73, 113 to 135, 175 to 197, 230 to 246, 267, 268, 293 to 309, 330, 331, 356 to 372, 393, and 394, the average micro-Vickers hardness of the hard layer was 400 HV or more and less than 700 HV, the amount of C of the hard layer was 0.08 to 0.40% and the amount of N was 0.02% or less, the average Vickers hardness of the inner layer was 80 HV or more 400 HV or less, the volume ratio of the carbides contained in the inner layer was less than 2%, and the wear resistance and cold workability were excellent.

Further, to investigate the effects of the manufacturing conditions by hot rolling, multilayer materials of ingots arranging A, B, C, D, E, O, P, Q, R, S, T, U, V, W, X, Y, Z, AA, AB, AC, AD, AE, AF, AG, AH, AI, AJ, and AK of Table 1 recognized to have excellent characteristics at the hard layers as the top/bottom layers and combining them with D, E, F, H, I, J, K, L, M, N, O, P, Q, R, S, T, U, V, W, X, AS, and AT of Table 1 recognized to have excellent characteristics at the inner layers as the inner layers were prepared. These were pressed by a surface pressure of 0.1 MPa and held for 120 minutes in a furnace heated to 1000° C. for diffusion heat treatment. The ratio of thicknesses of the top/bottom layers in the multilayer material of the ingots was adjusted to ⅖ and the ratio of thickness of the inner layer was adjusted to ⅕. Next, thickness 2.4 mm samples were prepared by the hot rolling conditions shown in Table 6, pickled, then supplied for the various evaluation tests.

TABLE 6

| | Layer configuration | | | Hot rolling conditions | | | | | Ratio of structures (top/bottom layers) | | | | |
|---|---|---|---|---|---|---|---|---|---|---|---|---|---|
| Ex. no | Top/ bottom | Inside | Position of hard layer | Heating temp. (° C.) | Holding time (min) | Finish temp. (° C.) | Cooling rate (° C./s) | Coiling temp. (° C.) | Ferrite | Pearlite | Bainite | Martensite | Residual austenite |
| 419 | AJ | D | 2 sides | 1162 | 180 | 898 | 92.6 | 454 | 0 | 0.019 | 0.67 | 0.274 | 0.037 |
| 420 | X | E | 2 sides | 1249 | 39 | 637 | 52.4 | 310 | 0.002 | 0.044 | 0.003 | 0.917 | 0.034 |
| 421 | B | F | 2 sides | 1143 | 86 | 694 | 52.2 | 714 | 0.002 | 0.332 | 0.036 | 0.622 | 0.008 |
| 422 | AI | H | 2 sides | 1281 | 130 | 765 | 42.3 | 472 | 0.005 | 0.014 | 0.714 | 0.227 | 0.04 |
| 423 | D | I | 2 sides | — | — | 667 | 59.8 | 313 | 0.012 | 0.02 | 0.018 | 0.928 | 0.022 |
| 424 | AC | J | 2 sides | 1214 | 28 | 806 | 15.6 | 292 | 0.004 | 0.024 | 0.509 | 0.43 | 0.033 |
| 425 | S | K | 2 sides | 1165 | 63 | 705 | 74 | 325 | 0.004 | 0.014 | 0.006 | 0.97 | 0.006 |
| 426 | A | M | 2 sides | 1243 | 81 | 907 | 59 | 147 | 0.016 | 0.008 | 0.148 | 0.467 | 0.361 |
| 427 | W | O | 1 side | 1159 | 44 | 872 | 61.9 | 339 | 0.002 | 0.021 | 0.014 | 0.937 | 0.026 |
| 428 | Q | P | 2 sides | 1318 | 48 | 904 | 44.9 | 549 | 0.007 | 0.121 | 0.057 | 0.811 | 0.004 |
| 429 | AF | Q | 2 sides | 1144 | 48 | 682 | 74.5 | 672 | 0.004 | 0.127 | 0.151 | 0.644 | 0.074 |
| 430 | AK | R | 2 sides | — | — | 757 | 71.6 | 472 | 0.002 | 0.021 | 0.83 | 0.101 | 0.046 |
| 431 | C | S | 2 sides | 1290 | 31 | 660 | 78.5 | 14 | 0.017 | 0.072 | 0.027 | 0.74 | 0.144 |
| 432 | AD | T | 2 sides | 1165 | 12 | 909 | 98.3 | 465 | 0.009 | 0.01 | 0.805 | 0.132 | 0.044 |
| 433 | V | U | 2 sides | 1213 | 309 | 685 | 86.3 | 358 | 0.009 | 0.016 | 0.048 | 0.664 | 0.263 |
| 434 | Y | V | 2 sides | 1259 | 214 | 766 | 36.6 | 65 | 0.002 | 0.011 | 0.074 | 0.682 | 0.231 |
| 435 | AG | W | 2 sides | 1127 | 142 | 673 | 17 | 441 | 0.003 | 0.006 | 0.899 | 0.046 | 0.046 |
| 436 | E | X | 2 sides | 1113 | 238 | 804 | 34.4 | 109 | 0.004 | 0.018 | 0.055 | 0.813 | 0.11 |
| 437 | AB | AS | 2 sides | 1299 | 68 | 913 | 61.5 | 457 | 0.005 | 0.022 | 0.886 | 0.046 | 0.041 |
| 438 | Z | AT | 2 sides | 1250 | 28 | 752 | 83.9 | 276 | 0.015 | 0.092 | 0.008 | 0.713 | 0.172 |
| 439 | P | D | 1 side | 1119 | 43 | 786 | 52 | 221 | 0.018 | 0.006 | 0.029 | 0.671 | 0.276 |
| 440 | R | E | 2 sides | 1321 | 285 | 847 | 90.8 | 235 | 0.003 | 0.002 | 0 | 0.994 | 0.001 |
| 441 | AE | F | 2 sides | 1195 | 230 | 713 | 72.8 | 634 | 0.004 | 0.126 | 0.007 | 0.49 | 0.373 |
| 442 | AH | H | 1 side | 1287 | 232 | 879 | 85.7 | 517 | 0.007 | 0.021 | 0.912 | 0.017 | 0.043 |
| 443 | AA | I | 2 sides | 1135 | 28 | 944 | 97.4 | 220 | 0.004 | 0.022 | 0.019 | 0.95 | 0.005 |
| 444 | T | J | 1 side | 1236 | 32 | 727 | 43.1 | 131 | 0.011 | 0.021 | 0.01 | 0.929 | 0.029 |
| 445 | AB | K | 2 sides | 1286 | 207 | 644 | 23.8 | 281 | 0.009 | 0.003 | 0.023 | 0.938 | 0.027 |
| 446 | C | L | 2 sides | 1212 | 80 | 842 | 36.5 | 376 | 0.009 | 0.015 | 0.269 | 0.594 | 0.113 |
| 447 | AJ | M | 2 sides | 1113 | 14 | 704 | 34.3 | 284 | 0.019 | 0.045 | 0.005 | 0.832 | 0.099 |
| 448 | Y | N | 2 sides | 1110 | 29 | 878 | 42.7 | 683 | 0.002 | 0.118 | 0.082 | 0.75 | 0.048 |

TABLE 6-continued

| | | | | | | | | | | | | | | |
|---|---|---|---|---|---|---|---|---|---|---|---|---|---|---|
| 449 | U | O | 2 sides | 1101 | 223 | 727 | 34.8 | 216 | 0.014 | 0.031 | 0.018 | 0.675 | 0.262 | |
| 450 | S | P | 2 sides | 1087 | 215 | 888 | 33.9 | 317 | 0.006 | 0.004 | 0.015 | 0.97 | 0.005 | |
| 451 | Q | Q | 2 sides | — | — | 873 | 59.1 | 496 | 0.003 | 0.122 | 0.037 | 0.836 | 0.002 | |
| 452 | V | R | 2 sides | 1257 | 264 | 773 | 99.8 | 250 | 0.028 | 0.05 | 0.011 | 0.689 | 0.222 | |
| 453 | X | S | 2 sides | 1230 | 299 | 695 | 90.6 | 344 | 0.014 | 0.021 | 0.036 | 0.853 | 0.076 | |
| 454 | B | T | 2 sides | 1276 | 186 | 834 | 66.4 | 254 | 0.018 | 0.014 | 0.014 | 0.899 | 0.055 | |
| 455 | AC | U | 2 sides | 1064 | 138 | 930 | 32.1 | 317 | 0.003 | 0.016 | 0.914 | 0.024 | 0.043 | |
| 456 | AE | V | 2 sides | 1222 | 318 | 661 | 23.7 | 579 | 0.003 | 0.108 | 0.131 | 0.378 | 0.38 | |
| 457 | AD | W | 2 sides | 1196 | 271 | 717 | 38.3 | 469 | 0.006 | 0.008 | 0.832 | 0.11 | 0.044 | |
| 458 | AG | X | 2 sides | 1287 | 146 | 878 | 51.7 | 706 | 0.007 | 0.327 | 0.053 | 0.602 | 0.011 | |
| 459 | O | AS | 2 sides | 1229 | 197 | 719 | 61 | 317 | 0.003 | 0.009 | 0.021 | 0.958 | 0.009 | |
| 460 | R | AT | 2 sides | — | — | 947 | 94.9 | 283 | 0 | 0.006 | 0.011 | 0.979 | 0.004 | |

| | Ratio of structures (inside layer) | | | | | Vickers hardness (HV) Top/ | | Carbide volume rate (vol. %) | Wear (mg) Top/ | Roll forming: cracks after cross-section | | Nano-hardness standard deviation Top/ | | |
|---|---|---|---|---|---|---|---|---|---|---|---|---|---|---|
| Ex. no. | Ferrite | Pearlite | Bainite | Marte-nsite | Residual austenite | bottom average | Inside | Inside | bottom average | Top/bottom | Inside | bottom average | TS (MP) | Remarks |
| 419 | 0.004 | 0.011 | 0.51 | 0.449 | 0.026 | 417 | 373 | 0.17 | 2.81 | Good | Good | 0.61 | 1102 | Inv.ex. |
| 420 | 0.122 | 0.021 | 0.018 | 0.828 | 0.011 | 411 | 321 | 0.32 | 2.85 | Good | Good | 1.52 | 1067 | Inv.ex. |
| 421 | 0.816 | 0.058 | 0.111 | 0.004 | 0.011 | 337 | 76 | 0.89 | 7.01 | Good | Poor | 0.47 | 806 | Comp.ex. |
| 422 | 0.398 | 0.049 | 0.098 | 0.412 | 0.043 | 407 | 204 | 0.75 | 2.89 | Good | Good | 0.82 | 1005 | Inv.ex. |
| 423 | 0.131 | 0 | 0.082 | 0.774 | 0.013 | 419 | 344 | 0 | 2.77 | Good | Good | 1.13 | 1092 | Inv.ex. |
| 424 | 0.376 | 0.092 | 0.196 | 0.294 | 0.042 | 471 | 184 | 1.4 | 2.38 | Good | Good | 0.4 | 1115 | Inv.ex. |
| 425 | 0.088 | 0.017 | 0.041 | 0.853 | 0.001 | 418 | 391 | 0.26 | 2.74 | Good | Good | 1.2 | 1112 | Inv.ex. |
| 426 | 0.005 | 0.016 | 0.017 | 0.962 | 0 | 446 | 381 | 0.24 | 2.59 | Good | Good | 0.75 | 1160 | Inv.ex. |
| 427 | 0.01 | 0.024 | 0.024 | 0.927 | 0.015 | 421 | 388 | 0.37 | 2.7 | Good | Good | 0.25 | 1086 | Inv.ex. |
| 428 | 0.016 | 0.008 | 0.811 | 0.088 | 0.077 | 413 | 366 | 0.12 | 3.88 | Poor | Poor | 2.24 | 1091 | Comp.ex. |
| 429 | 0.059 | 0.122 | 0.087 | 0.729 | 0.003 | 489 | 388 | 1.86 | 2.33 | Good | Good | 0.37 | 1243 | Inv.ex. |
| 430 | 0.009 | 0.01 | 0.661 | 0.284 | 0.036 | 437 | 371 | 0.15 | 2.62 | Good | Good | 0.95 | 1138 | Inv.ex. |
| 431 | 0.101 | 0.022 | 0.106 | 0.771 | 0 | 524 | 397 | 0.34 | 2.24 | Good | Good | 1.39 | 1312 | Inv.ex. |
| 432 | 0.034 | 0.118 | 0.02 | 0.826 | 0.002 | 432 | 361 | 1.8 | 2.68 | Poor | Good | 2.13 | 1124 | Comp.ex. |
| 433 | 0.025 | 0.062 | 0.068 | 0.549 | 0.296 | 404 | 354 | 0.95 | 3.72 | Poor | Poor | 2.41 | 1069 | Comp.ex. |
| 434 | 0.064 | 0.084 | 0.062 | 0.554 | 0.236 | 508 | 395 | 1.28 | 2.21 | Good | Good | 1.05 | 1281 | Inv.ex. |
| 435 | 0.011 | 0.027 | 0.276 | 0.67 | 0.016 | 473 | 386 | 0.41 | 2.42 | Good | Good | 0.31 | 1212 | Inv.ex. |
| 436 | 0.202 | 0.02 | 0.045 | 0.721 | 0.012 | 404 | 390 | 0.31 | 2.91 | Good | Good | 0.87 | 1086 | Inv.ex. |
| 437 | 0.023 | 0.097 | 0.739 | 0.12 | 0.021 | 436 | 215 | 1.48 | 2.66 | Good | Good | 0.26 | 1064 | Inv.ex. |
| 438 | 0.064 | 0.114 | 0.255 | 0.483 | 0.084 | 402 | 329 | 1.74 | 2.86 | Good | Good | 0.77 | 1054 | Inv.ex. |
| 439 | 0.157 | 0.008 | 0.046 | 0.787 | 0.002 | 408 | 387 | 0.12 | 2.84 | Good | Good | 1.56 | 1072 | Inv.ex. |
| 440 | 0.1 | 0.067 | 0 | 0.823 | 0.01 | 426 | 328 | 1.02 | 3.65 | Poor | Poor | 2.37 | 1098 | Comp.ex. |
| 441 | 0.578 | 0 | 0.414 | 0.001 | 0.007 | 515 | 83 | 0 | 2.2 | Good | Good | 1.24 | 1149 | Inv.ex. |
| 442 | 0.031 | 0.018 | 0.475 | 0.473 | 0.003 | 437 | 332 | 0.27 | 2.64 | Good | Good | 1.45 | 1023 | Inv.ex. |
| 443 | 0.108 | 0.081 | 0.047 | 0.752 | 0.012 | 488 | 322 | 1.24 | 2.3 | Good | Good | 0.82 | 1210 | Inv.ex. |
| 444 | 0.354 | 0.103 | 0.071 | 0.43 | 0.042 | 462 | 207 | 1.57 | 2.43 | Good | Good | 1.51 | 872 | Inv.ex. |
| 445 | 0.004 | 0.101 | 0.115 | 0.78 | 0 | 495 | 388 | 1.54 | 2.26 | Good | Good | 0.91 | 1254 | Inv.ex. |
| 446 | 0.486 | 0.072 | 0.354 | 0.05 | 0.038 | 404 | 105 | 1.1 | 2.92 | Good | Good | 1.05 | 954 | Inv.ex. |
| 447 | 0.001 | 0.008 | 0.014 | 0.977 | 0 | 503 | 371 | 0.12 | 2.24 | Poor | Good | 2.13 | 1261 | Comp.ex. |
| 448 | 0.012 | 0.13 | 0.061 | 0.794 | 0.003 | 454 | 292 | 1.98 | 2.54 | Good | Good | 0.43 | 1133 | Inv.ex. |
| 449 | 0.054 | 0.023 | 0.055 | 0.867 | 0.001 | 404 | 389 | 0.35 | 2.88 | Good | Good | 0.86 | 1085 | Inv.ex. |
| 450 | 0.044 | 0.088 | 0.033 | 0.604 | 0.231 | 423 | 355 | 1.34 | 2.75 | Poor | Good | 2.19 | 1105 | Comp ex |
| 451 | 0.057 | 0.121 | 0.073 | 0.745 | 0.004 | 415 | 390 | 1.85 | 2.82 | Good | Good | 0.55 | 1106 | Inv.ex. |
| 452 | 0.036 | 0.027 | 0.036 | 0.899 | 0.002 | 403 | 396 | 0.41 | 2.88 | Good | Good | 1.25 | 1087 | Inv.ex. |
| 453 | 0.05 | 0.016 | 0.045 | 0.881 | 0.008 | 402 | 395 | 0.24 | 2.88 | Good | Good | 0.97 | 1084 | Inv.ex. |
| 454 | 0.111 | 0.005 | 0.034 | 0.846 | 0.004 | 512 | 398 | 0.08 | 2.19 | Good | Good | 0.27 | 1290 | Inv.ex. |
| 455 | 0.093 | 0.051 | 0.082 | 0.548 | 0.226 | 468 | 334 | 0.78 | 2.42 | Poor | Good | 2.2 | 1179 | Comp.ex. |
| 456 | 0.01 | 0.009 | 0.907 | 0.023 | 0.051 | 542 | 325 | 0.14 | 3.52 | Poor | Poor | 2.16 | 1312 | Comp.ex. |
| 457 | 0.003 | 0.003 | 0.438 | 0.531 | 0.025 | 433 | 391 | 0.05 | 2.64 | Good | Good | 1.47 | 1140 | Inv.ex. |
| 458 | 0.109 | 0.167 | 0.05 | 0.66 | 0.014 | 353 | 290 | 2.55 | 6.76 | Good | Poor | 1.36 | 945 | Comp.ex. |
| 459 | 0.019 | 0.091 | 0.138 | 0.739 | 0.013 | 405 | 320 | 1.39 | 2.87 | Good | Good | 1.14 | 1055 | Inv.ex. |
| 460 | 0.055 | 0.031 | 0.098 | 0.509 | 0.307 | 415 | 396 | 0.47 | 2.76 | Good | Good | 1.05 | 1109 | Inv.ex. |

*Bold underlines show outside scope of present invention.

Table 6 shows the results of evaluation of the samples. It is shown that in all of Example Nos. 419, 420, 422 to 425, 426, 427, 429 to 431, 434 to 439, 441 to 446, 448, 449, 451 to 454, 457, 459, and 460, the average micro-Vickers hardness of the hard layer was 400 HV or more and less than 700 HV, the amount of C of the hard layer was 0.08 to 0.40% and the amount of N was 0.02% or less, the average Vickers hardness of the inner layer was 80 HV or more and 400 HV or less, the volume ratio of the carbides contained in the inner layer was less than 2%, and the wear resistance and cold workability were excellent. The amount of wear and the nanohardness standard deviation in Table 6 are shown as average values of the top/bottom layers, but examples satisfying the requirement of the amount of wear of 3.0 mg or less and the nanohardness standard deviation of 2.00 or less as average values all satisfied these requirements at both of the top and bottom surfaces.

As opposed to this, in Comparative Example Nos. 428 and 440, the heating temperature of the hot rolling was high, while further, in Nos. 433 and 456, the heating time was long, an oxide layer was formed between the hard layer and the inner layer, and, in the wear resistance test and evaluation of the cold formability, interfacial peeling of the hard layer and the inner layer occurred. In Comparative Example Nos. 450 and 455, the heating temperature was low, while, further, in Comparative Example Nos. 432 and 447, the heating time was short, in particular, the segregation at the hard layer side was not eliminated, so the cold formability fell. In Example Nos. 420 and 445, the finishing temperature of hot rolling was low, the rolling load increased, and the productivity fell. In Comparative Example Nos. 421 and 458, the coiling temperature in hot rolling was high, the hardness of the hard layer fell, and a drop in the hardness of the inner layer and increase in the carbide volume ratio of the inner layer were invited.

To investigate the manufacturing conditions by "cold rolling-annealing" or "annealing-cold rolling-annealing", the hot rolled sheets of Example Nos. 419, 422 to 425, 426, 427, 429, 430, 435 to 439, 441 to 444, 446, 448, 449, 451 to 454, 457, 459, and 460 were treated by the "cold rolling-annealing" or "annealing-cold rolling-annealing" of Table 7 for use in various tests.

TABLE 7

| Ex. no. | Layer configuration Top/bottom | Layer configuration Inside | Position of hard layer | Hot rolling conditions Heating temp. (° C.) | Holding time (min) | Finish temp. (° C.) | Cooling rate (° C./s) | Coiling temp. (° C.) | Pickling |
|---|---|---|---|---|---|---|---|---|---|
| 461 | AJ | D | 2 sides | 1162 | 180 | 898 | 92.6 | 454 | Hydrochloric |
| 462 | AI | H | 2 sides | 1281 | 130 | 765 | 42.3 | 472 | Sulfuric |
| 463 | D | I | 2 sides | — | — | 667 | 59.8 | 313 | Sulfuric |
| 464 | AC | J | 2 sides | 1214 | 28 | 806 | 15.6 | 292 | Hydrochloric |
| 465 | S | K | 2 sides | 1165 | 63 | 705 | 74 | 325 | Hydrochloric |
| 466 | A | M | 2 sides | 1243 | 81 | 907 | 59 | 147 | Sulfuric |
| 467 | W | O | 1 side | 1159 | 44 | 872 | 61.9 | 339 | Sulfuric |
| 468 | AF | Q | 2 sides | 1144 | 48 | 682 | 74.5 | 672 | Sulfuric |
| 469 | AK | R | 2 sides | — | — | 757 | 71.6 | 472 | Hydrochloric |
| 470 | AG | W | 2 sides | 1127 | 142 | 673 | 17 | 441 | Hydrochloric |
| 471 | E | X | 2 sides | 1113 | 238 | 804 | 34.4 | 109 | Sulfuric |
| 472 | AB | AS | 2 sides | 1299 | 68 | 913 | 61.5 | 457 | Hydrochloric |
| 473 | Z | AT | 2 sides | 1250 | 28 | 752 | 83.9 | 276 | Hydrochloric |
| 474 | P | D | 1 side | 1119 | 43 | 786 | 52 | 221 | Hydrochloric |
| 475 | AE | F | 2 sides | 1195 | 230 | 713 | 72.8 | 634 | Hydrochloric |
| 476 | AH | H | 1 side | 1287 | 232 | 879 | 85.7 | 517 | Hydrochloric |
| 477 | AA | I | 2 sides | 1135 | 28 | 944 | 97.4 | 220 | Sulfuric |
| 478 | T | J | 1 side | 1236 | 32 | 727 | 43.1 | 131 | Sulfuric |
| 479 | C | L | 2 sides | 1212 | 80 | 842 | 36.5 | 376 | Hydrochloric |
| 480 | Y | N | 2 sides | 1110 | 29 | 878 | 42.7 | 683 | Sulfuric |
| 481 | U | O | 2 sides | 1101 | 223 | 727 | 34.8 | 216 | Hydrochloric |
| 482 | Q | Q | 2 sides | — | — | 873 | 59.1 | 496 | Sulfuric |
| 483 | V | R | 2 sides | 1257 | 264 | 773 | 99.8 | 250 | Hydrochloric |
| 484 | X | S | 2 sides | 1230 | 299 | 695 | 90.6 | 344 | Sulfuric |
| 485 | B | T | 2 sides | 1276 | 186 | 834 | 66.4 | 254 | Hydrochloric |
| 486 | AD | W | 2 sides | 1196 | 271 | 717 | 38.3 | 469 | Sulfuric |
| 487 | O | AS | 2 sides | 1229 | 197 | 719 | 61 | 317 | Sulfuric |
| 488 | R | AT | 2 sides | — | — | 947 | 94.9 | 283 | Hydrochloric |

TABLE 7-continued

| Ex. no. | Pattern | Annealing for hot rolled sheet ||||||| 
| | | Condition (1) | Condition (2) | Condition (3) | Condition (4) | Condition (5) | Condition (6) | Condition (7) |
|---|---|---|---|---|---|---|---|---|
| 461 | C-CAL | 75 | 756 | 160 | 58 | 409 | 140 | 63 |
| 462 | BAF | 76 | 513 | 98 | 48 | — | — | — |
| 463 | BAF | 62 | 656 | 14 | 74 | — | — | — |
| 464 | None | — | — | — | — | — | — | — |
| 465 | C-CAL | 53 | 785 | 203 | 75 | 478 | 277 | 49 |
| 466 | C-CAL | 33 | 722 | 90 | 62 | 324 | 340 | 18 |
| 467 | None | — | — | — | — | — | — | — |
| 468 | None | — | — | — | — | — | — | — |
| 469 | None | — | — | — | — | — | — | — |
| 470 | None | — | — | — | — | — | — | — |
| 471 | None | — | — | — | — | — | — | — |
| 472 | BAF | 24 | 705 | 6 | 27 | — | — | — |
| 473 | BAF | 69 | 528 | 20 | 22 | — | — | — |
| 474 | BAF | 31 | 561 | 72 | 53 | — | — | — |
| 475 | None | — | — | — | — | — | — | — |
| 476 | None | — | — | — | — | — | — | — |
| 477 | None | — | — | — | — | — | — | — |
| 478 | BAF | 16 | 549 | 86 | 18 | — | — | — |
| 479 | BAF | 77 | 647 | 72 | 21 | — | — | — |
| 480 | None | — | — | — | — | — | — | — |
| 481 | None | — | — | — | — | — | — | — |
| 482 | None | — | — | — | — | — | — | — |
| 483 | None | — | — | — | — | — | — | — |
| 484 | BAF | 25 | 695 | 34 | 56 | — | — | — |
| 485 | C-CAL | 19 | 778 | 158 | 27 | 437 | 190 | 60 |
| 486 | C-CAL | 31 | 668 | 267 | 64 | 416 | 331 | 25 |
| 487 | C-CAL | 11 | 736 | 50 | 61 | 371 | 473 | 39 |
| 488 | None | — | — | — | — | — | — | — |

TABLE 7-continued

| Ex. no. | Cooling rate (%) | Pattern | Condition (1) | Condition (2) | Condition (3) | Condition (4) | Annealing for cold rolled sheet Condition (5) | Condition (6) | Condition (7) | Condition (8) | Condition (9) | Condition (10) |
|---|---|---|---|---|---|---|---|---|---|---|---|---|
| 461 | 62 | C-CAL | 37 | 858 | 246 | 73 | 316 | 150 | 31 | — | — | — |
| 462 | 21 | C-CAL | 77 | 883 | 169 | 45 | 402 | 261 | 76 | — | — | — |
| 463 | 62 | R-CAL | 46 | 816 | 289 | 25 | 129 | 51 | 37 | 433 | 496 | 80 |
| 464 | 24 | R-CAL | 68 | 861 | 121 | 57 | 482 | 430 | 48 | — | — | — |
| 465 | 51 | R-CAL | 74 | 830 | 88 | 39 | 146 | 28 | 49 | 422 | 338 | 55 |
| 466 | 23 | R-CAL | 74 | 859 | 215 | 16 | 333 | 47 | 54 | 363 | 110 | 36 |
| 467 | 24 | C-CAL | 58 | 828 | 294 | 44 | 312 | 329 | 26 | — | — | — |
| 468 | 77 | C-CAL | 41 | 749 | 55 | 73 | 359 | 191 | 30 | — | — | — |
| 469 | 75 | C-CAL | 8 | 859 | 256 | 12 | 452 | 379 | 63 | — | — | — |
| 470 | 62 | R-CAL | 27 | 839 | 132 | 71 | 285 | 25 | 46 | 439 | 162 | 38 |
| 471 | 54 | C-CAL | 31 | 874 | 263 | 61 | 495 | 368 | 28 | — | — | — |
| 472 | 63 | R-CAL | 70 | 845 | 61 | 58 | 196 | 9 | 25 | 393 | 243 | 41 |
| 473 | 43 | R-CAL | 28 | 853 | 173 | 48 | 314 | 28 | 66 | 474 | 367 | 43 |
| 474 | 65 | C-CAL | 40 | 873 | 221 | 64 | 352 | 349 | 37 | — | — | — |
| 475 | 45 | R-CAL | 37 | 768 | 129 | 7 | 153 | 18 | 8 | 457 | 314 | 26 |
| 476 | 73 | R-CAL | 28 | 773 | 65 | 28 | 110 | 9 | 28 | 384 | 95 | 64 |
| 477 | 55 | R-CAL | 28 | 812 | 207 | 28 | 127 | 7 | 46 | 425 | 174 | 65 |
| 478 | 60 | R-CAL | 49 | 879 | 139 | 52 | 221 | 37 | 34 | 470 | 252 | 39 |
| 479 | 26 | C-CAL | 7 | 815 | 203 | 59 | 355 | 97 | 15 | — | — | — |
| 480 | 79 | R-CAL | 40 | 826 | 106 | 9 | 157 | 21 | 31 | 368 | 372 | 41 |
| 481 | 72 | R-CAL | 42 | 841 | 68 | 61 | 181 | 10 | 16 | 395 | 62 | 31 |
| 482 | 48 | R-CAL | 47 | 878 | 212 | 77 | 321 | 41 | 21 | 371 | 394 | 52 |
| 483 | 32 | C-CAL | 59 | 881 | 152 | 8 | 386 | 139 | 51 | — | — | — |
| 484 | 49 | C-CAL | 28 | 812 | 22 | 23 | 435 | 52 | 19 | — | — | — |
| 485 | 33 | R-CAL | 50 | 817 | 260 | 47 | 216 | 33 | 44 | 470 | 170 | 39 |
| 486 | 37 | R-CAL | 29 | 768 | 300 | 74 | 146 | 59 | 39 | 423 | 281 | 22 |
| 487 | 58 | C-CAL | 56 | 879 | 134 | 56 | 480 | 370 | 23 | — | — | — |
| 488 | 71 | R-CAL | 18 | 868 | 128 | 39 | 269 | 15 | 28 | 414 | 366 | 58 |

TABLE 7-continued

| Ex. no. | Ration of structures (top/bottom layers) | | | | | Ratio of structures (inside layer) | | | | |
|---|---|---|---|---|---|---|---|---|---|---|
| | Ferrite | Pearlite | Bainite | Martensite | Residual austenite | Ferrite | Pearlite | Bainite | Martensite | Residual austenite |
| 461 | 0 | 0.01 | 0.003 | 0.966 | 0.021 | 0.087 | 0.007 | 0.305 | 0.502 | 0.099 |
| 462 | 0.019 | 0.007 | 0.002 | 0.936 | 0.036 | 0.131 | 0.006 | 0.145 | 0.718 | 0 |
| 463 | 0.191 | 0.007 | 0.007 | 0.537 | 0.258 | 0.325 | 0.001 | 0.305 | 0.368 | 0.001 |
| 464 | 0 | 0.004 | 0.351 | 0.287 | 0.358 | 0.195 | 0.001 | 0.208 | 0.596 | 0 |
| 465 | 0.103 | 0.005 | 0.105 | 0.576 | 0.211 | 0.368 | 0.005 | 0.451 | 0.175 | 0.001 |
| 466 | 0 | 0.036 | 0.004 | 0.918 | 0.042 | 0.107 | 0.002 | 0.112 | 0.779 | 0 |
| 467 | 0.136 | 0.007 | 0.005 | 0.703 | 0.149 | 0.318 | 0.006 | 0.005 | 0.342 | 0.329 |
| 468 | 0.058 | 0.001 | 0.378 | 0.115 | 0.448 | 0.372 | 0.002 | 0.233 | 0.257 | 0.136 |
| 469 | 0.086 | 0.006 | 0.001 | 0.794 | 0.113 | 0.163 | 0.007 | 0.001 | 0.747 | 0.082 |
| 470 | 0.233 | 0.003 | 0.051 | 0.404 | 0.309 | 0.081 | 0.022 | 0.102 | 0.71 | 0.085 |
| 471 | 0 | 0.007 | 0.001 | 0.984 | 0.008 | 0 | 0.105 | 0.004 | 0.881 | 0.01 |
| 472 | 0.154 | 0.008 | 0.005 | 0.663 | 0.17 | 0.09 | 0.028 | 0.108 | 0.688 | 0.106 |
| 473 | 0 | 0.001 | 0.007 | 0.984 | 0.008 | 0.242 | 0.001 | 0.001 | 0.512 | 0.244 |
| 474 | 0.096 | 0.005 | 0.003 | 0.691 | 0.205 | 0.014 | 0.005 | 0.004 | 0.954 | 0.023 |
| 475 | 0.101 | 0.004 | 0.003 | 0.188 | 0.704 | 0.888 | 0.001 | 0.101 | 0.009 | 0.001 |
| 476 | 0.249 | 0.001 | 0.004 | 0.475 | 0.271 | 0.375 | 0.006 | 0.386 | 0.232 | 0.001 |
| 477 | 0.197 | 0.005 | 0.111 | 0.371 | 0.316 | 0.333 | 0.003 | 0.348 | 0.315 | 0.001 |
| 478 | 0.114 | 0.003 | 0.1 | 0.465 | 0.318 | 0.11 | 0.007 | 0.121 | 0.762 | 0 |
| 479 | 0 | 0.008 | 0.003 | 0.976 | 0.013 | 0.378 | 0.001 | 0.388 | 0.232 | 0.001 |
| 480 | 0 | 0.004 | 0.01 | 0.919 | 0.067 | 0.179 | 0.004 | 0.19 | 0.627 | 0 |
| 481 | 0.093 | 0 | 0.006 | 0.703 | 0.198 | 0.295 | 0 | 0.005 | 0.399 | 0.301 |
| 482 | 0.128 | 0.002 | 0.004 | 0.63 | 0.236 | 0.228 | 0.003 | 0.005 | 0.528 | 0.236 |
| 483 | 0 | 0.023 | 0.004 | 0.946 | 0.027 | 0 | 0.052 | 0.004 | 0.938 | 0.006 |
| 484 | 0.236 | 0.001 | 0.001 | 0.523 | 0.239 | 0.265 | 0.002 | 0.004 | 0.457 | 0.272 |
| 485 | 0.062 | 0.004 | 0.109 | 0.64 | 0.185 | 0.329 | 0.004 | 0.365 | 0.104 | 0.198 |
| 486 | 0.237 | 0.007 | 0.006 | 0.493 | 0.257 | 0.353 | 0.006 | 0.001 | 0.277 | 0.363 |
| 487 | 0.113 | 0.002 | 0.002 | 0.664 | 0.219 | 0 | 0.075 | 0.01 | 0.9 | 0.015 |
| 488 | 0.035 | 0.003 | 0.004 | 0.916 | 0.042 | 0.182 | 0.016 | 0.001 | 0.611 | 0.19 |

TABLE 7-continued

| Ex. no. | Vickers hardness (HV) Top/bottom average | Vickers hardness (HV) Inside | Carbide volume ratio (vol. %) Inside | Wear (mg) Top/bottom average | Roll forming: cracks after cross-section Top/bottom | Roll forming: cracks after cross-section Inside | Nanohardness standard deviation Top/bottom average | TS (MPa) | Remarks |
|---|---|---|---|---|---|---|---|---|---|
| 461 | 630 | 395 | 0.11 | 1.87 | Good | Good | 0.27 | 1508 | Inv.ex. |
| 462 | 619 | 342 | 0.09 | 1.95 | Good | Good | 1.08 | 1463 | Inv.ex. |
| 463 | 417 | 291 | 0.02 | 2.8 | Good | Good | 0.24 | 1064 | Inv.ex. |
| 464 | 490 | 308 | 0.02 | 2.32 | Good | Good | 1.01 | 1207 | Inv.ex. |
| 465 | 418 | 300 | 0.08 | 2.78 | Good | Good | 0.4 | 1070 | Inv.ex. |
| 466 | 488 | 357 | 0.03 | 2.31 | Good | Good | 1.06 | 1226 | Inv.ex. |
| 467 | 432 | 303 | 0.09 | 2.64 | Good | Good | 1.05 | 978 | Inv.ex. |
| 468 | 515 | 312 | 0.03 | 2.26 | Good | Good | 0.24 | 1256 | Inv.ex. |
| 469 | 608 | 388 | 0.11 | 1.98 | Good | Good | 0.36 | 1463 | Inv.ex. |
| 470 | 469 | 396 | 0.34 | 2.45 | Good | Good | 1.1 | 1209 | Inv.ex. |
| 471 | 422 | 384 | 1.6 | 2.72 | Good | Good | 1.6 | 1116 | Inv.ex. |
| 472 | 472 | 379 | 0.43 | 2.42 | Good | Good | 1.39 | 1207 | Inv.ex. |
| 473 | 503 | 392 | 0.02 | 2.23 | Good | Good | 0.95 | 1270 | Inv.ex. |
| 474 | 407 | 388 | 0.08 | 2.83 | Good | Good | 0.49 | 1073 | Inv.ex. |
| 475 | 517 | 89 | 0.02 | 2.25 | Good | Good | 1.22 | 1156 | Inv.ex. |
| 476 | 475 | 257 | 0.09 | 2.37 | Good | Good | 1.38 | 954 | Inv.ex. |
| 477 | 421 | 287 | 0.05 | 2.75 | Good | Good | 1.3 | 1070 | Inv.ex. |
| 478 | 410 | 334 | 0.11 | 2.8 | Good | Good | 0.31 | 1000 | Inv.ex. |
| 479 | 561 | 245 | 0.02 | 2.11 | Good | Good | 1.03 | 1310 | Inv.ex. |
| 480 | 518 | 345 | 0.06 | 2.22 | Good | Good | 0.44 | 1276 | Inv.ex. |
| 481 | 418 | 316 | 0 | 2.73 | Good | Good | 0.52 | 1077 | Inv.ex. |
| 482 | 403 | 362 | 0.05 | 2.84 | Good | Good | 0.86 | 1071 | Inv.ex. |
| 483 | 469 | 393 | 0.79 | 2.46 | Good | Good | 1.03 | 1208 | Inv.ex. |
| 484 | 400 | 342 | 0.03 | 2.97 | Good | Good | 1.08 | 1056 | Inv.ex. |
| 485 | 550 | 306 | 0.06 | 2.08 | Good | Good | 0.59 | 1318 | Inv.ex. |
| 486 | 431 | 331 | 0.09 | 2.69 | Good | Good | 1.03 | 1109 | Inv.ex. |
| 487 | 409 | 398 | 1.15 | 2.85 | Good | Good | 1.41 | 1099 | Inv.ex. |
| 488 | 441 | 385 | 0.24 | 2.58 | Good | Good | 0.29 | 1152 | Inv.ex. |

Table 7 shows the results of evaluation of the samples. It shows that regardless of being treated by "cold rolling-annealing" or "annealing-cold rolling-annealing", in all of Example Nos. 461 to 488 satisfying the provisions of the present invention, the average micro-Vickers hardness of the hard layer is 400 HV or more and less than 700 HV, the amount of C in the hard layer is 0.08 to 0.40% and the amount of N is 0.02% or less, the average Vickers hardness of the inner layer is 80 HV or more and 400 HV or less, the volume ratio of carbides contained in the inner layer is less than 2%, and the wear resistance and cold workability are excellent.

After the annealing conditions for cold-rolled sheet described previously, Example Nos. 463, 465, 466, 470, 472, 475, and 476 were treated by hot dip plating or hot dip alloy plating shown in Table 8 to produce plated steel sheets for use for various tests.

TABLE 8

| Ex. no. | Layer configuration Top/bottom | Inside | Position of hard layer | Heating temp. (° C.) | Holding time (min) | Finish temp. (° C.) | Cooling rate (° C./s) | Coiling temp. (° C.) | Pickling |
|---|---|---|---|---|---|---|---|---|---|
| 463 | D | I | 2 sides | — | — | 667 | 59.8 | 313 | Sulfuric |
| 465 | S | K | 2 sides | 1165 | 63 | 705 | 74 | 325 | Hydrochloric |
| 466 | A | M | 2 sides | 1243 | 81 | 907 | 59 | 147 | Sulfuric |
| 470 | AG | W | 2 sides | 1127 | 142 | 673 | 17 | 441 | Hydrochloric |
| 472 | AB | AS | 2 sides | 1299 | 68 | 913 | 61.5 | 457 | Hydrochloric |
| 475 | AE | F | 2 sides | 1195 | 230 | 713 | 72.8 | 634 | Sulfuric |
| 476 | AH | H | 1 side | 1287 | 232 | 879 | 85.7 | 517 | Hydrochloric |

| Ex. no. | Pattern | Annealing for hot rolled sheet Condition (1) | Condition (2) | Condition (3) | Condition (4) | Condition (5) | Condition (6) | Condition (7) |
|---|---|---|---|---|---|---|---|---|
| 463 | BAF | 62 | 656 | 14 | 74 | — | — | — |
| 465 | C-CAL | 53 | 785 | 203 | 75 | 478 | 277 | 49 |
| 466 | C-CAL | 33 | 722 | 90 | 62 | 324 | 340 | 18 |
| 470 | None | — | — | — | — | — | — | — |
| 472 | BAF | 24 | 705 | 6 | 27 | — | — | — |
| 475 | None | — | — | — | — | — | — | — |
| 476 | None | — | — | — | — | — | — | — |

| Ex. no. | Cooling rate (%) | Pattern | Annealing for cold rolled sheet Condition (1) | Condition (2) | Condition (3) | Condition (4) |
|---|---|---|---|---|---|---|
| 463 | 62 | R-CAL | 46 | 816 | 289 | 25 |
| 465 | 51 | R-CAL | 74 | 830 | 88 | 39 |
| 466 | 23 | R-CAL | 74 | 859 | 215 | 16 |
| 470 | 62 | R-CAL | 27 | 839 | 132 | 71 |
| 472 | 63 | R-CAL | 70 | 845 | 61 | 58 |
| 475 | 45 | R-CAL | 37 | 768 | 129 | 7 |
| 476 | 73 | R-CAL | 28 | 773 | 65 | 28 |

| Ex. no. | Annealing for cold rolled sheet Condition (5) | Condition (6) | Condition (7) | Condition (8) | Condition (9) | Condition (10) |
|---|---|---|---|---|---|---|
| 463 | 129 | 51 | 37 | 433 | 496 | 80 |
| 465 | 146 | 28 | 49 | 422 | 338 | 55 |
| 466 | 333 | 47 | 54 | 363 | 110 | 36 |
| 470 | 285 | 25 | 46 | 439 | 162 | 38 |
| 472 | 196 | 9 | 25 | 393 | 243 | 41 |
| 475 | 153 | 18 | 8 | 457 | 314 | 26 |
| 476 | 110 | 9 | 28 | 384 | 95 | 64 |

| | Annealing for cold rolled sheet annealing: Atmosphere at heating zone | | | Plating | | Carbide volume ratio | Wear (mg) | Roll forming: cracks after cross-section | Nano-hardness standard deviation | | | |
|---|---|---|---|---|---|---|---|---|---|---|---|---|
| Ex. no. | Hydrogen conc. | Dew point | Balance gas | Plating species | Alloying | (vol. %) Inside | Top/bottom average | Top/bottom | Inside | Top/bottom average | TS (MPa) | Remarks |
| 463 | 0.1 to 30 vol % | −70 to −10° C. | Nitrogen and impurity gas | Zn | No | 0.03 | 2.90 | Good | Good | 0.24 | 1040 | Inv.ex. |
| 465 | | | | Zn + Al + Mg | Yes | 0.08 | 2.90 | Good | Good | 0.41 | 1048 | Inv.ex. |
| 466 | | | | Zn + Al | Yes | 0.04 | 2.42 | Good | Good | 1.06 | 1195 | Inv.ex. |
| 470 | | | | Zn + Mg | Yes | 0.35 | 2.45 | Good | Good | 1.12 | 1182 | Inv.ex. |
| 472 | | | | Al | No | 0.42 | 2.43 | Good | Good | 1.37 | 1180 | Inv.ex. |

TABLE 8-continued

| 475 | | Zn | Yes | 0.06 | 2.31 | Good | Good | 1.26 | 1129 | Inv.ex. |
| 476 | | Al | Yes | 0.1 | 2.48 | Good | Good | 1.36 | 932 | Inv.ex. |

Figure 2:
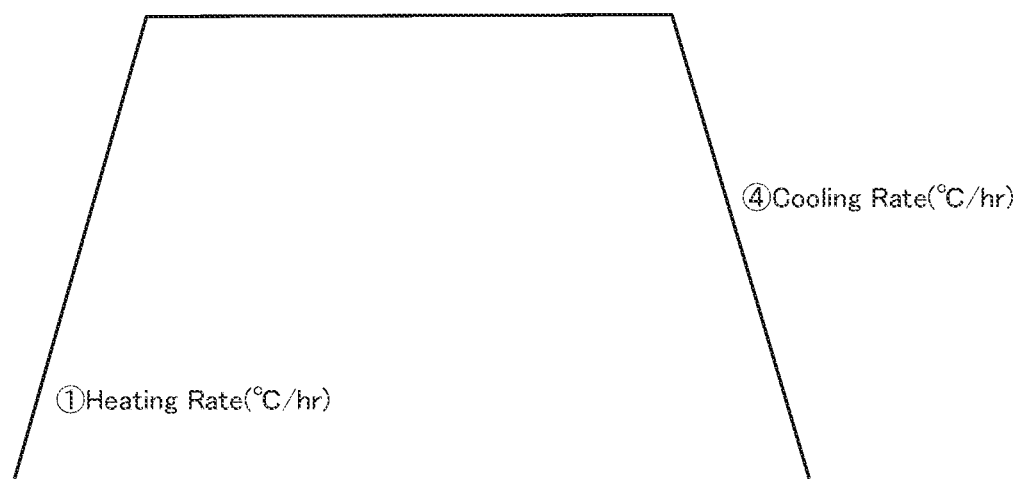
FIG. 2 is a view showing an annealing pattern of box annealing suitable for annealing for hot rolled sheet before cold rolling.
Figure 3:
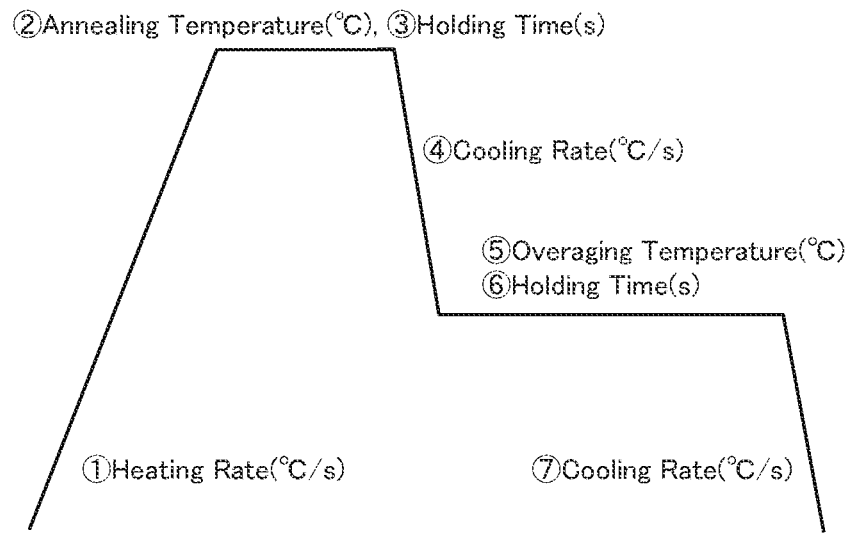
FIG. 3 is a view showing an annealing pattern of continuous annealing suitable for annealing for hot rolled sheet before cold rolling and annealing for cold rolled sheet after cold rolling.
Figure 4:
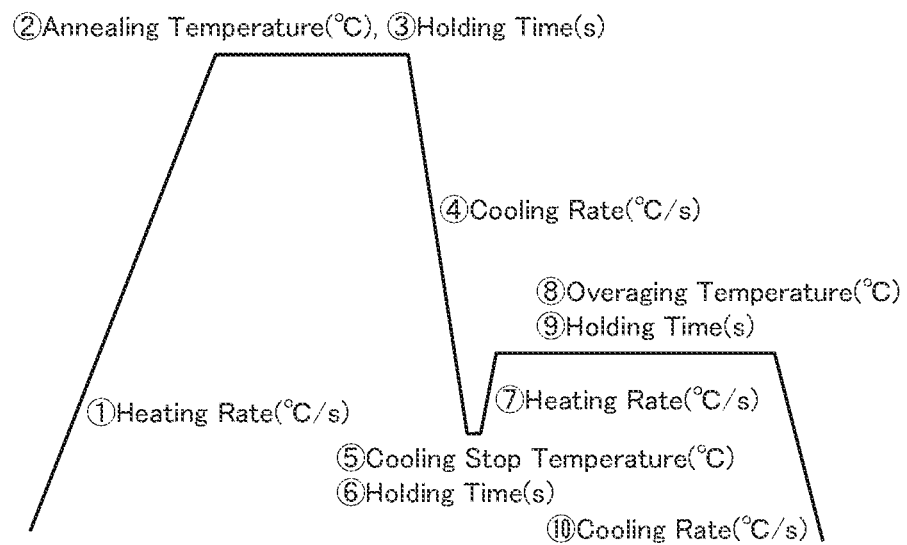
FIG. 4 is a view showing an annealing pattern of reheat type annealing for cold rolled sheet suitable for annealing for cold rolled sheet after cold rolling.

Table 8 shows the results of evaluation of the samples. It is shown that by hot dip plating or hot dip alloy plating, while the strength and wear resistance tend to deteriorate somewhat, it is possible to produce a cold rolled plated steel sheet excellent in wear resistance and cold formability. For the patterns and conditions of the annealing for hot rolled sheet and annealing for cold rolled sheet in Table 8, see FIGS. 2 to 4.

The invention claimed is:

1. A steel sheet comprising: an inner layer; and a hard layer at one or both surfaces of the inner layer, wherein
the hard layer comprises, by mass %,
C: 0.08 to 0.40%,
Si: 0.01 to 3.00%,
Mn: 1.000 to 10.00%,
P: 0.0001 to 0.0200%,
S: 0.0001 to 0.0200%, and
a balance of Fe and impurities, and optionally, by mass %,
Al: 0.500% or less,
N: 0.0200% or less,
Cr: 2.000% or less,
Mo: 1.000%, or less,
O: 0.0200% or less,
Ti: 0.500% or less,
B: 0.0100% or less,
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less,
the inner layer comprises, by mass %,
C: 0.001 to 0.200%,
Si: 0.01 to 3.00%,
Mn: 0.20 to 3.00%,
P: 0.0001 to 0.0200%,
S: 0.0001 to 0.0200%, and
a balance of Fe and impurities, and optionally, by mass %,
Al: 0.500% or less,
N: 0.0200% or less,
Cr: 2.000% or less,
Mo: 1.000% or less,
O: 0.0200% or less,
Ti: 0.500% or less,
B: 0.0100% or less,
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less,
the hard layer has a thickness of 20 μm or more and ⅔ of the total sheet thickness or less,
the hard layer has an average micro-Vickers hardness of 400 HV or more and less than 700 HV,
the inner layer has an average micro-Vickers hardness of 80 HV or more and less than 400 HV,
the inner layer has a carbide volume ratio of less than 2.00%, and
the hard layer has a nanohardness standard deviation of 2.00 or less.

2. The steel sheet according to claim 1, wherein
the hard layer comprises, by mass %, one or more of
Al: 0.001% or more and 0.500% or less,
N: 0.0001% or more and 0.0200% or less,
Cr: 0.001% or more and 2.000% or less,
Mo: 0.001% or more and 1.000% or less,
O: 0.0001% or more and 0.0200% or less,
Ti: 0.001% or more and 0.500% or less, and
B: 0.0001% or more and 0.0100% or less, and
the inner layer comprises, by mass %, one or more of
Al: 0.001% or more and 0.500% or less,
N: 0.0001% or more and 0.0200% or less,
Cr: 0.001% or more and 2.000% or less,
Mo: 0.001% or more and 1.000% or less,
O: 0.0001% or more and 0.0200% or less,
Ti: 0.001% or more and 0.500% or less, and
B: 0.0001°% o or more and 0.0100% or less.

3. The steel sheet according to claim 1, wherein
the hard layer comprises, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less, and
the inner layer comprises, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less, As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less.

4. The steel sheet according to claim 2, wherein
the hard layer comprises, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less, and
the inner layer comprises, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less.

5. A steel sheet comprising: an inner layer; and a hard layer at one or both surfaces of the inner layer, wherein
the hard layer consists of, by mass %,
C: 0.08 to 0.40%,
Si: 0.01 to 3.00%,
Mn: 1.000 to 10.00%,
P: 0.0001 to 0.0200%,
S: 0.0001 to 0.0200%, and
a balance of Fe and impurities, and optionally, by mass %,
Al: 0.500% or less,
N: 0.0200% or less,
Cr: 2.000% or less,
Mo: 1.000% or less,
O: 0.0200% or less,
Ti: 0.500% or less,
B: 0.0100% or less,
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less,
the inner layer consists of, by mass %,
C: 0.001 to 0.200%,
Si: 0.01 to 3.00%,
Mn: 0.20 to 3.00%,
P: 0.0001 to 0.0200%,
S: 0.0001 to 0.0200%, and
a balance of Fe and impurities, and optionally, by mass %,
Al: 0.500% or less,
N: 0.0200% or less,
Cr: 2.000% or less,
Mo: 1.000% or less,
O: 0.0200% or less,
Ti: 0.500% or less,
B: 0.0100% or less,
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less,
the hard layer has a thickness of 20 μm or more and ⅖ of the total sheet thickness or less,
the hard layer has an average micro-Vickers hardness of 400 HV or more and less than 700 HV,
the inner layer has an average micro-Vickers hardness of 80 HV or more and less than 400 HV,
the inner layer has a carbide volume ratio of less than 2.00%, and
the hard layer has a nanohardness standard deviation of 2.00 or less.

6. The steel sheet according to claim 5, wherein
the hard layer further consists of, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less, and
the inner layer further consists of, by mass %, one or more of
Nb: 0.001% or more and 0.500% or less,
V: 0.001% or more and 0.500% or less,
Cu: 0.001% or more and 0.500% or less,
W: 0.001% or more and 0.100% or less, Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less.

7. The steel sheet according to claim 5, wherein
the hard layer further consists of, by mass %, one or more of
Al: 0.001% or more and 0.500% or less,
N: 0.0001% or more and 0.0200% or less,
Cr: 0.001% or more and 2.000% or less,
Mo: 0.001% or more and 1.000% or less,
O: 0.0001% or more and 0.0200% or less,
Ti: 0.001% or more and 0.500% or less, and
B: 0.0001% or more and 0.0100% or less, and
the inner layer further consists of, by mass %, one or more of
Al: 0.001% or more and 0.500% or less,
N: 0.0001% or more and 0.0200% or less,
Cr: 0.001% or more and 2.000% or less,
Mo: 0.001% or more and 1.000% or less,
O: 0.0001% or more and 0.0200% or less,
Ti: 0.001% or more and 0.500% or less, and
B: 0.0001% or more and 0.0100% or less.

8. The steel sheet according to claim 7, wherein
the hard layer further consists of, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less, and
the inner layer further consists of, by mass %, one or more of
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less.

* * * * *